(12) United States Patent
Guido et al.

(10) Patent No.: US 10,163,083 B2
(45) Date of Patent: Dec. 25, 2018

(54) ACCOUNT ACTIVITY MANAGEMENT SYSTEM

(71) Applicant: BANK OF AMERICA CORPORATION, Charlotte, NC (US)

(72) Inventors: Anthony David Guido, Corona, CA (US); Melanie Ann Soranno, Salem, NY (US); Jeffrey John Parker, Fort Mill, SC (US); Amanda Jane Holcomb, Charlotte, NC (US); Richard Andrew Starbuck, Walnut Creek, CA (US); James Kevin Cobb, Napa, CA (US); Dariane Katinka Hunt, Concord, MA (US); Jay G. Frater, Madison, WI (US); Robert Osmer, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 480 days.

(21) Appl. No.: 14/685,468

(22) Filed: Apr. 13, 2015

(65) Prior Publication Data

US 2016/0300204 A1 Oct. 13, 2016

(51) Int. Cl.
*G06Q 20/32* (2012.01)
*G06Q 20/10* (2012.01)
*G06F 3/01* (2006.01)

(52) U.S. Cl.
CPC ........... *G06Q 20/108* (2013.01); *G06F 3/017* (2013.01)

(58) Field of Classification Search
CPC .................................................. G06Q 20/108
USPC ......................................................... 705/42
See application file for complete search history.

(56) References Cited

U.S. PATENT DOCUMENTS

| | | | |
|---|---|---|---|
| 5,530,938 A | 6/1996 | Akasaka et al. | |
| 5,893,078 A | 4/1999 | Paulson | |
| 6,173,272 B1 | 1/2001 | Thomas et al. | |
| 6,704,714 B1 | 3/2004 | O'Leary et al. | |

(Continued)

FOREIGN PATENT DOCUMENTS

KR 20010070545 7/2001

OTHER PUBLICATIONS

European Search Report dated Aug. 9, 2010 for European Application No. EP 10 25 0831.

(Continued)

*Primary Examiner* — Jessica Lemieux
(74) *Attorney, Agent, or Firm* — Michael A. Springs; Moore & Van Allen PLLC; Peter B. Stewart

(57) ABSTRACT

Embodiments of the invention are directed to systems, methods and computer program products for use in streamlining customer finance and customer money management platforms and providing electronic financial management. An exemplary apparatus may be configured to provide access to a funds transfer management portal that interfaces with at least one database to access a customer's financial information for use in presenting account activity associated with at least one of the customer's accounts maintained by a financial institution. The system receives a request to view account activity in which the request specifies a format for viewing the account activity. In response to receiving the request, the system retrieves data related to one or more funds transfers associated with the at least one account and present the account activity in the requested format for viewing the account activity.

16 Claims, 36 Drawing Sheets

(56) References Cited

U.S. PATENT DOCUMENTS

| | | |
|---|---|---|
| 7,089,208 B1 | 8/2006 | Levchin et al. |
| 7,099,850 B1 | 8/2006 | Mann, II et al. |
| 7,155,411 B1 | 12/2006 | Blinn et al. |
| 7,401,731 B1 | 7/2008 | Pletz et al. |
| 7,402,442 B2 | 7/2008 | Condorelli et al. |
| 7,707,106 B1 | 4/2010 | Swanson, Sr. et al. |
| 7,725,387 B1 | 5/2010 | Fitch et al. |
| 7,792,717 B1 | 9/2010 | Hankins et al. |
| 7,797,207 B1 | 9/2010 | Dilip et al. |
| 7,848,980 B2 | 12/2010 | Carlson |
| 7,899,750 B1 | 3/2011 | Klieman et al. |
| 7,980,463 B2 | 7/2011 | Epstein |
| 8,001,045 B1 | 8/2011 | McClinton |
| 8,355,985 B1 | 1/2013 | Bent et al. |
| 8,452,702 B1 | 5/2013 | O'Donnell et al. |
| 8,548,909 B1 * | 10/2013 | Snow ............... G06F 17/30896 705/42 |
| 8,606,703 B1 | 12/2013 | Dorsey et al. |
| 8,639,622 B1 * | 1/2014 | Moore ............... G06Q 40/00 705/35 |
| 8,725,635 B2 | 5/2014 | Klein et al. |
| 8,738,526 B2 | 5/2014 | Nosek et al. |
| 2001/0049657 A1 | 12/2001 | Wang |
| 2002/0019806 A1 | 2/2002 | Tamura |
| 2002/0029193 A1 | 3/2002 | Ranjan et al. |
| 2003/0074315 A1 | 4/2003 | Lam |
| 2003/0115155 A1 | 6/2003 | Doran |
| 2004/0039701 A1 | 2/2004 | Nakamura et al. |
| 2004/0068436 A1 | 4/2004 | Boubek et al. |
| 2004/0172279 A1 | 9/2004 | Carolan et al. |
| 2004/0177036 A1 | 9/2004 | Nutahara et al. |
| 2004/0243520 A1 | 12/2004 | Bishop et al. |
| 2005/0149436 A1 | 7/2005 | Elterich |
| 2005/0222961 A1 | 10/2005 | Staib et al. |
| 2005/0234820 A1 | 10/2005 | MacKouse |
| 2005/0256802 A1 | 11/2005 | Ammermann et al. |
| 2006/0004670 A1 | 1/2006 | McKenney et al. |
| 2006/0015512 A1 | 1/2006 | Alon et al. |
| 2006/0112009 A1 | 5/2006 | Ehrhart et al. |
| 2006/0116949 A1 | 6/2006 | Wehunt et al. |
| 2006/0136901 A1 | 6/2006 | Nichols |
| 2006/0165060 A1 | 7/2006 | Dua |
| 2006/0218086 A1 | 9/2006 | Campbell et al. |
| 2006/0242058 A1 | 10/2006 | Torto |
| 2007/0005498 A1 | 1/2007 | Cataline et al. |
| 2007/0011099 A1 | 1/2007 | Sheehan |
| 2007/0198406 A1 | 8/2007 | Bishop et al. |
| 2007/0198432 A1 | 8/2007 | Pitroda et al. |
| 2007/0255652 A1 | 11/2007 | Tumminaro et al. |
| 2008/0015982 A1 | 1/2008 | Sokolic et al. |
| 2008/0027844 A1 | 1/2008 | Little et al. |
| 2008/0046361 A2 | 2/2008 | Bent et al. |
| 2008/0133376 A1 | 6/2008 | Hill |
| 2008/0154772 A1 | 6/2008 | Carlson |
| 2008/0162361 A1 | 7/2008 | Sklovsky et al. |
| 2008/0167965 A1 | 7/2008 | Von Nothaus et al. |
| 2008/0207124 A1 | 8/2008 | Raisanen et al. |
| 2008/0255947 A1 | 10/2008 | Friedman |
| 2008/0256054 A1 | 10/2008 | Saaty |
| 2008/0301037 A1 | 12/2008 | Monk |
| 2009/0055269 A1 | 2/2009 | Baron |
| 2009/0055313 A1 | 2/2009 | Elterich |
| 2009/0157517 A1 | 6/2009 | Davis |
| 2009/0192940 A1 | 7/2009 | Mann, III et al. |
| 2009/0281948 A1 | 11/2009 | Carlson |
| 2009/0282022 A1 | 11/2009 | Bennett |
| 2009/0287922 A1 | 11/2009 | Herwono et al. |
| 2010/0023450 A1 | 1/2010 | Scipioni |
| 2010/0042538 A1 | 2/2010 | Dheer et al. |
| 2010/0050271 A1 | 2/2010 | Saarisalo |
| 2010/0063893 A1 | 3/2010 | Townsend |
| 2010/0138341 A1 | 6/2010 | Solomon et al. |
| 2010/0197224 A1 | 8/2010 | Landenniemi et al. |
| 2010/0217682 A1 | 8/2010 | Chan |
| 2010/0274687 A1 | 10/2010 | Ghosh et al. |
| 2010/0275265 A1 | 10/2010 | Fiske et al. |
| 2010/0306091 A1 | 12/2010 | Homer et al. |
| 2010/0327054 A1 | 12/2010 | Hammad |
| 2011/0004547 A1 | 1/2011 | Giordano et al. |
| 2011/0010292 A1 | 1/2011 | Giordano et al. |
| 2011/0040686 A1 | 2/2011 | Carlson |
| 2011/0258686 A1 | 10/2011 | Raj et al. |
| 2011/0295662 A1 | 12/2011 | Harris |
| 2011/0313921 A1 | 12/2011 | Dheer et al. |
| 2012/0022973 A1 | 1/2012 | Makhotin et al. |
| 2012/0078788 A1 | 3/2012 | Gandhi |
| 2012/0084205 A1 | 4/2012 | Dheer et al. |
| 2012/0095852 A1 | 4/2012 | Bauer et al. |
| 2012/0116957 A1 | 5/2012 | Zanzot et al. |
| 2012/0116967 A1 | 5/2012 | Klein et al. |
| 2012/0123940 A1 | 5/2012 | Killian et al. |
| 2012/0209749 A1 | 8/2012 | Hammad et al. |
| 2012/0215604 A1 | 8/2012 | Canetto |
| 2012/0284175 A1 | 11/2012 | Wilson et al. |
| 2013/0018779 A1 | 1/2013 | Laquerre et al. |
| 2013/0066777 A1 | 3/2013 | Richards |
| 2013/0124364 A1 | 5/2013 | Mittal |
| 2013/0198061 A1 | 8/2013 | Dheer et al. |
| 2013/0238489 A1 | 9/2013 | Bouey et al. |
| 2013/0238490 A1 | 9/2013 | Bouey et al. |
| 2013/0238492 A1 | 9/2013 | Muthu et al. |
| 2013/0262309 A1 | 10/2013 | Gadotti |
| 2013/0346302 A1 | 12/2013 | Purves et al. |
| 2014/0012754 A1 | 1/2014 | Hanson et al. |
| 2014/0089188 A1 | 3/2014 | Rao |
| 2014/0114855 A1 | 4/2014 | Bajaj et al. |
| 2014/0222681 A1 | 8/2014 | Klein et al. |
| 2014/0279446 A1 | 9/2014 | Dorsey et al. |
| 2014/0310171 A1 | 10/2014 | Grossman et al. |
| 2014/0337235 A1 | 11/2014 | Van Heerden et al. |
| 2015/0262183 A1 * | 9/2015 | Gervais ............... G06Q 20/10 705/44 |
| 2016/0012465 A1 | 1/2016 | Sharp |

OTHER PUBLICATIONS

European Search Report dated Aug. 9, 2010 for European Application No. EP 10 25 0832.

State Intellectual Property Office of the People's Republic of China. Chinese Application No. 201010170013.5. Chinese Office Action dated Dec. 10, 2012. Name of Applicant: Bank of America Corporation. Chinese Language. 10 pages.

State Intellectual Property Office of the People's Republic of China. Chinese Application No. 201010170016.9. Chinese Office Action dated Dec. 12, 2012. Name of Applicant: Bank of America Corporation. Chinese Lanuage. 10 pages.

Statement in Accordance with the Notice from the European Patent Office dated Oct. 1, 2007 concerning Business Methods, Official Journal of the European Patent Office, Document No. XP007905525, dated Nov. 1, 2007; pp. 592-593.

* cited by examiner

322

```
☐ INCLUDE A TRANSACTION DESCRIPTION
    ↓
☑ INCLUDE A MEMO TRANSACTION DESCRIPTION
   ┌─────────────────────────────────────────────────────────────────────┐
   │ TRANSACTION DESCRIPTION                                             │
   │ DO NOT INCLUDE PERSONAL OR ACCOUNT INFO, OR SPECIAL CHARACTERS "@, <, >, -, #, /, &" │
   └─────────────────────────────────────────────────────────────────────┘
    ↓
☑ INCLUDE A TRANSACTION DESCRIPTION
   ┌─────────────────────────────────────────────────────────────────────┐
   │ TRANSACTION DESCRIPTION                                             │
   │                                                              0/100  │
   └─────────────────────────────────────────────────────────────────────┘

☑ INCLUDE A TRANSACTION DESCRIPTION (MEMO)
   ┌─────────────────────────────────────────────────────────────────────┐
   │ TRANSACTION DESCRIPTION                                             │
   │ VACATION                                                     8/100  │
   └─────────────────────────────────────────────────────────────────────┘
```

*FIG. 4B*

○ OTHER AMOUNT
↓
✓ OTHER AMOUNT

| AMOUNT |

*FIG. 5B*

HOW MUCH?
○ MINIMUM PAYMENT
✓ LAST STATEMENT BALANCE
○ CURRENT BALANCE
○ OTHER AMOUNT

| FREQUENCY<br>MONTHLY, ON THE DUE DATE | ⇨ | DURATION<br>CONTINUE INDEFINITELY |

| START ON<br>FUTURE DATE 1 |

*FIG. 5C*

HOW MUCH?
- ☑ PAYMENT DUE
- ☐ ADDITIONAL PRINCIPAL
- ☐ ADDITIONAL ESCROW

FREQUENCY
MONTHLY, ON THE DUE DATE ⇨ DURATION
CONTINUE UNTIL LOAN IS PAID OFF

START ON
FUTURE DATE 1

*FIG. 6B*

ACCOUNT ACTIVITY MANAGEMENT SYSTEM

BACKGROUND

Existing online banking platforms provide the ability for a customer to view various account related activities that have transpired within any given account maintained by a respective financial institution. However, the format in which customers are allowed to view the activities is very limited. There exists a need for managing account activity, and more specifically account activity viewing, so that a customer can better examine the flow of money within the customer's account(s).

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention are directed to systems, methods, and computer program products for providing an account activity management system. An exemplary apparatus may comprise a memory; a computing processor; and a module stored in the memory, said module comprising instruction code executable by one or more computing processors, and configured to cause the one or more computing processors to provide access to an funds transfer management portal, whereby the funds transfer management portal interfaces with at least one database to access a customer's financial information for use in presenting account activity associated with at least one of the customer's accounts maintained by a financial institution; receive a request to view account activity, via the online banking platform, wherein the request specifies a format for viewing the account activity; in response to receiving the request to view account activity, retrieve data from the at least one database, wherein the data contains the customer's financial account activity information related to one or more funds transfers associated with the at least one account; and present the account activity, via the funds transfer management portal, wherein the account activity is presented in the requested format for viewing the account activity.

In some embodiments, the at least one transfer entry is a scheduled transfer and the module is further configured to cause the one or more processors to reschedule the at least one transfer entry in response to the customer moving, via an input device, the at least one transfer entry from a first day to a second day such that the at least one transfer entry is rescheduled to be processed on the second day.

In some embodiments, the requested format for viewing the account activity is a timeline view and the module is further configured to cause the one or more processors to present a consolidated timeline of the customer's transfer activity for a predetermined period of time.

In some embodiments, the timeline view comprises at least one transfer entry related to the one or more funds transfers associated with the at least one account, and the module is further configured to cause the one or more processors to determine the predetermined period of time for presenting the timeline view based at least in part of the account type of the at least one account.

In some embodiments, the timeline view comprises at least one transfer entry related to the one or more funds transfers associated with the at least one account, and the at least one transfer entry comprises a visual identifier based on at least one of the transfer type, and amount associated with the at least one transfer entry.

In some embodiments, the visual identifier is a graphed bar, and wherein the height of the graphed bar reflect the amount of the at least one transfer entry.

In some embodiments, the requested format for viewing the account activity is a calendar view and the module is further configured to cause the one or more processors to present a consolidated calendar of the customer's transfer activity for a predetermined period of time.

In some embodiments, the calendar view comprises at least one transfer entry related to the one or more funds transfers associated with the at least one account, and the module is further configured to cause the one or more processors to present detailed transaction information for at least one transfer entry in response receiving selection, by the customer, of a day within the calendar view.

In some embodiments, the calendar view comprises at least one transfer entry related to the one or more funds transfers associated with the at least one account, and the at least one transfer entry comprises a visual identifier based on at least one of the transfer type, and account associated with the at least one transfer entry.

In some embodiments, the requested format for viewing the account activity is a tiled view and the module is further configured to cause the one or more processors to present one or more consolidated tiled groups of the customer's transfer activity based on at least one parameter associated with the transfer activity.

In some embodiments, the requested format for viewing the account activity is a list view, and the module is further configured to cause the one or more processors to present a consolidated list of the customer's transfer activity for a predetermined period of time.

In some embodiments, the account activity comprises at least one transfer entry related to the one or more funds transfers associated with the at least one account, wherein the at least one transfer entry is a scheduled transfer, and the module is further configured to determine the at least one account will incur a negative balance as a result of the transfer; and present a warning message in conjunction with the at least one transfer entry.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
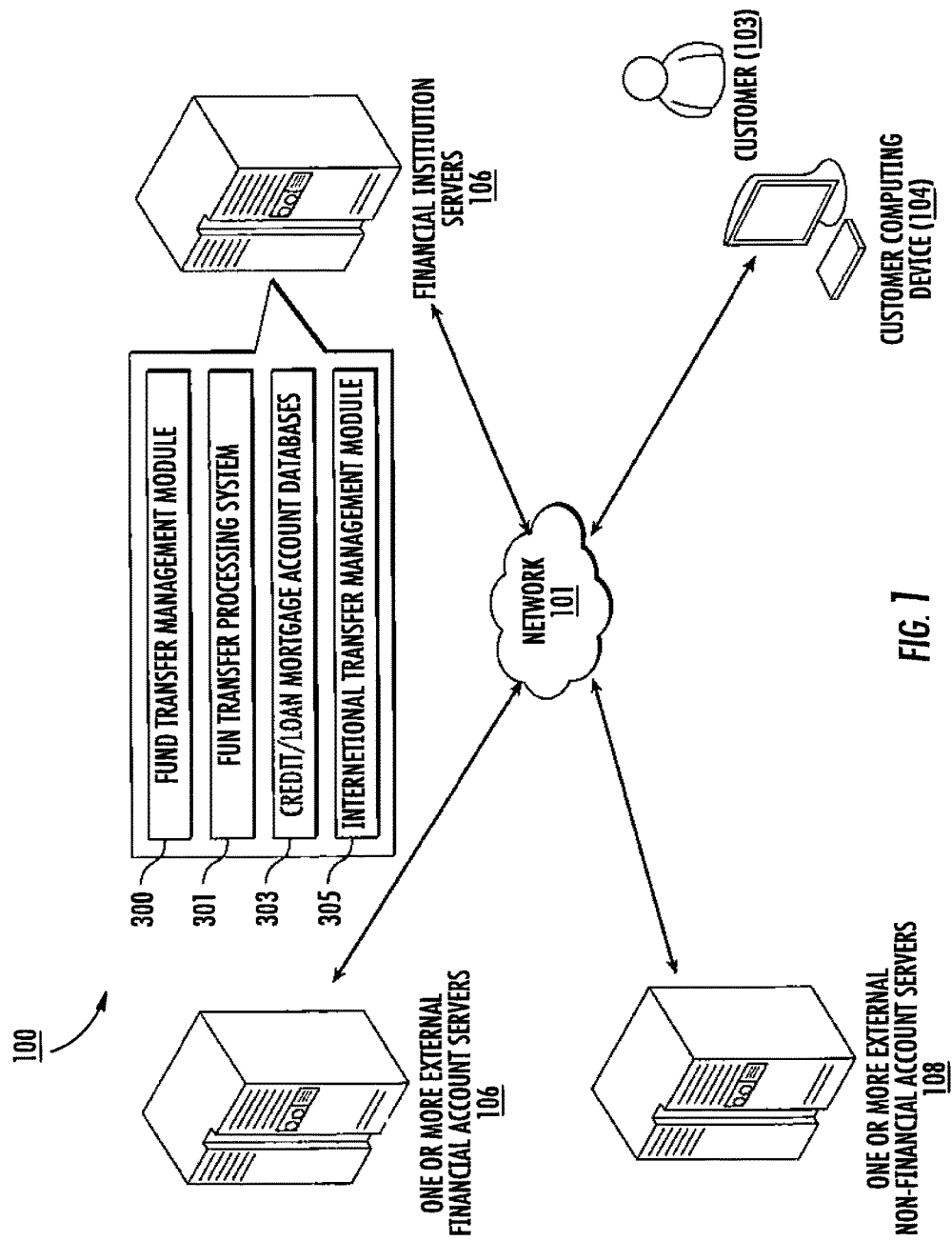
Figure 2A:
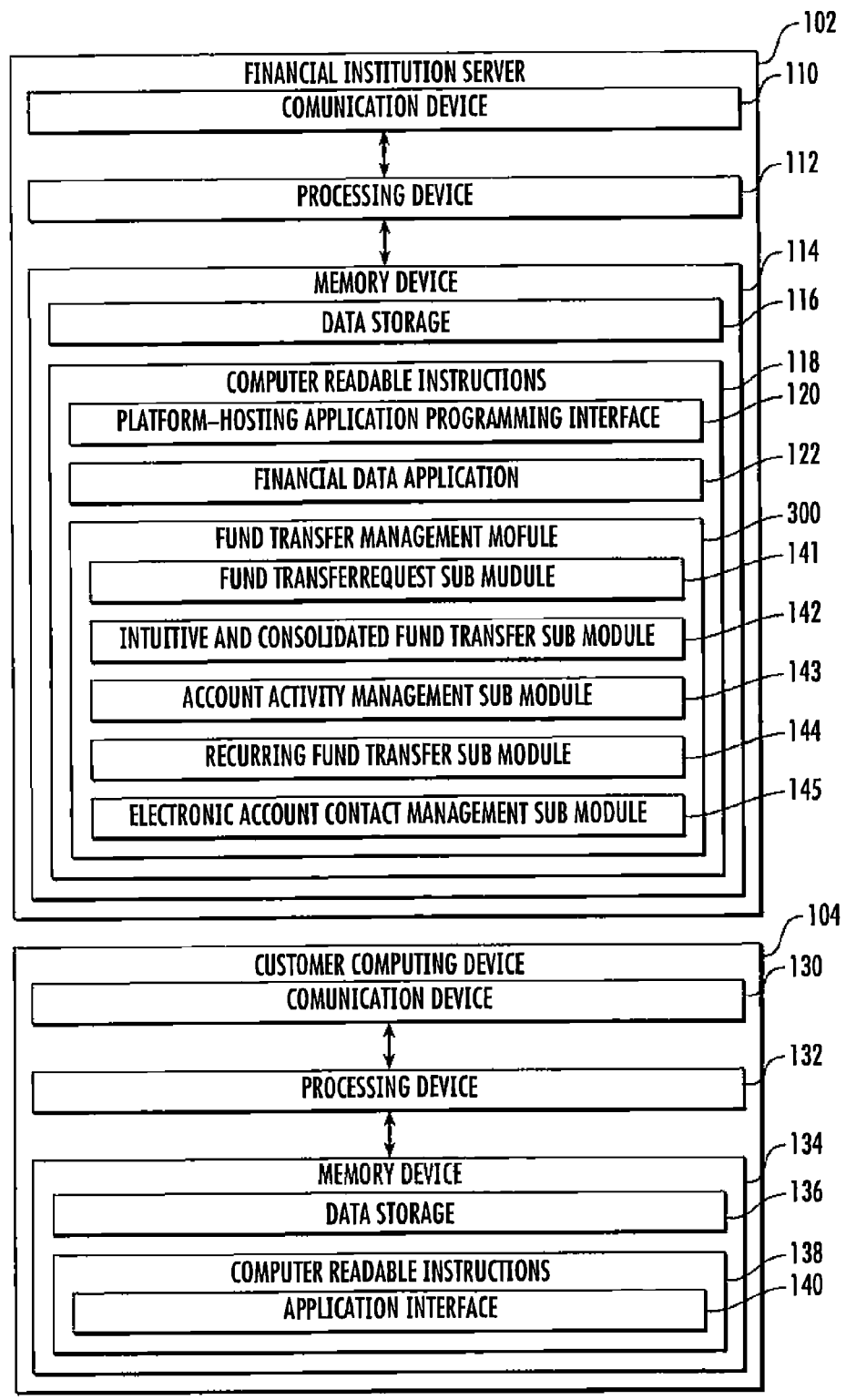
Figure 2B:
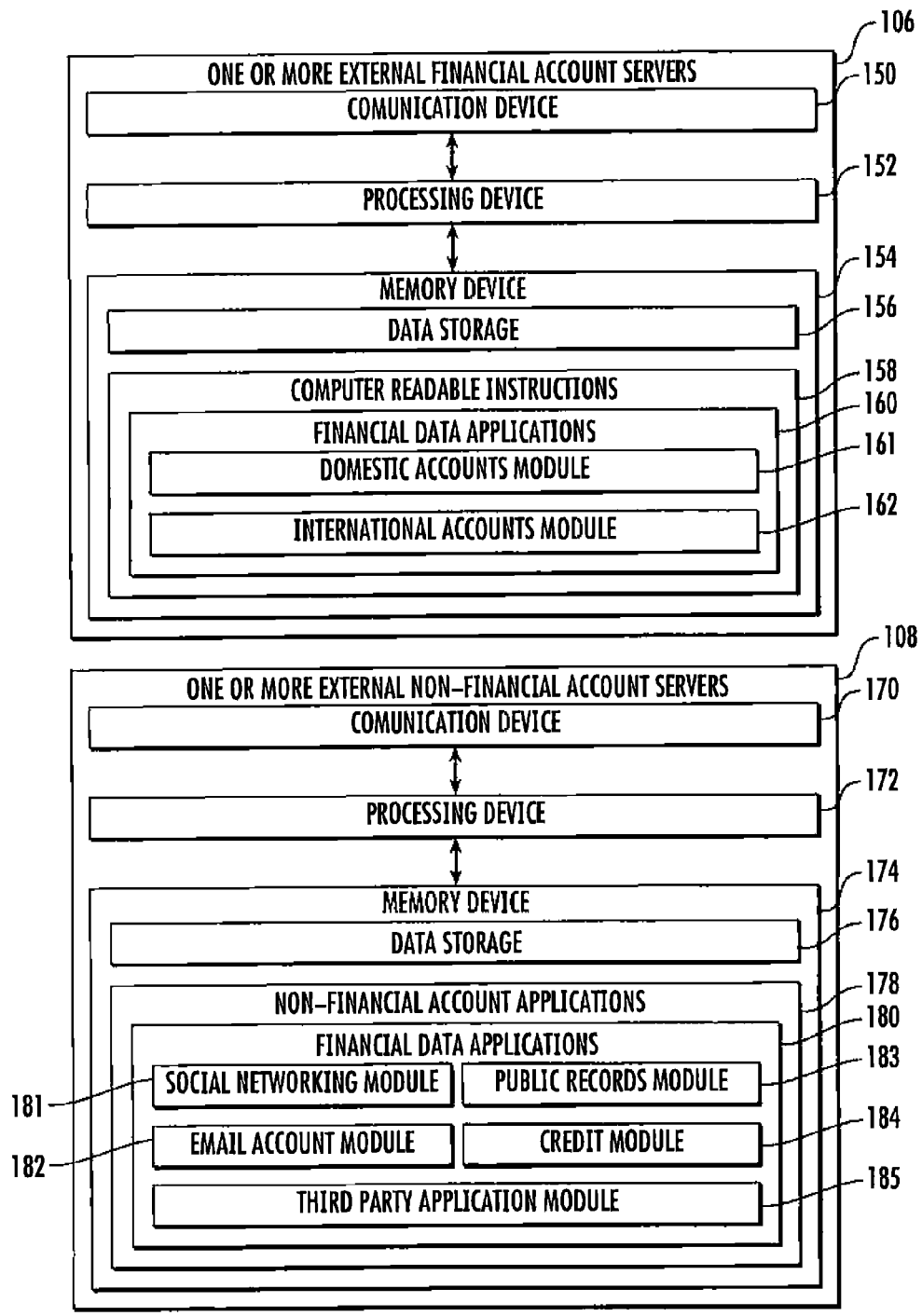
Figure 3A:
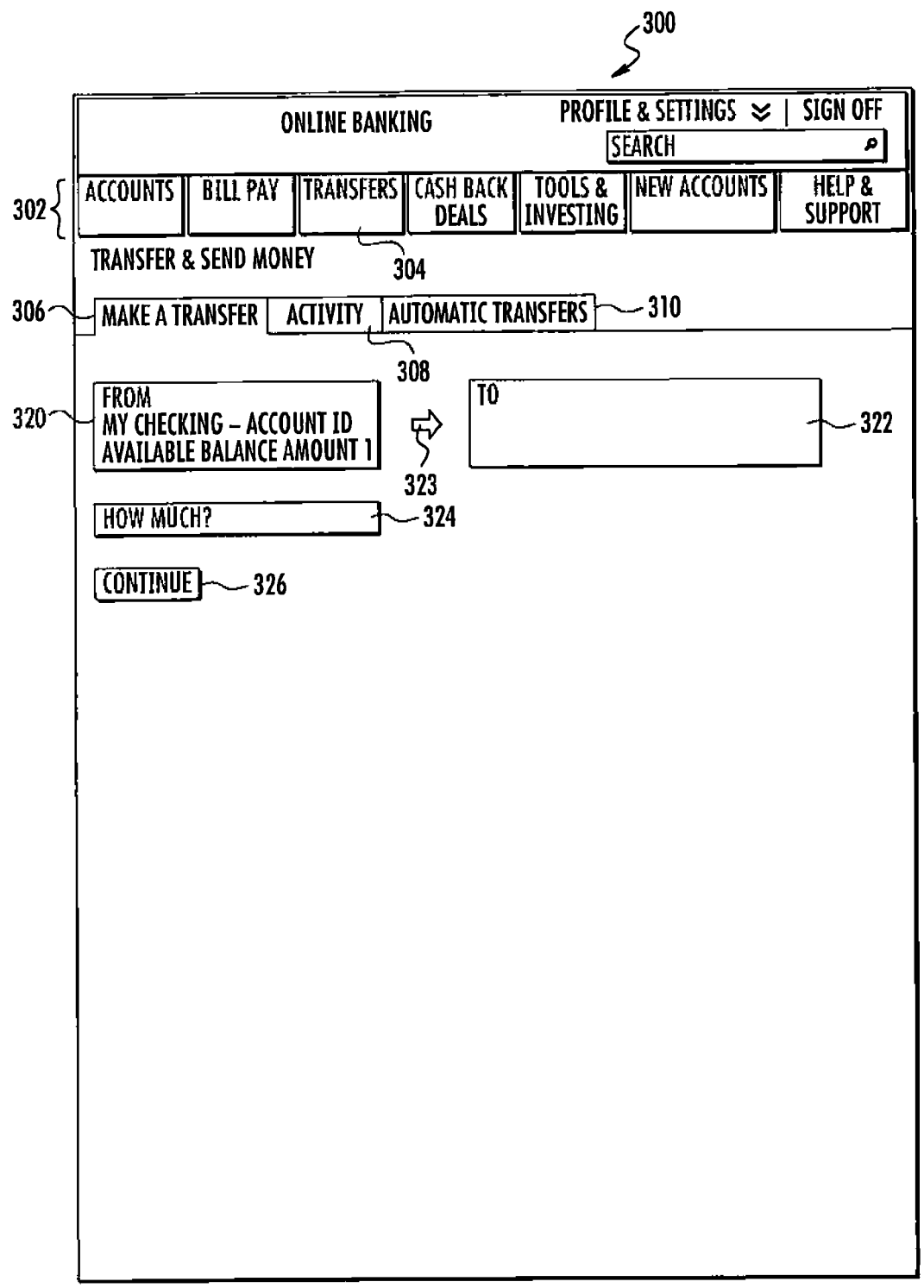
Figure 3B:
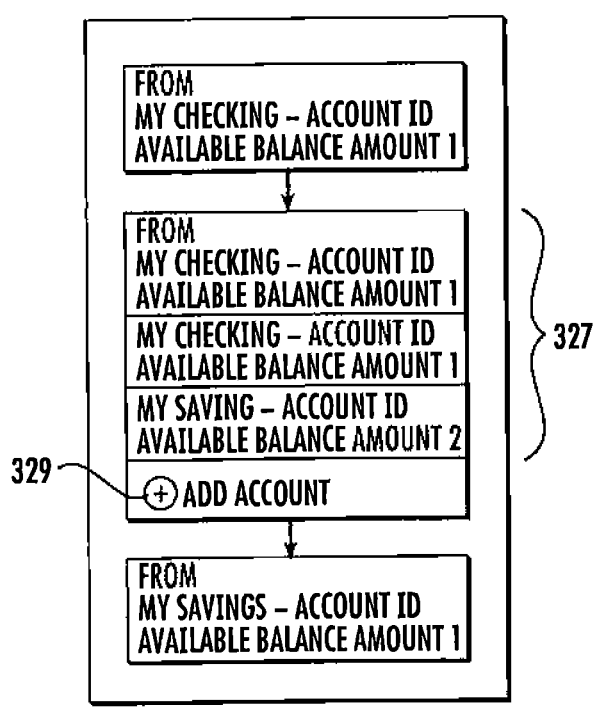
Figure 4A:
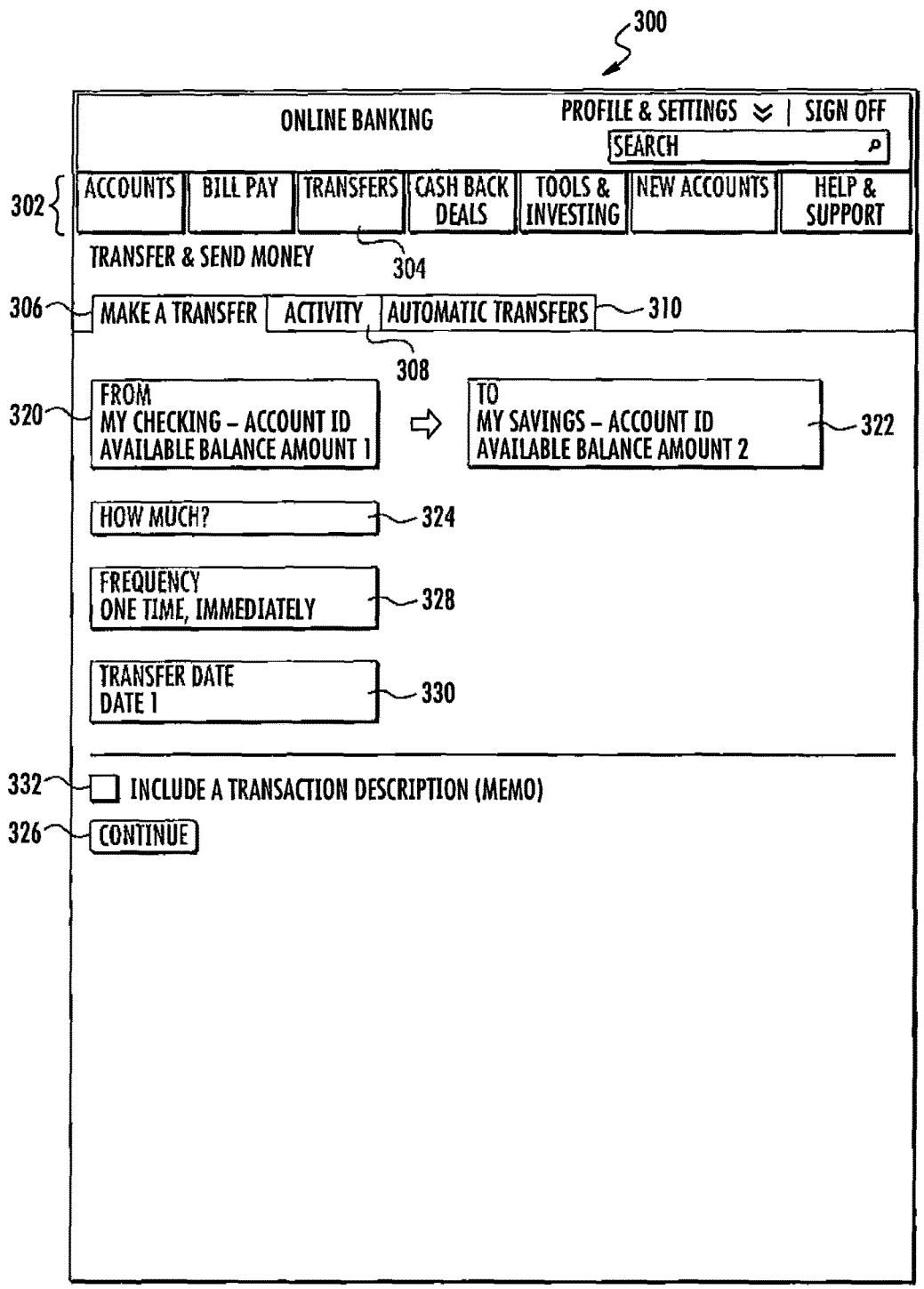
Figure 5A:
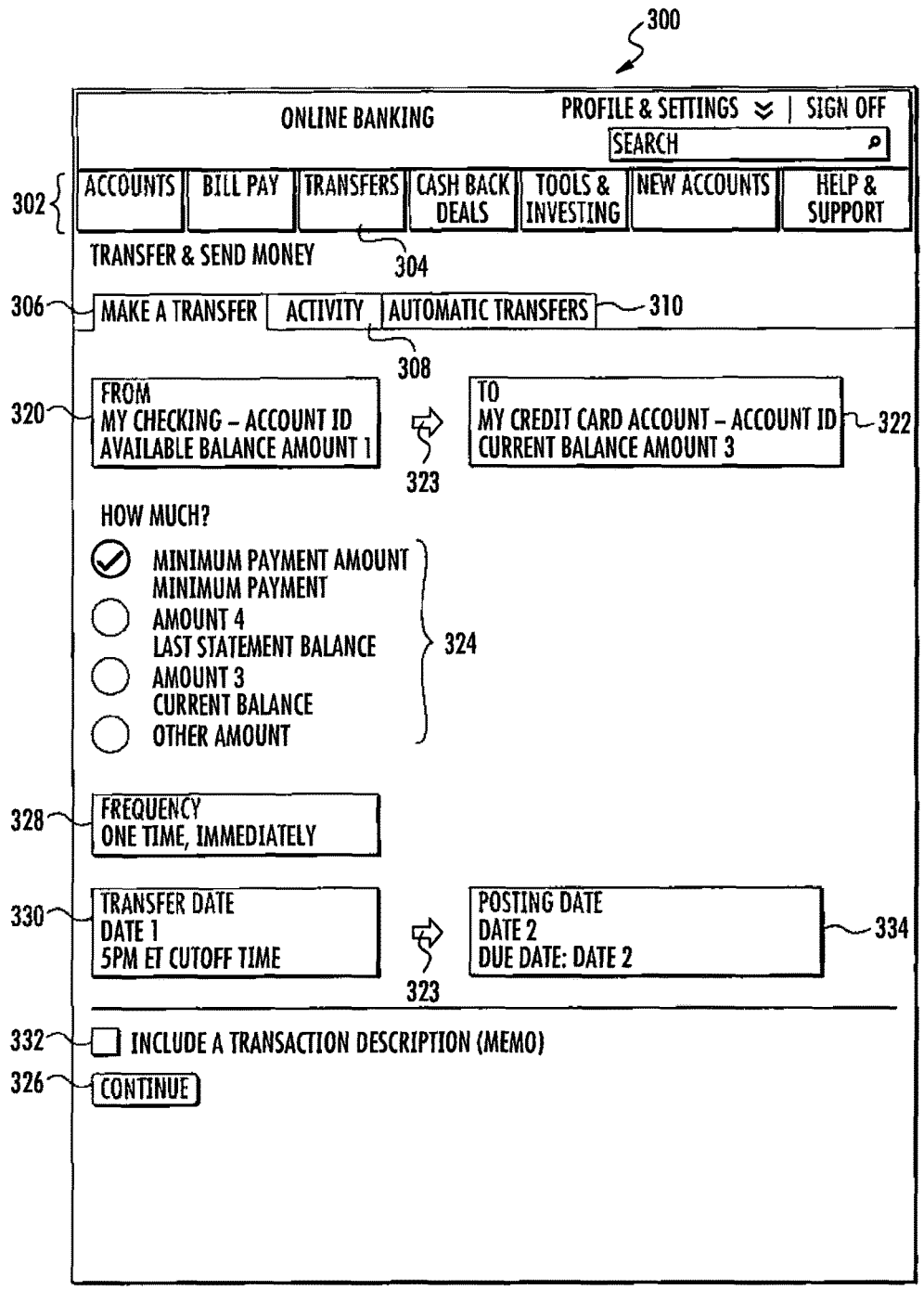
Figure 6A:
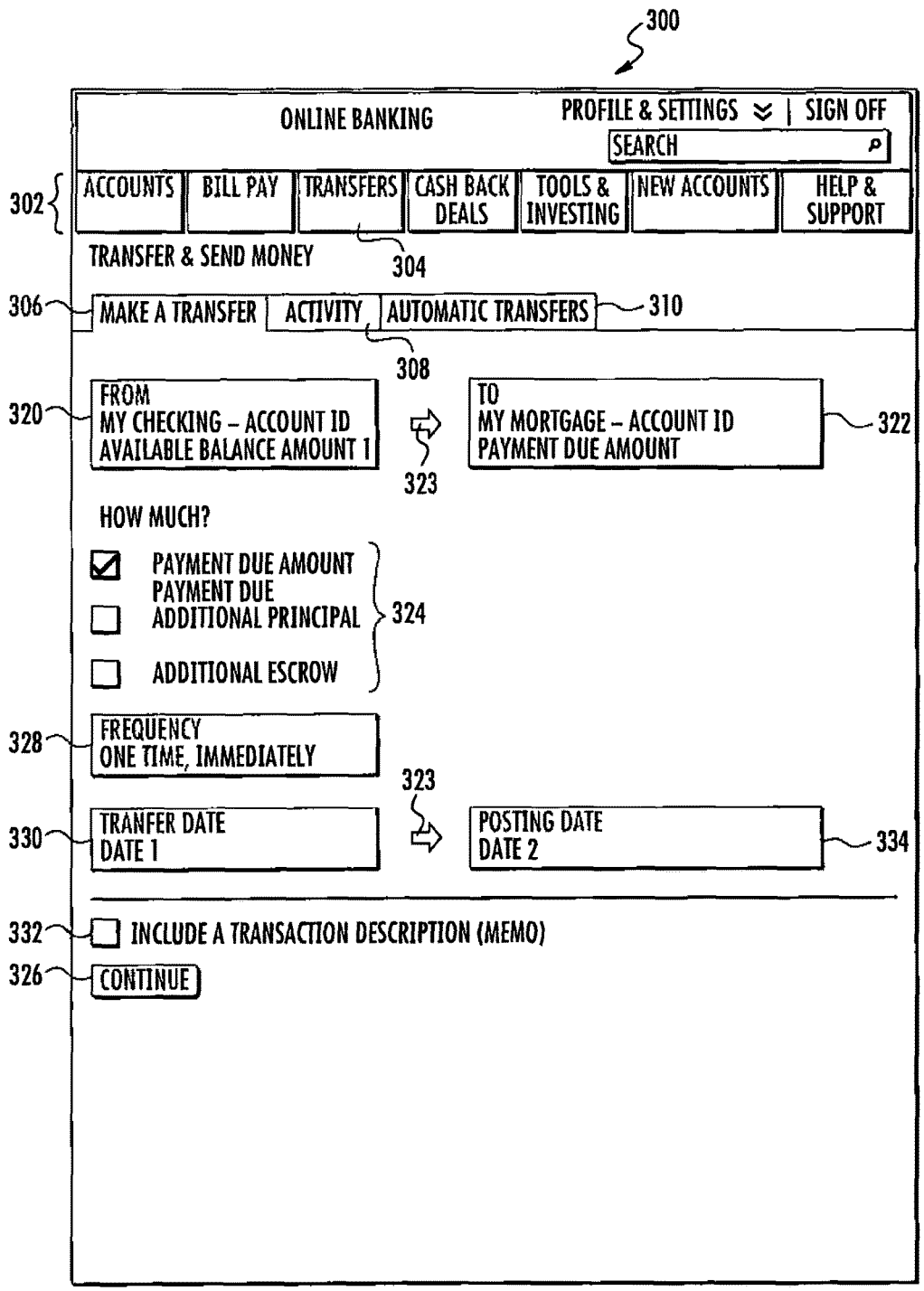
Figure 7A:
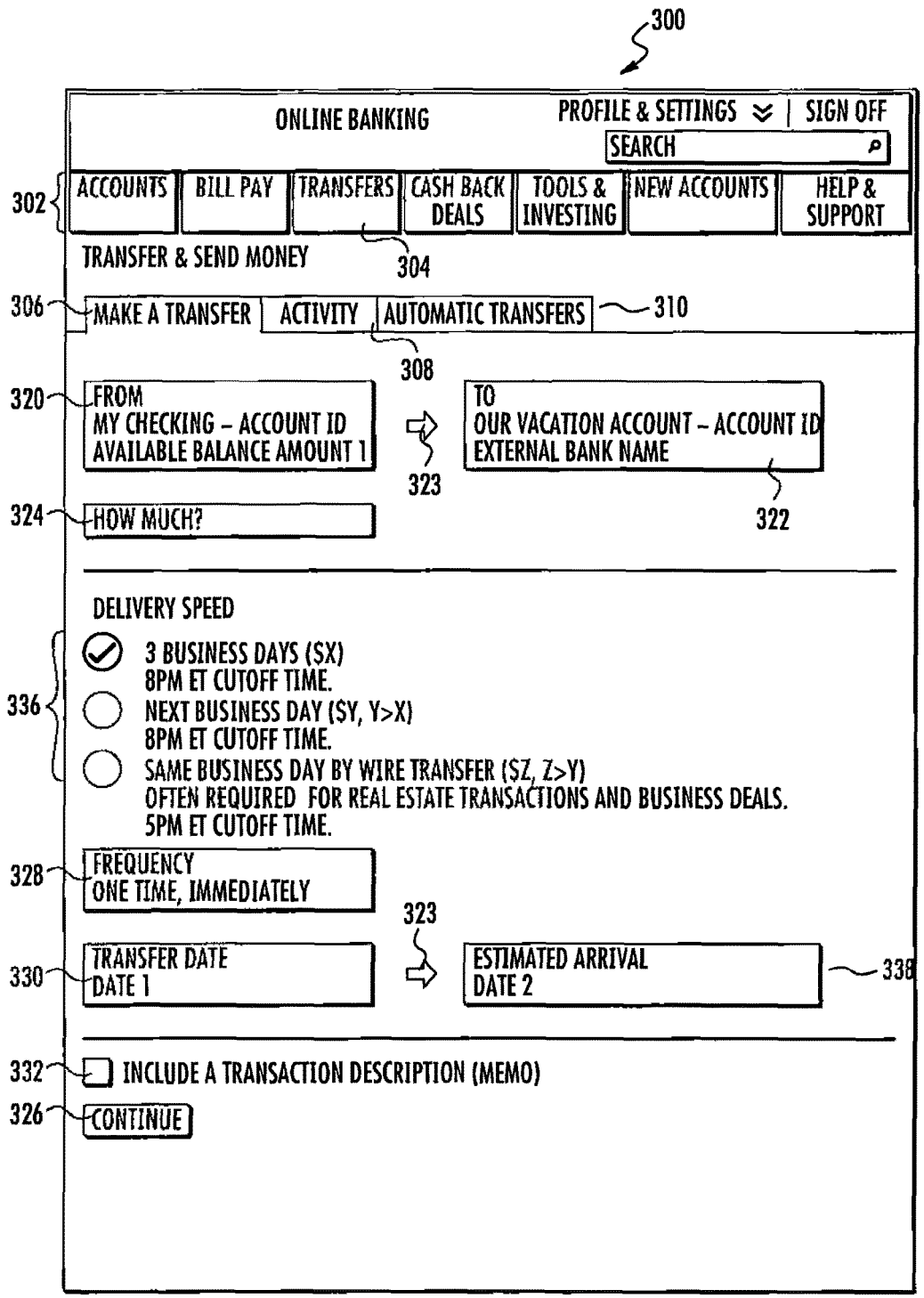
Figure 7B:
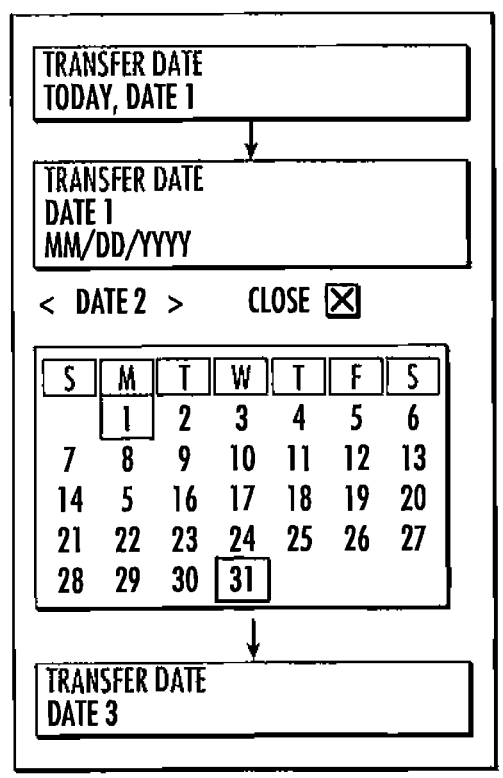
Figure 8:
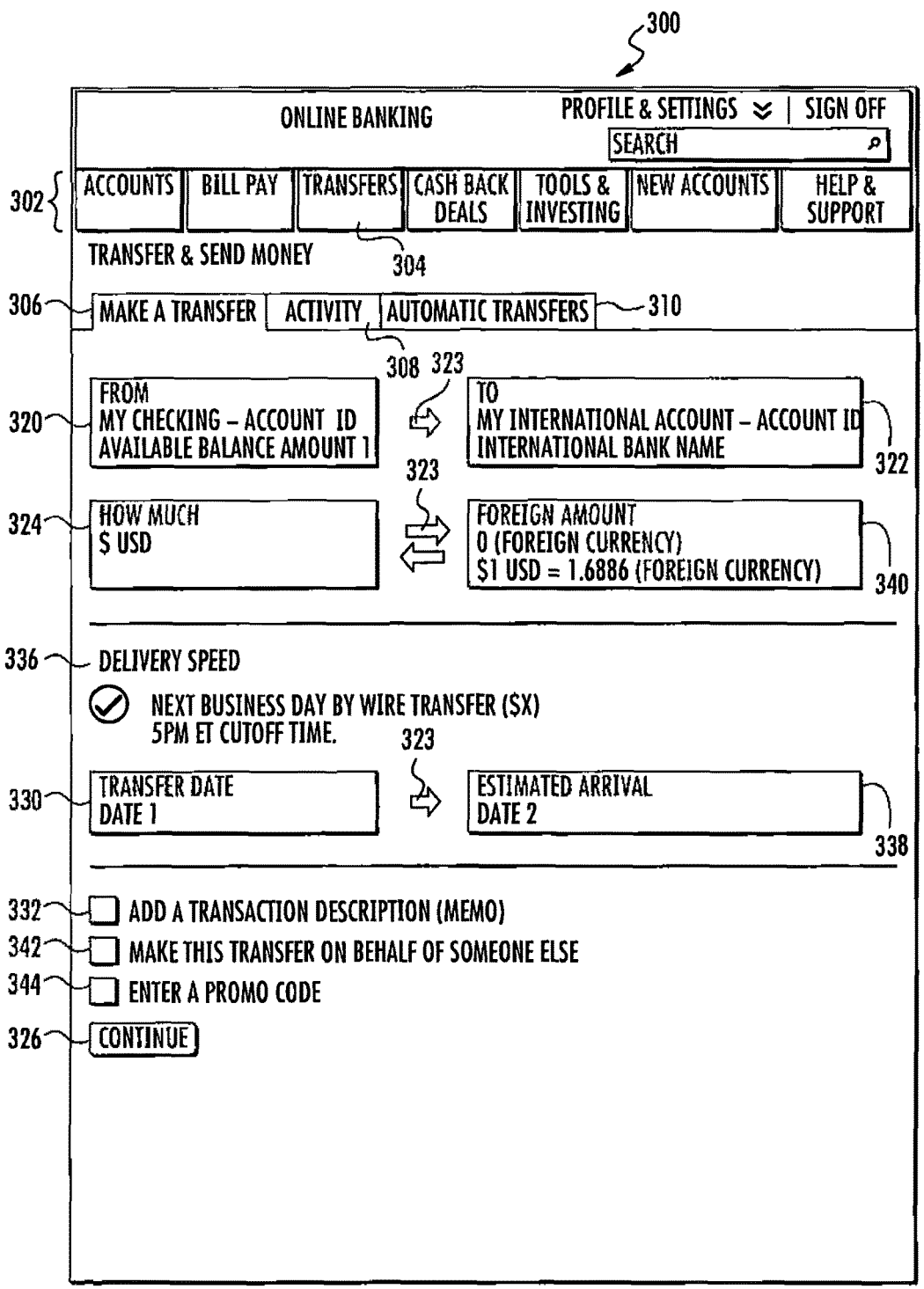
Figure 9A:
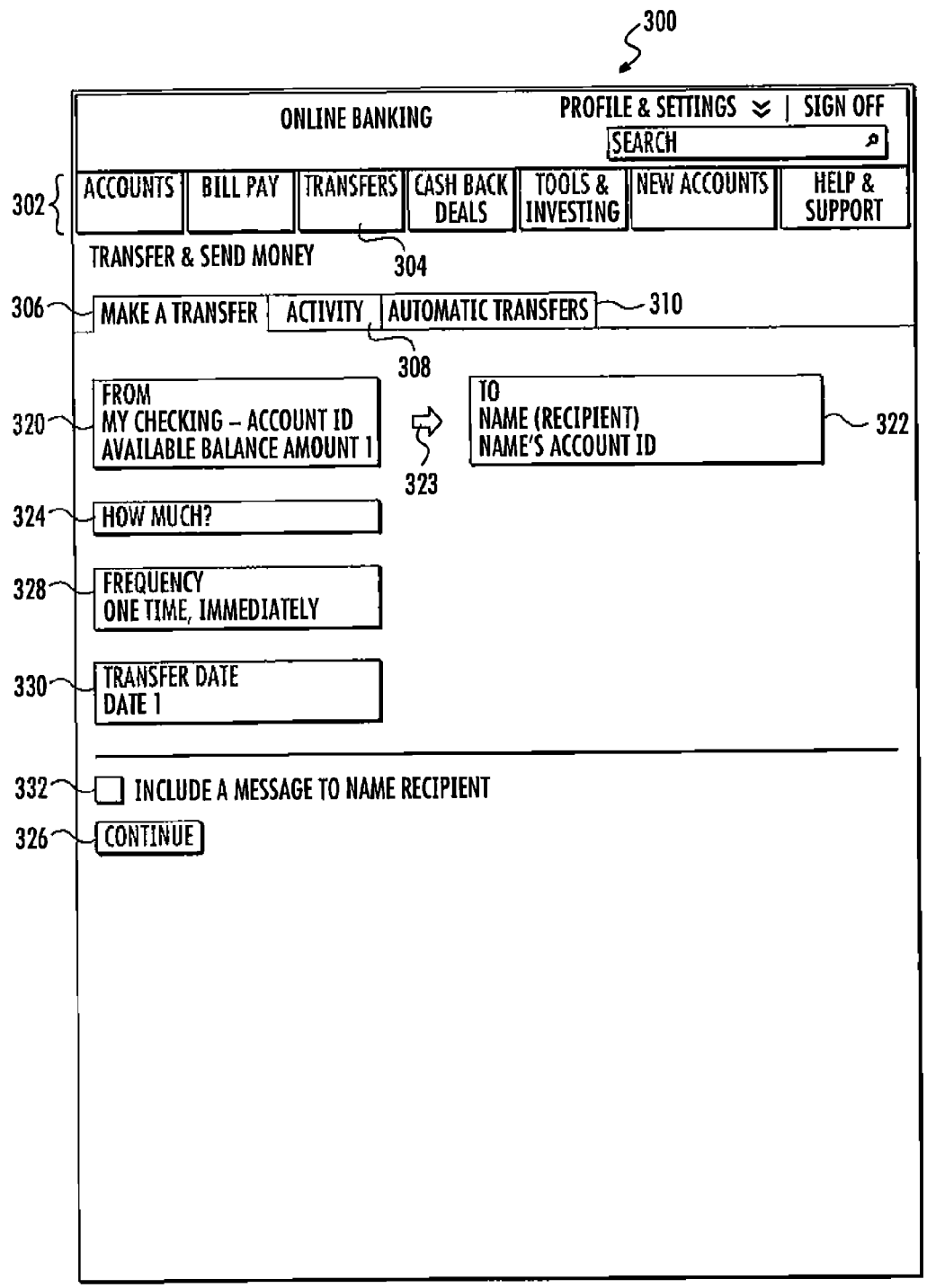
Figure 9B:
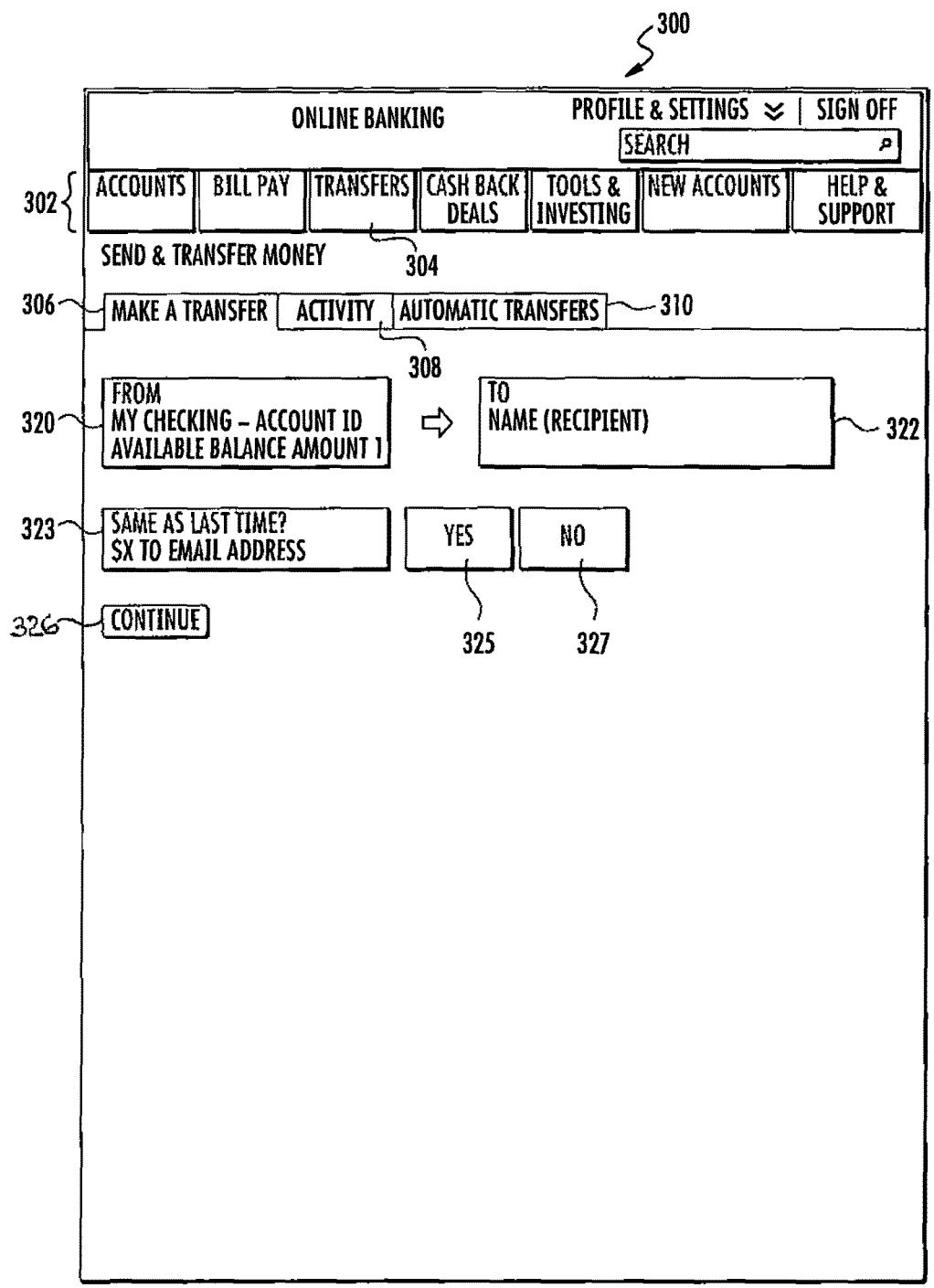
Figure 10:
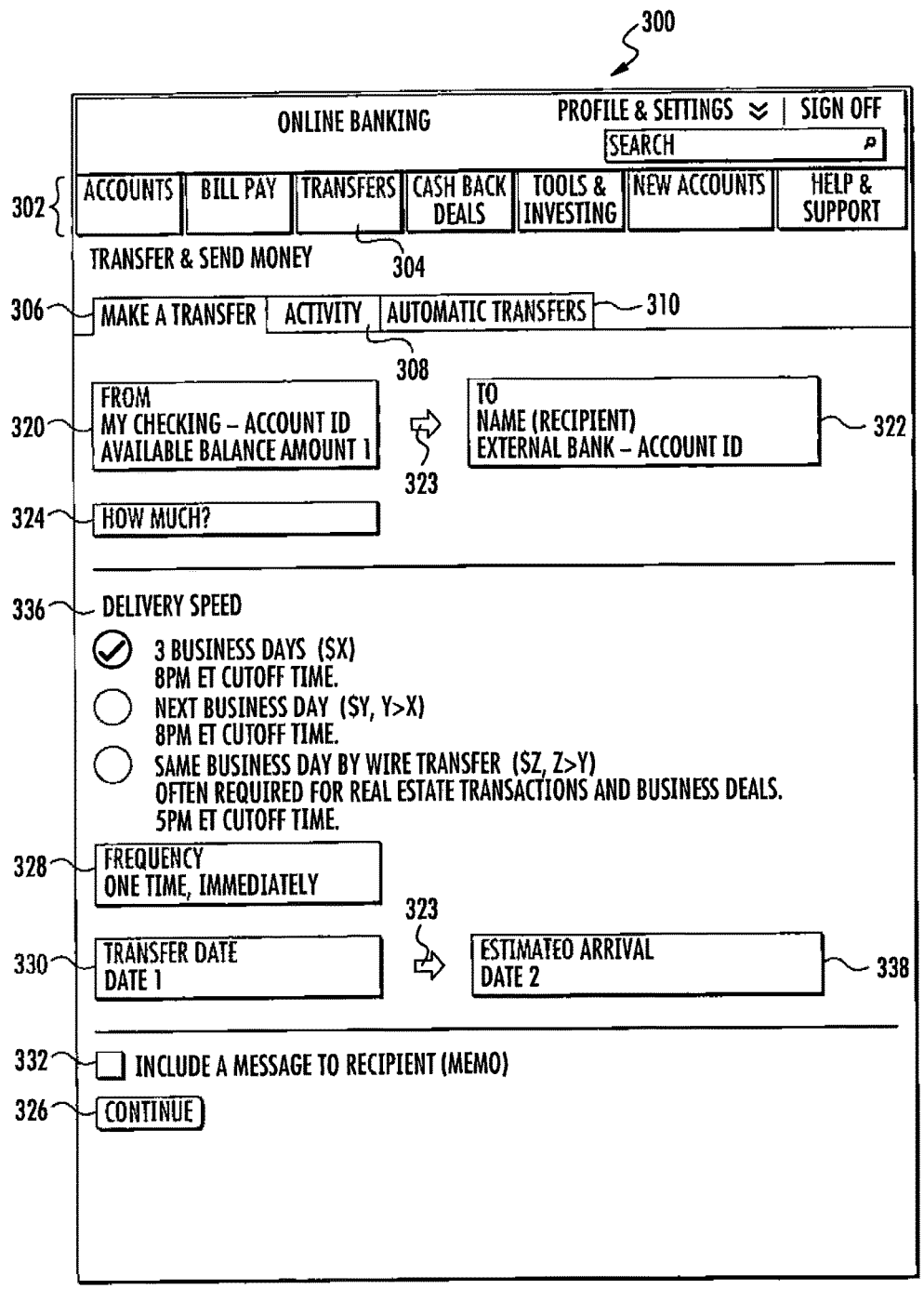
Figure 11:
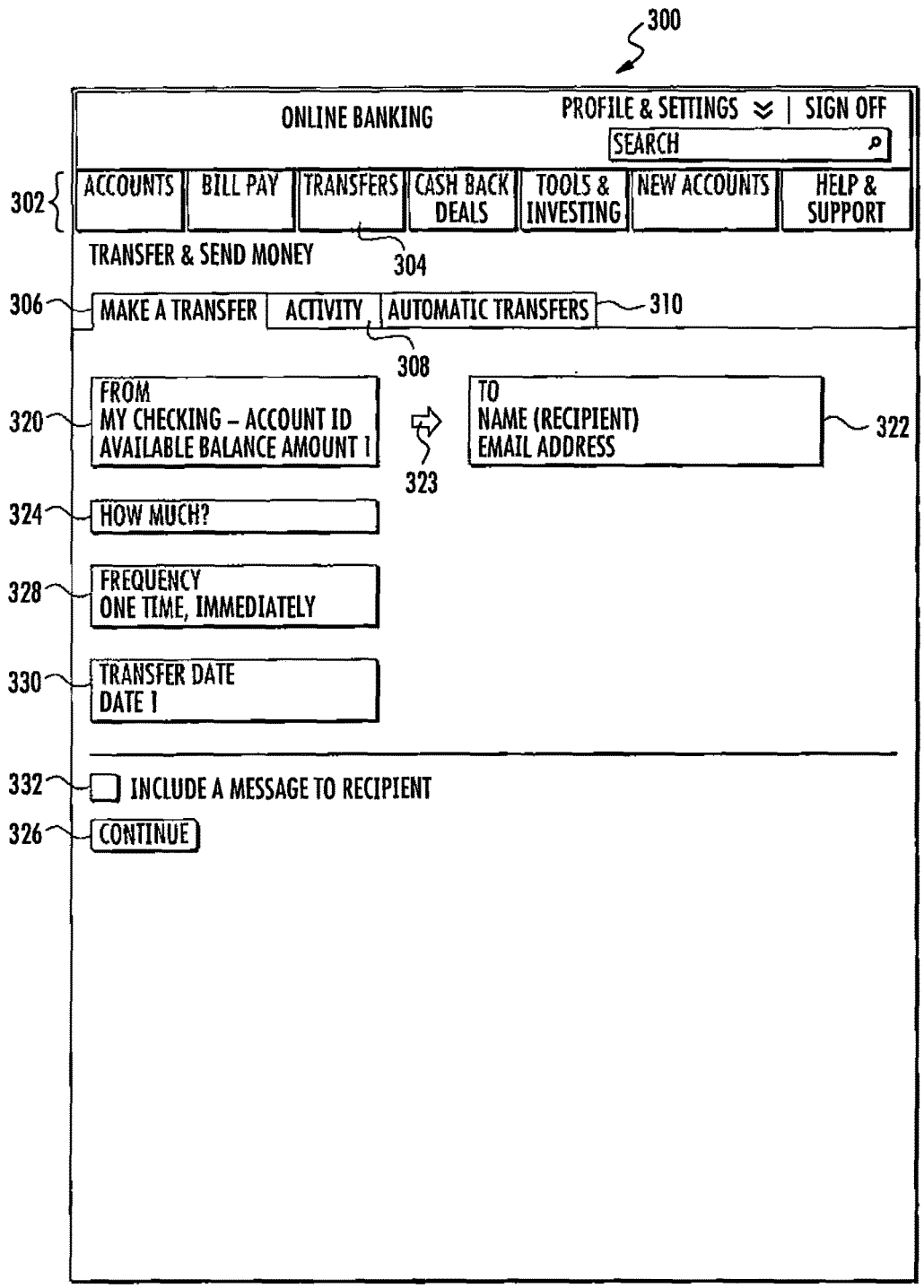
Figure 12:
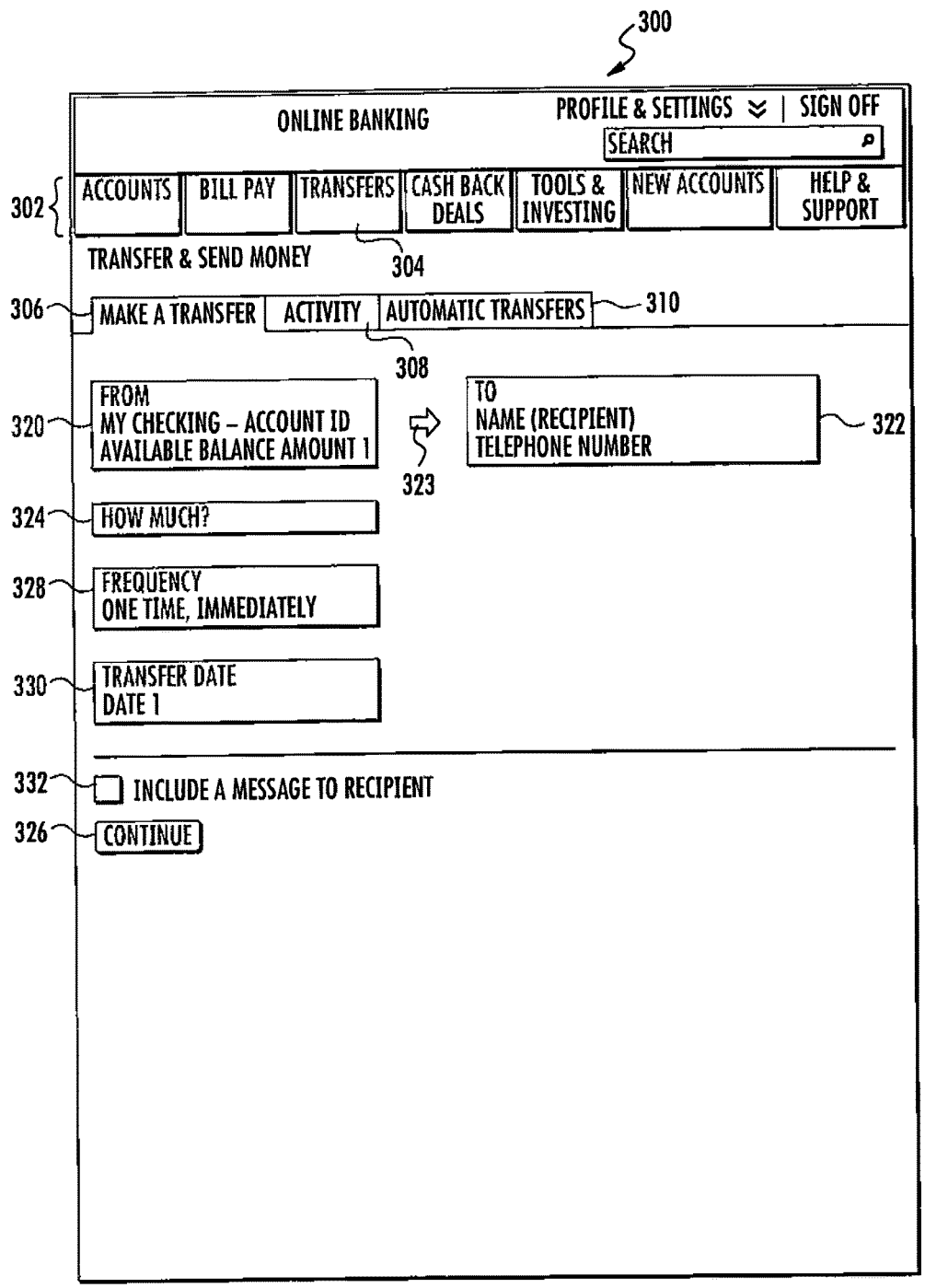
Figure 13:
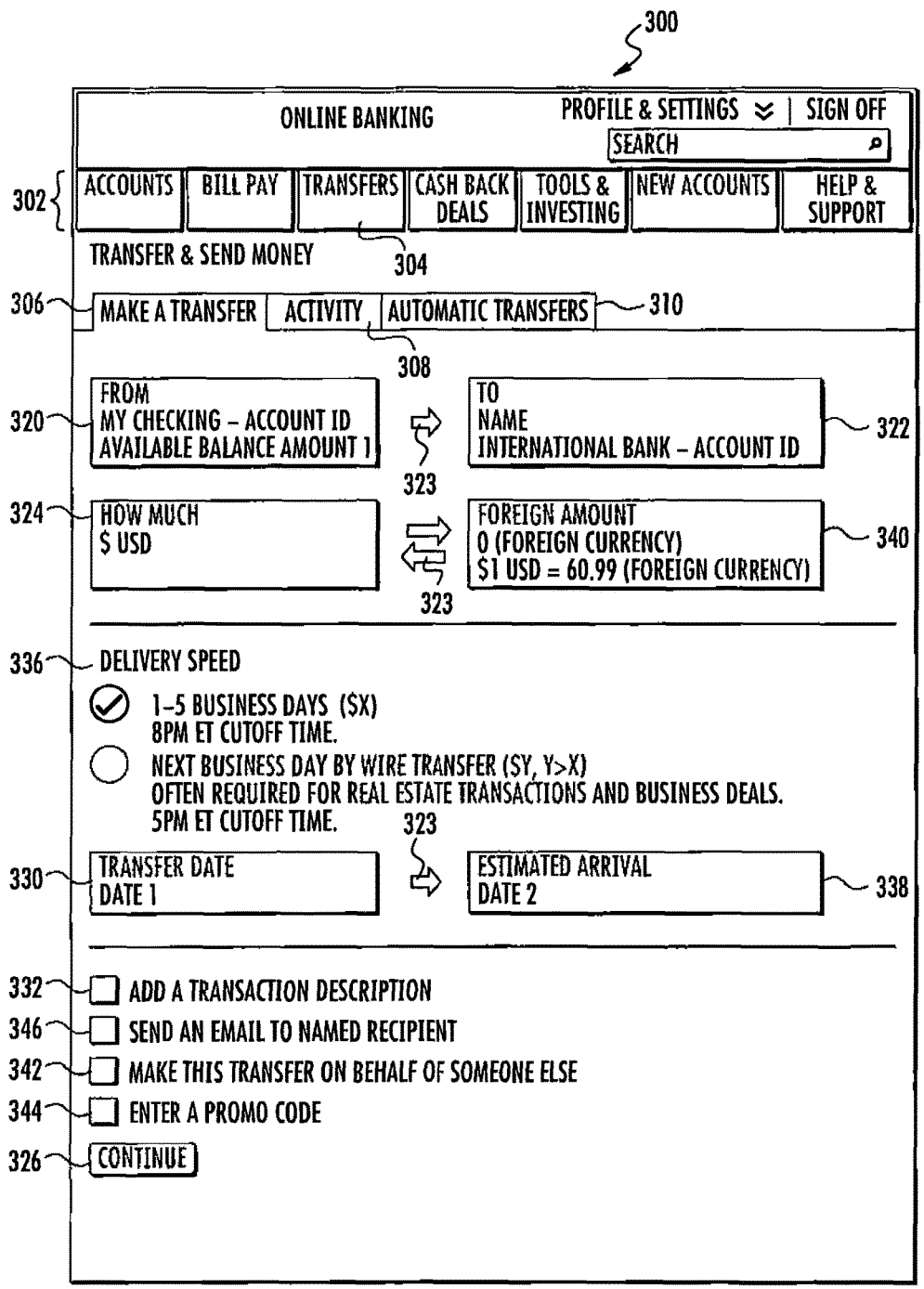
Figure 14:
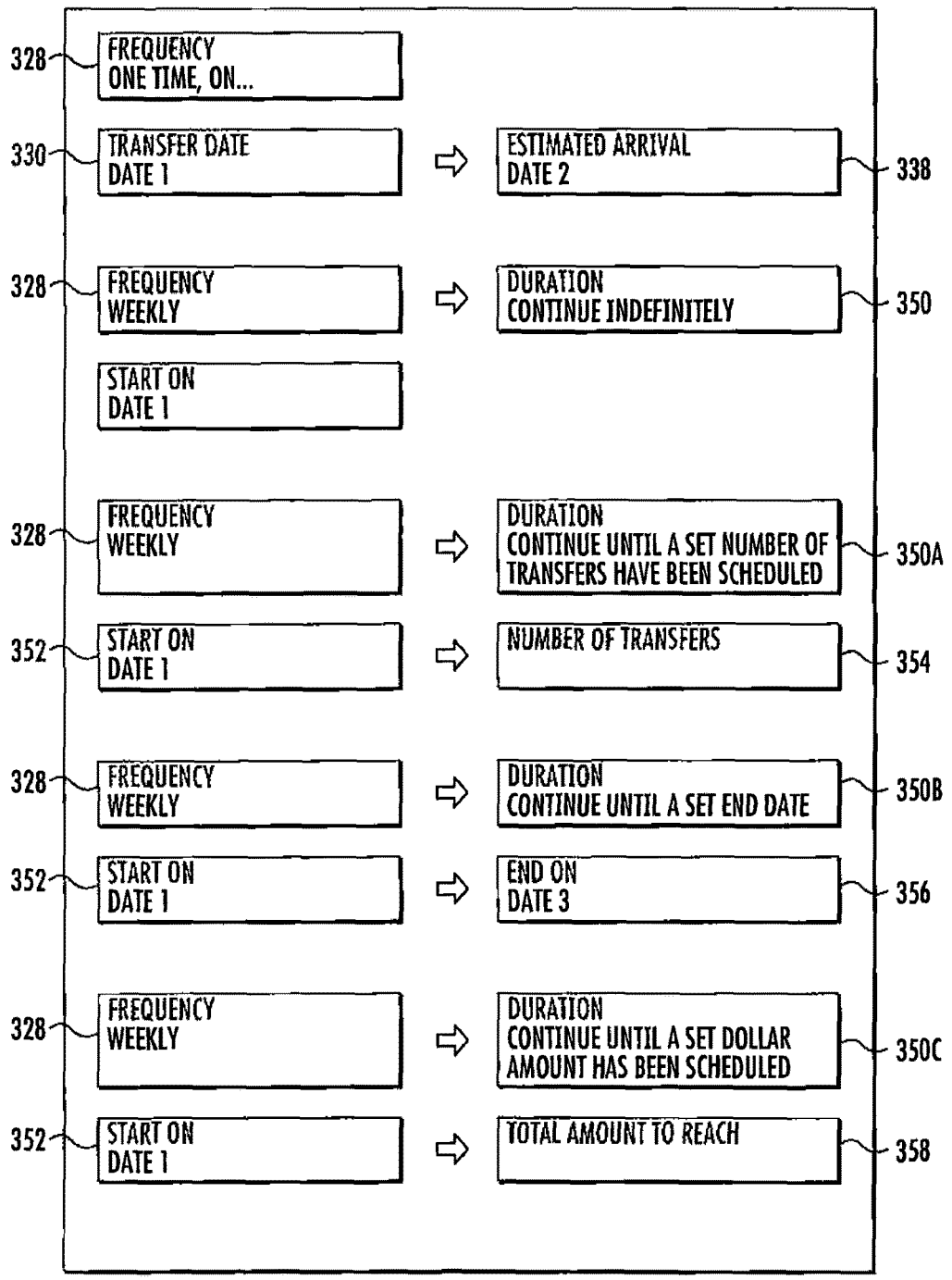
Figure 15A:
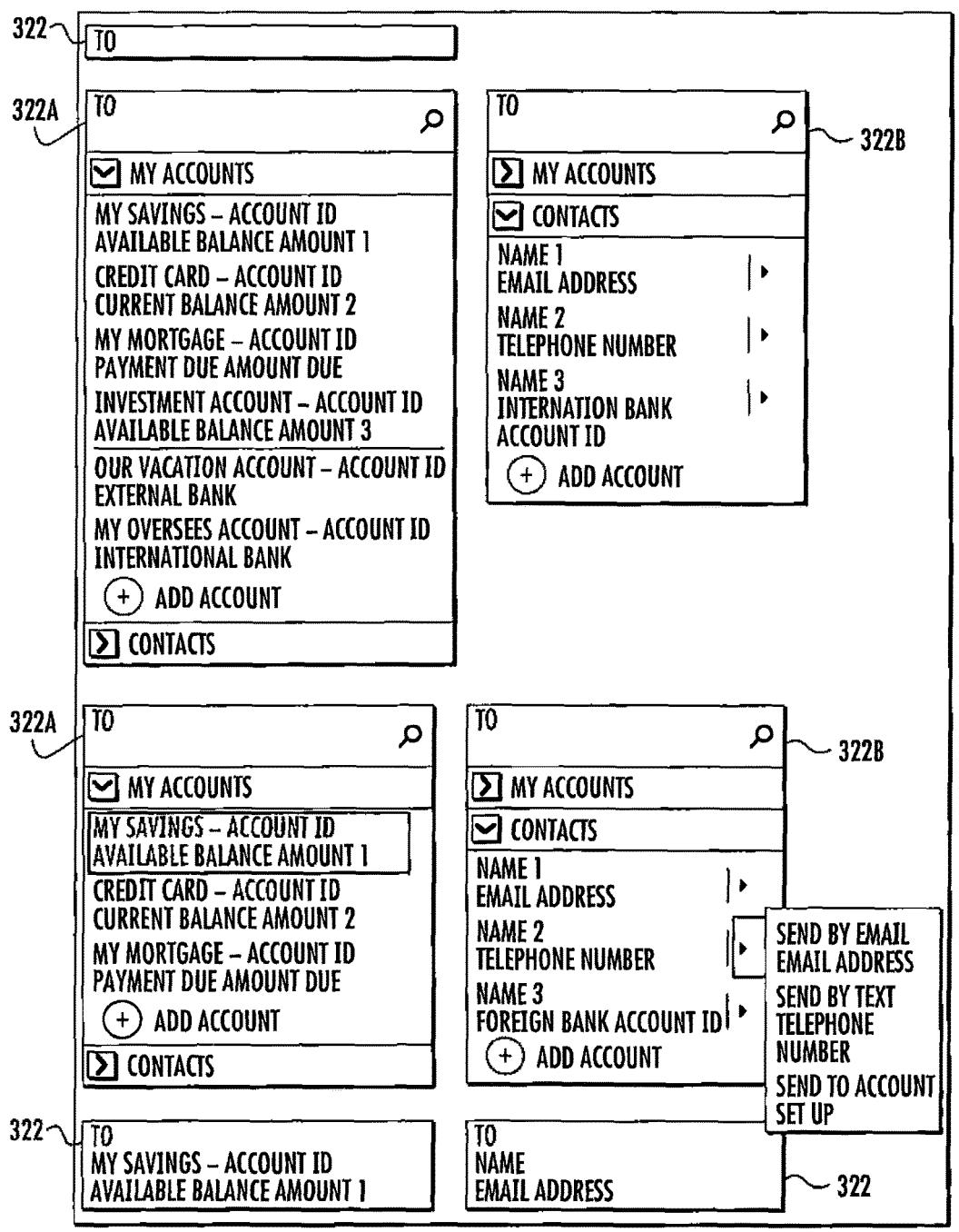
Figure 15B:
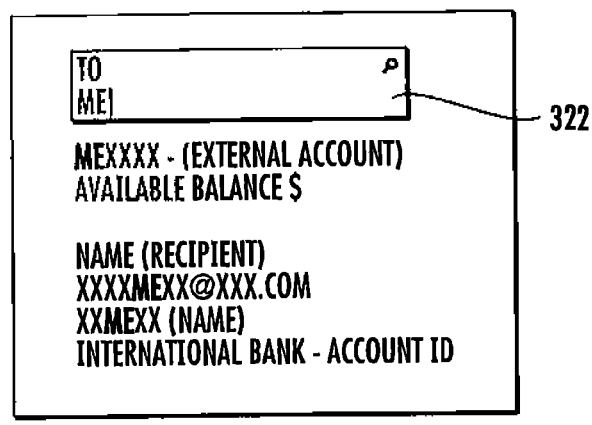
Figure 16:
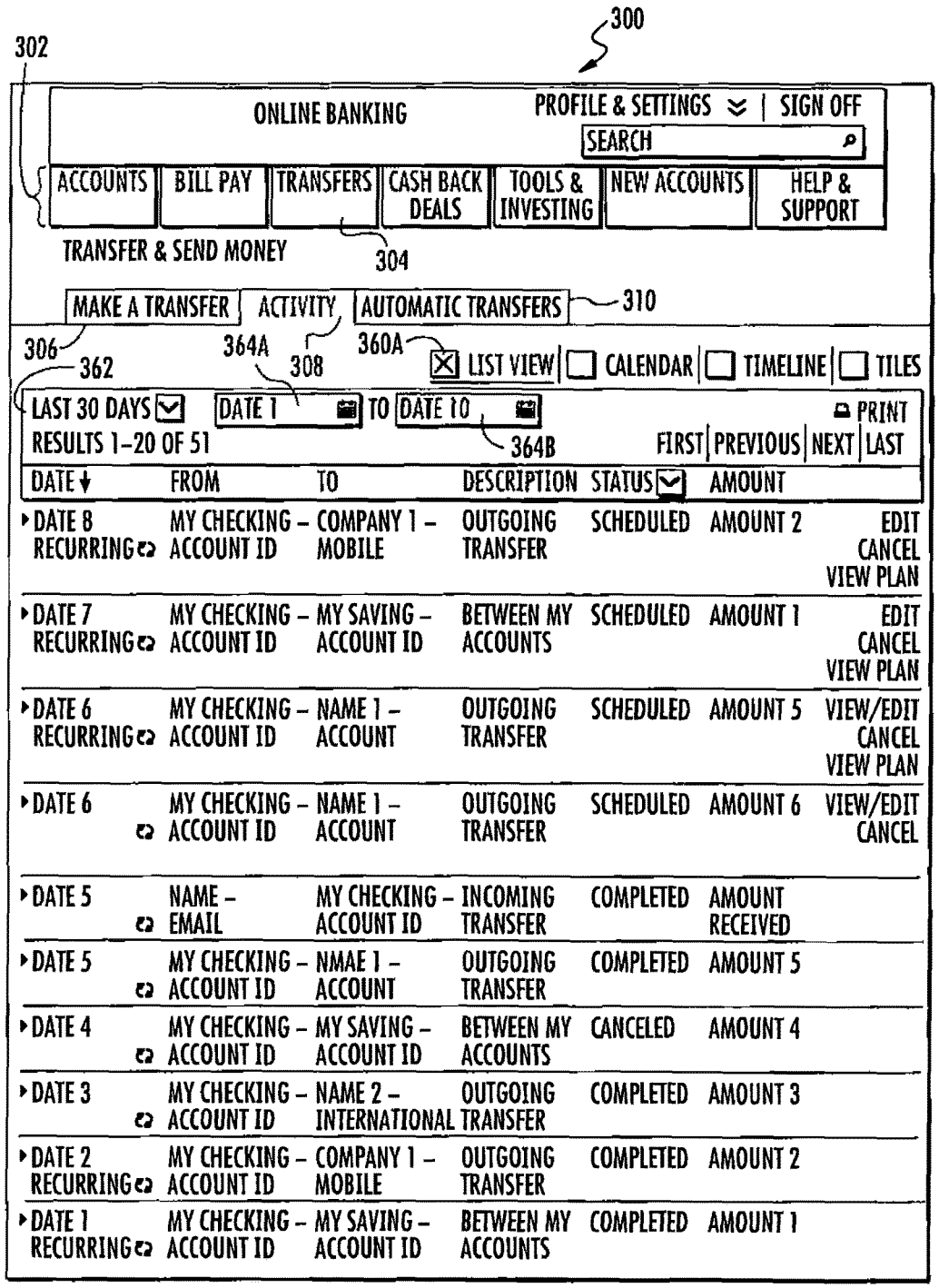
Figure 17:
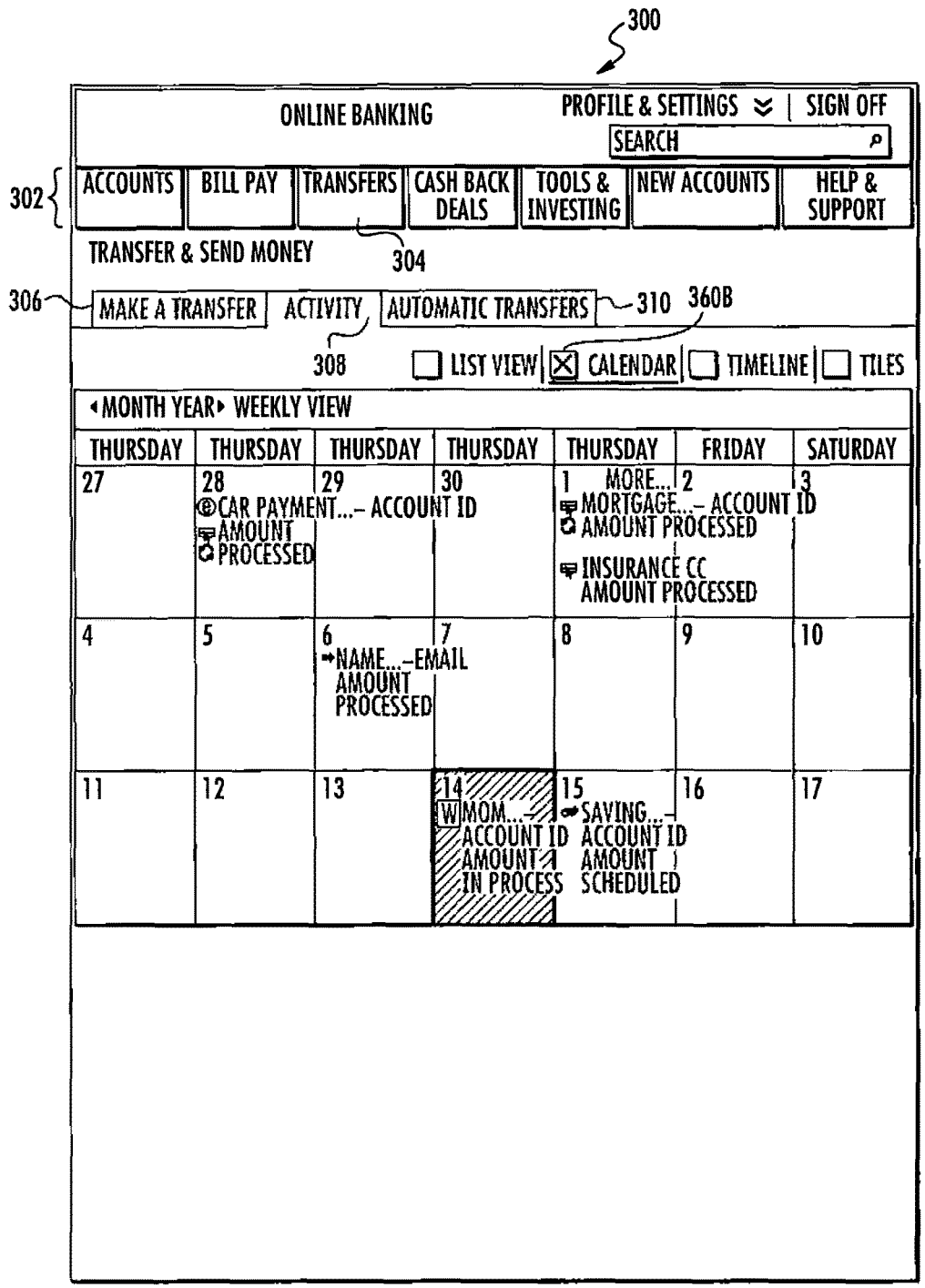
Figure 18:
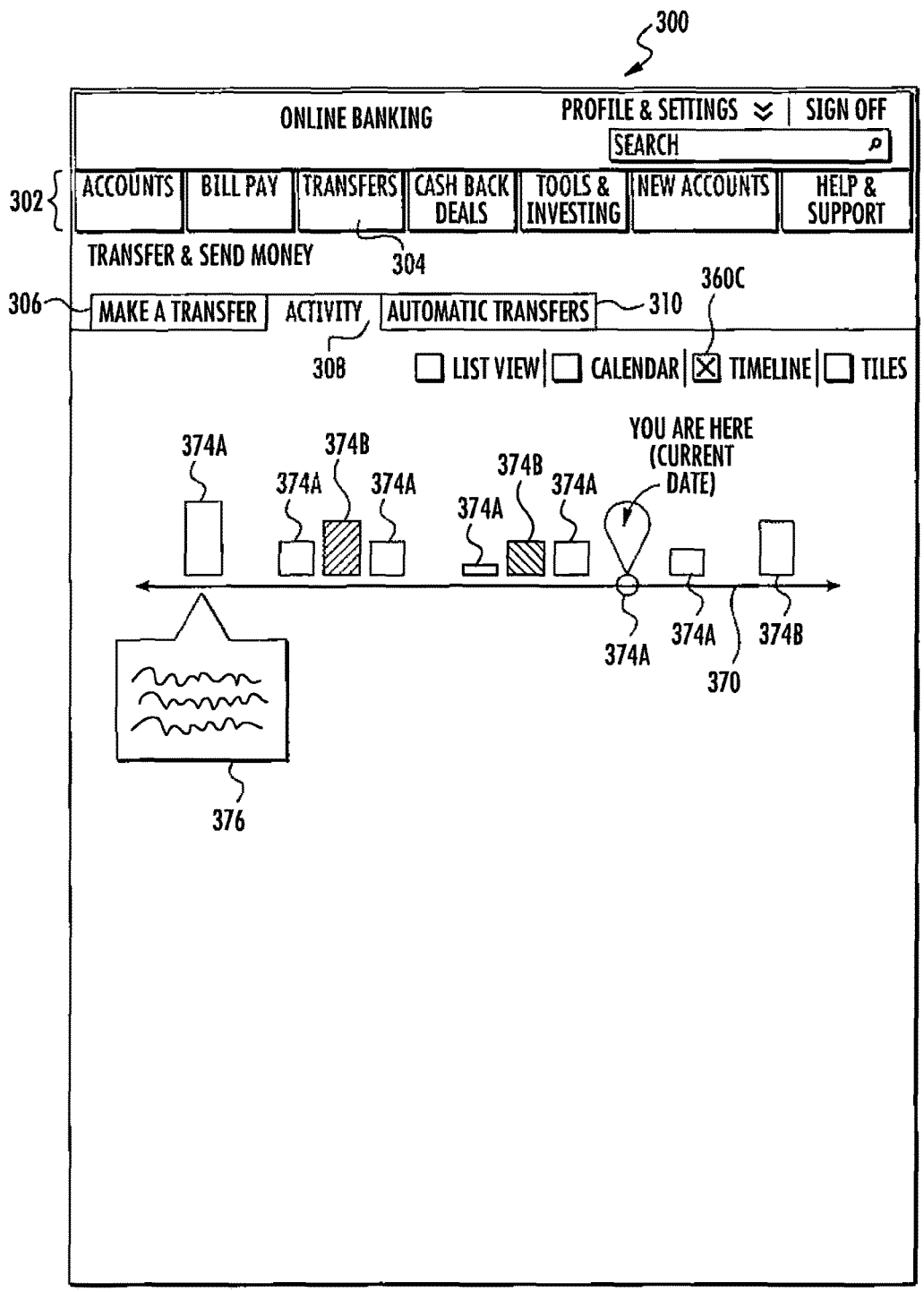
Figure 19:
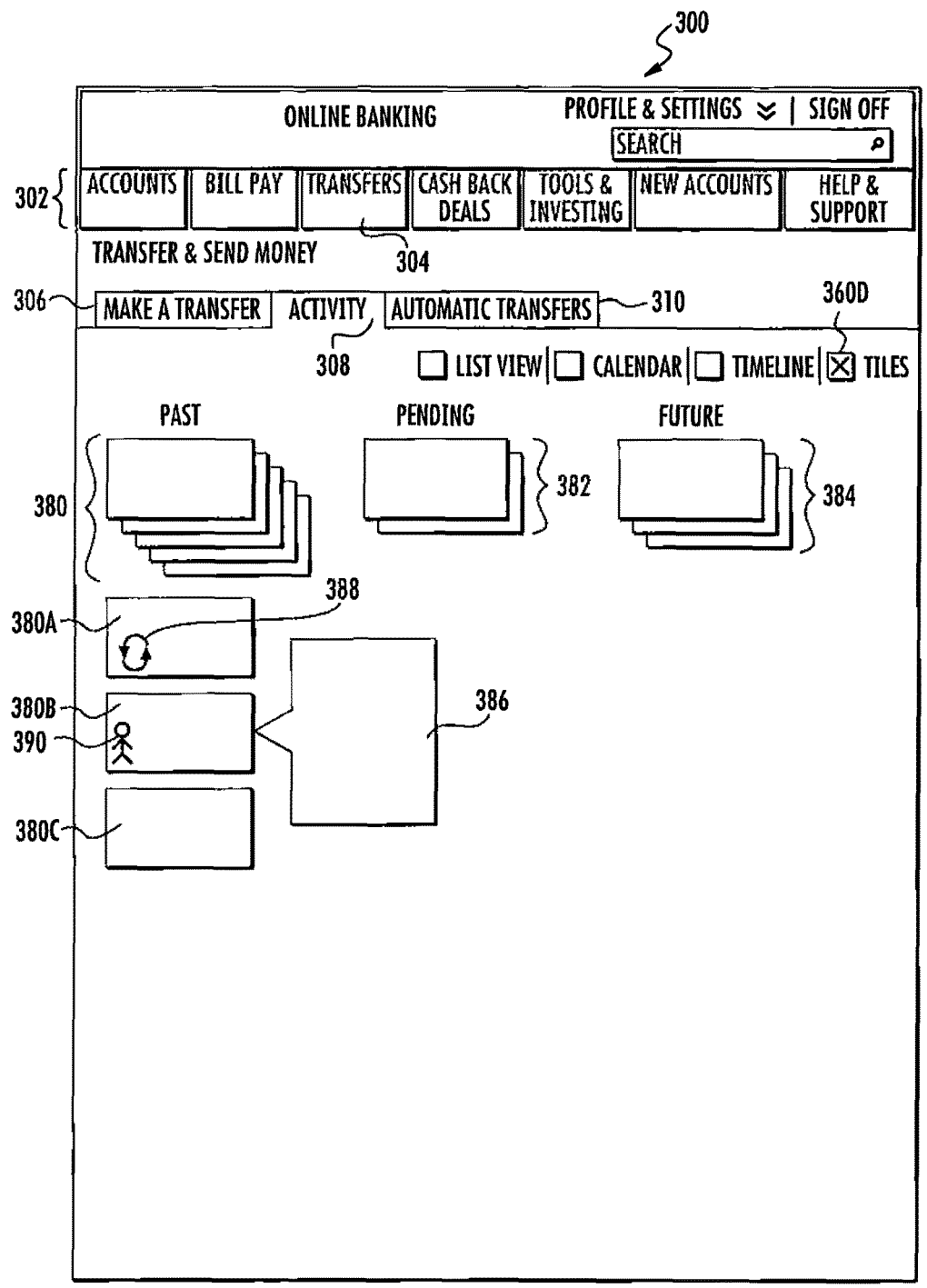
Figure 20:
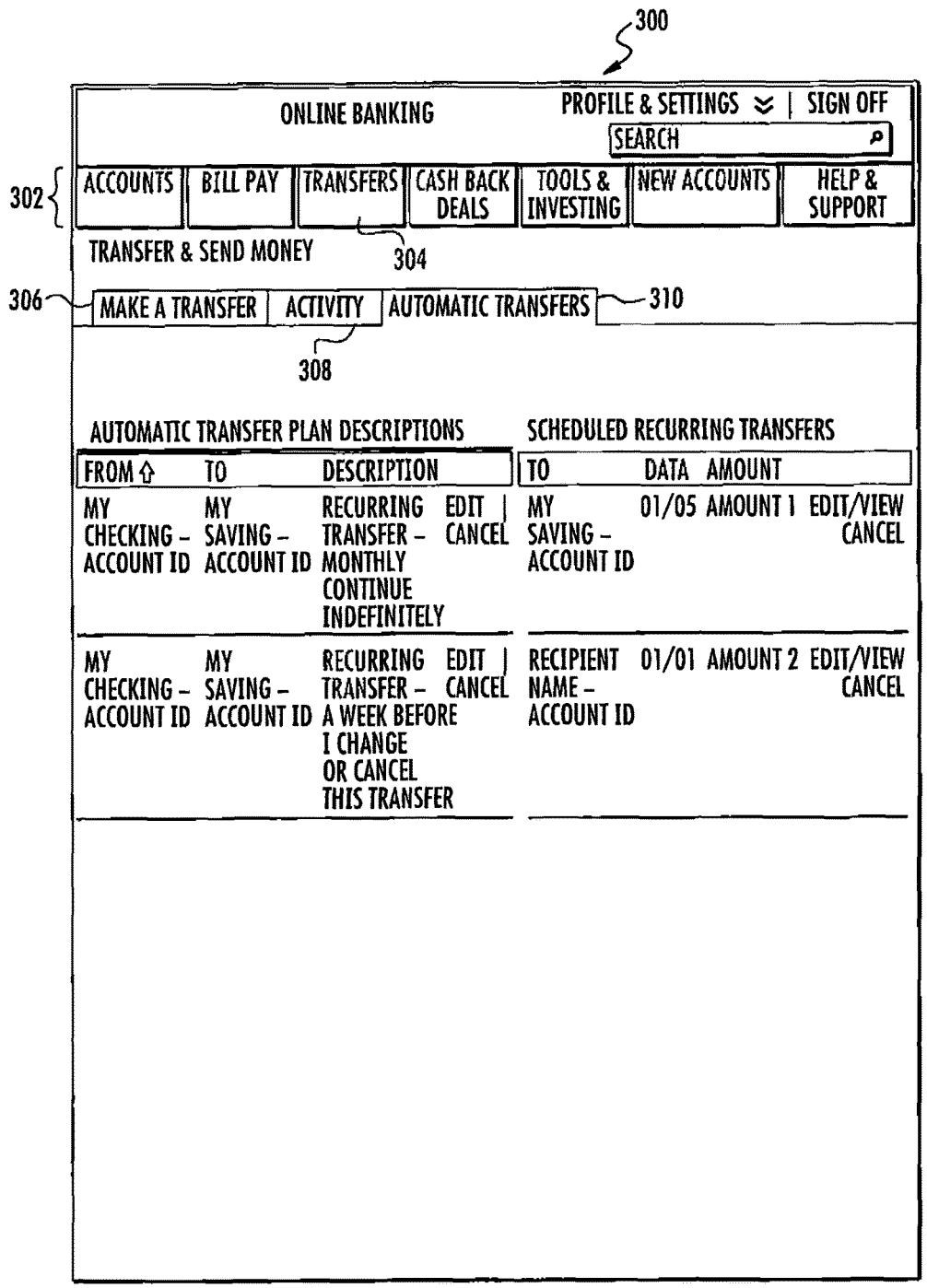
Figure 21:
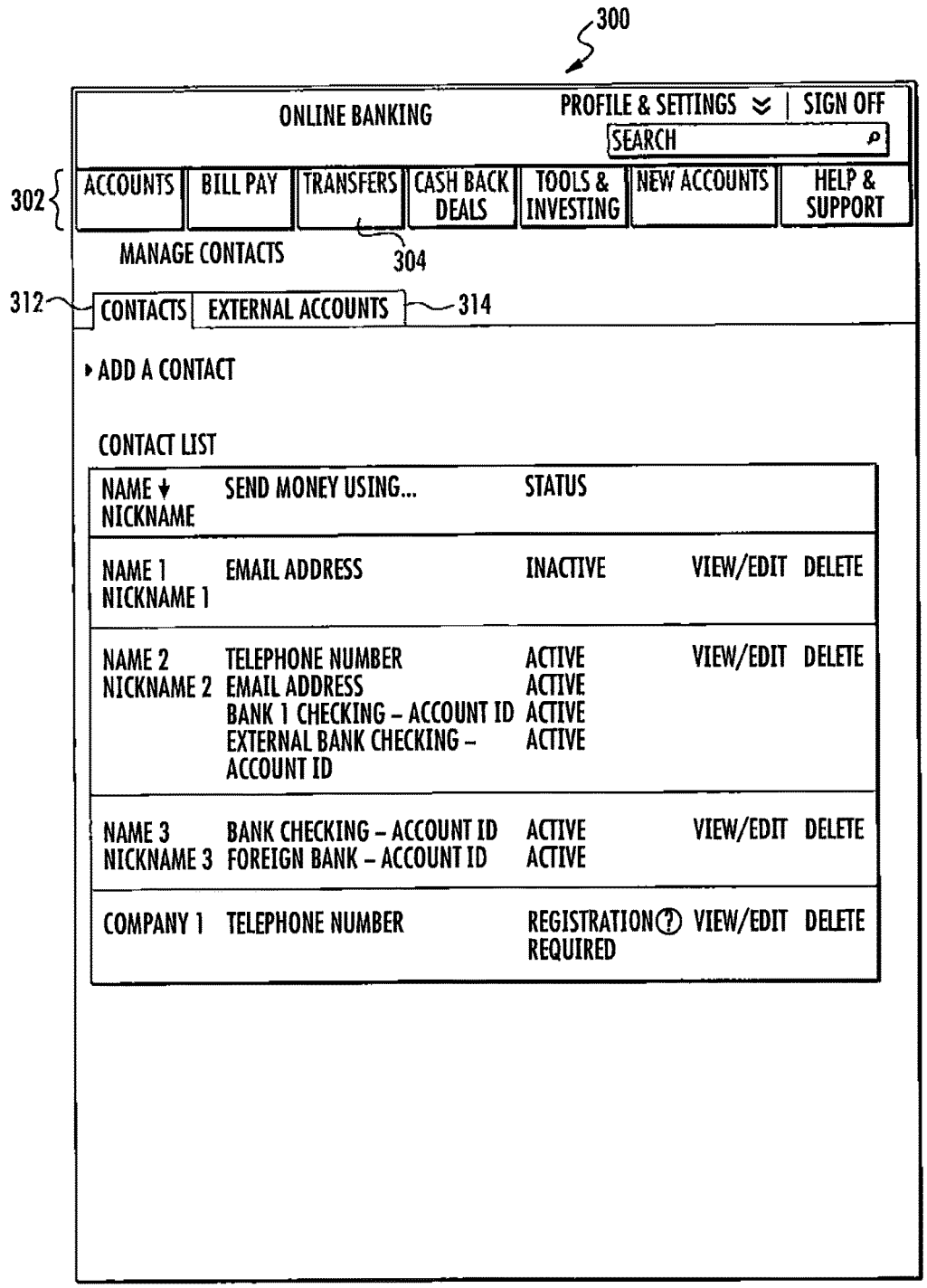
Figure 22:
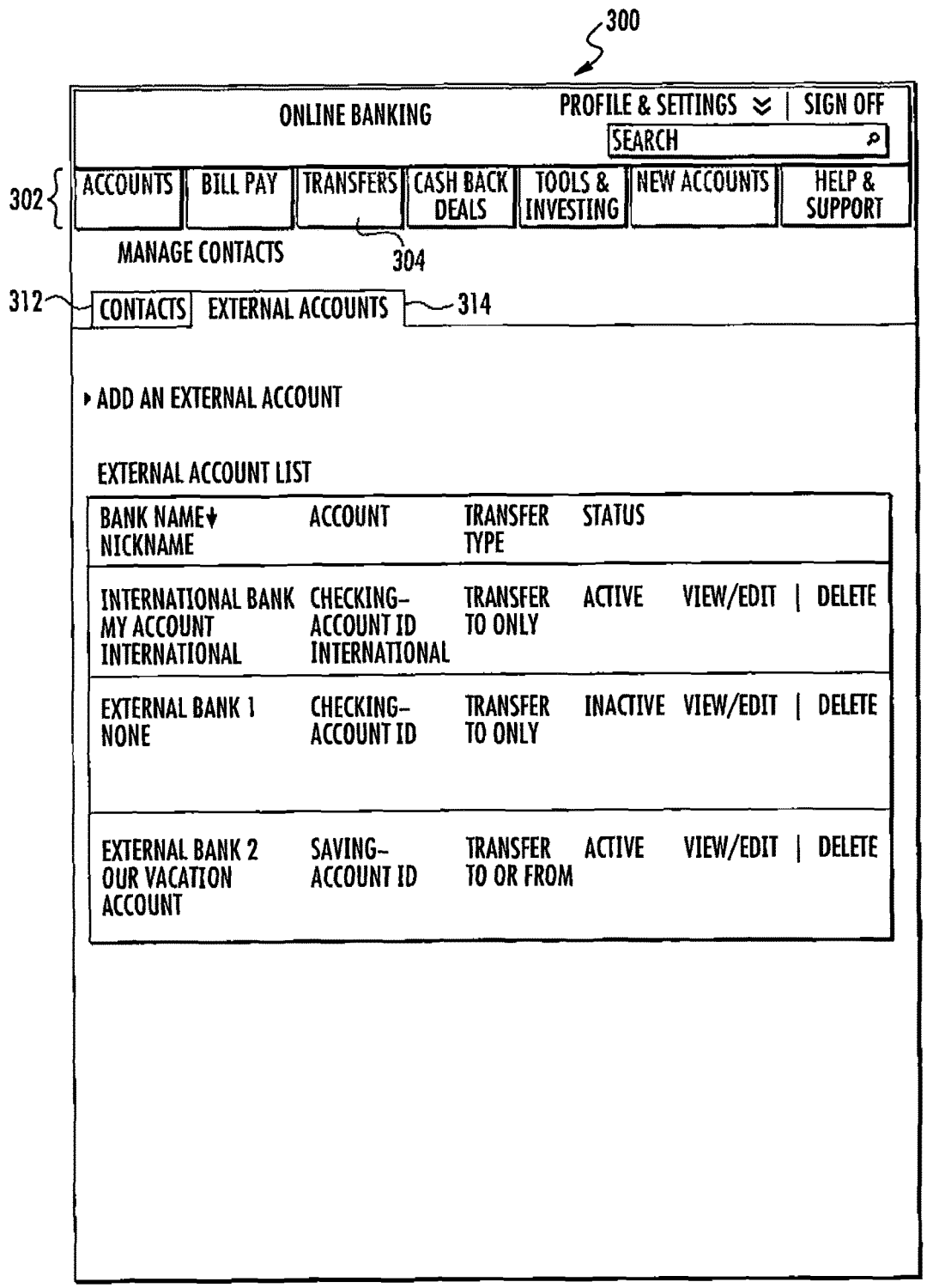
Figure 23:
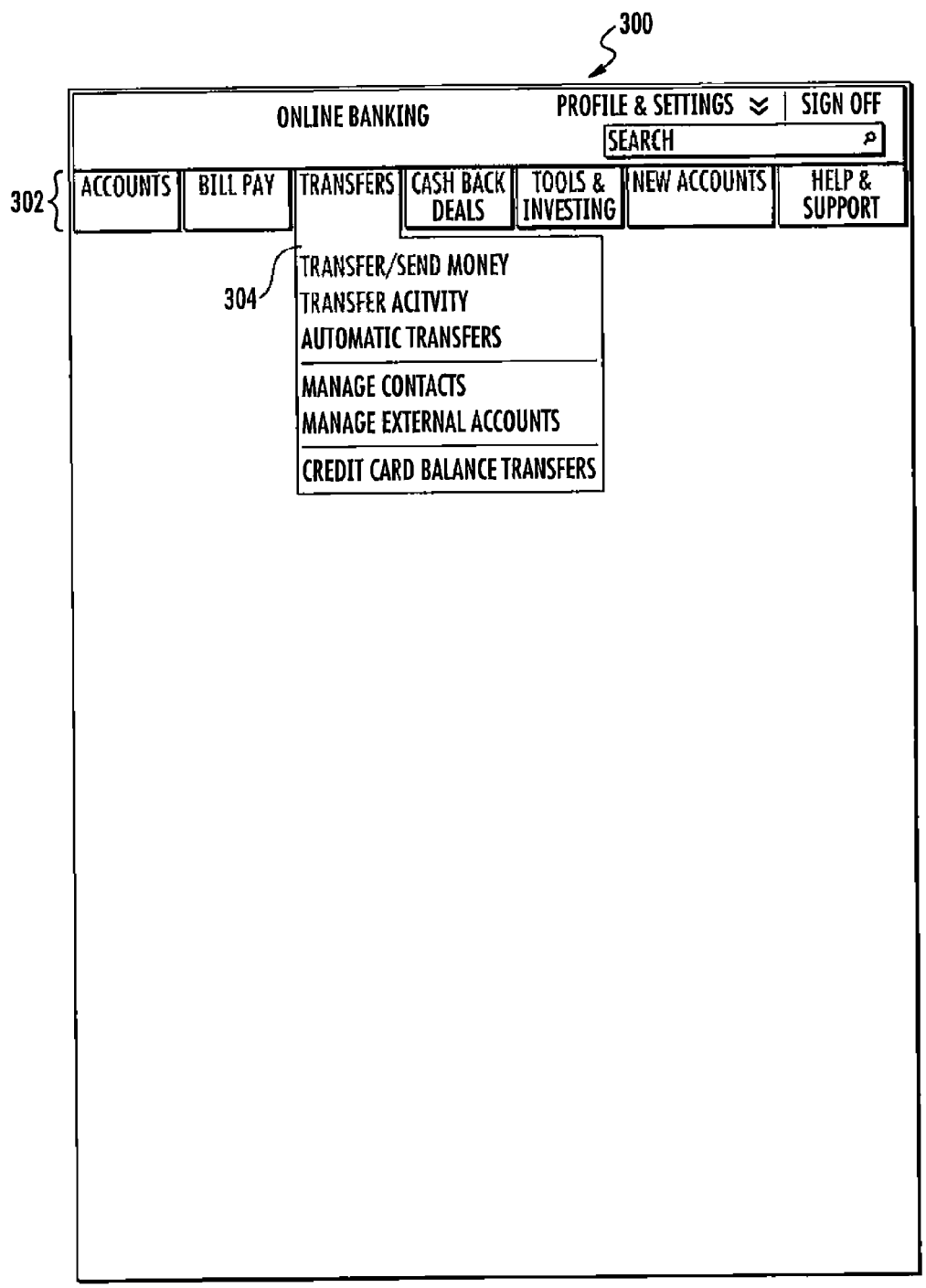
Figure 24:
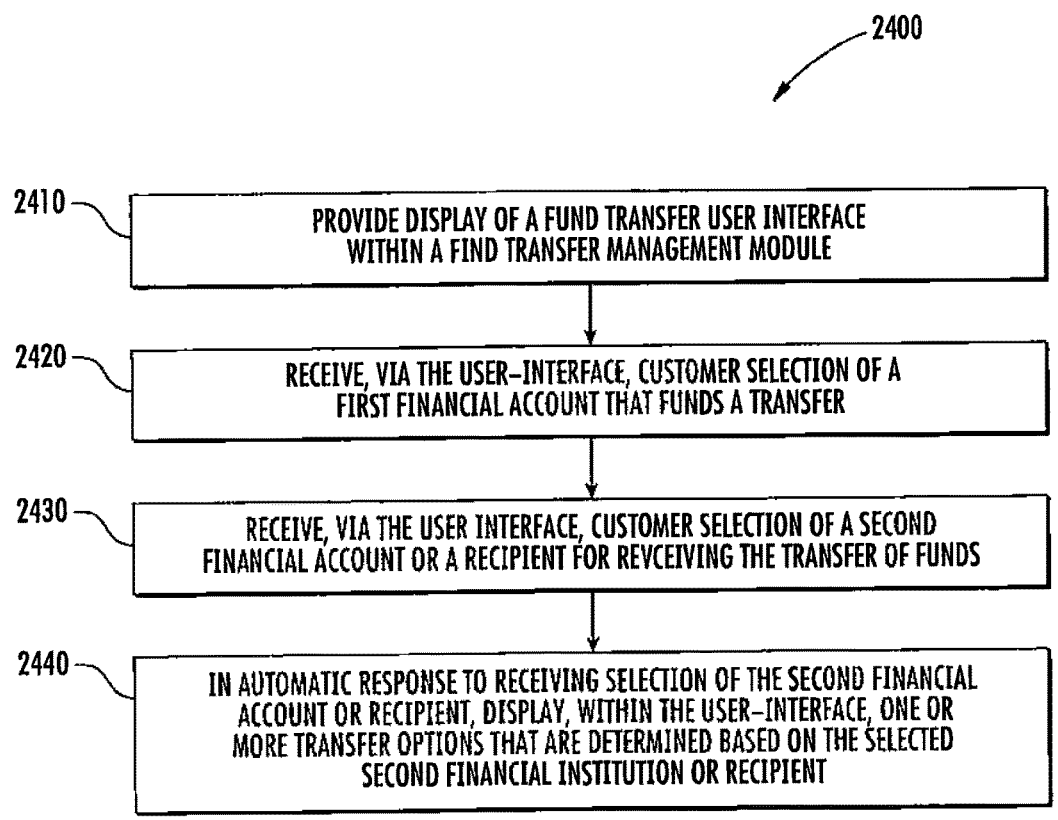
Figure 25:
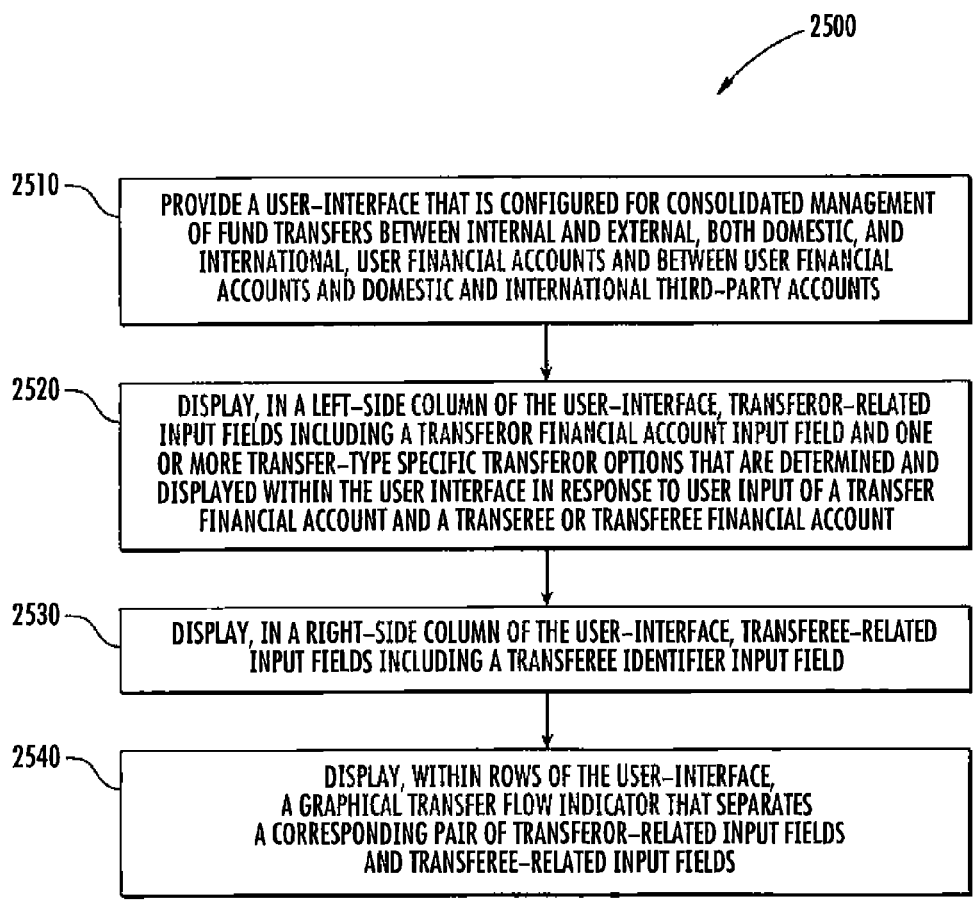
Figure 26:
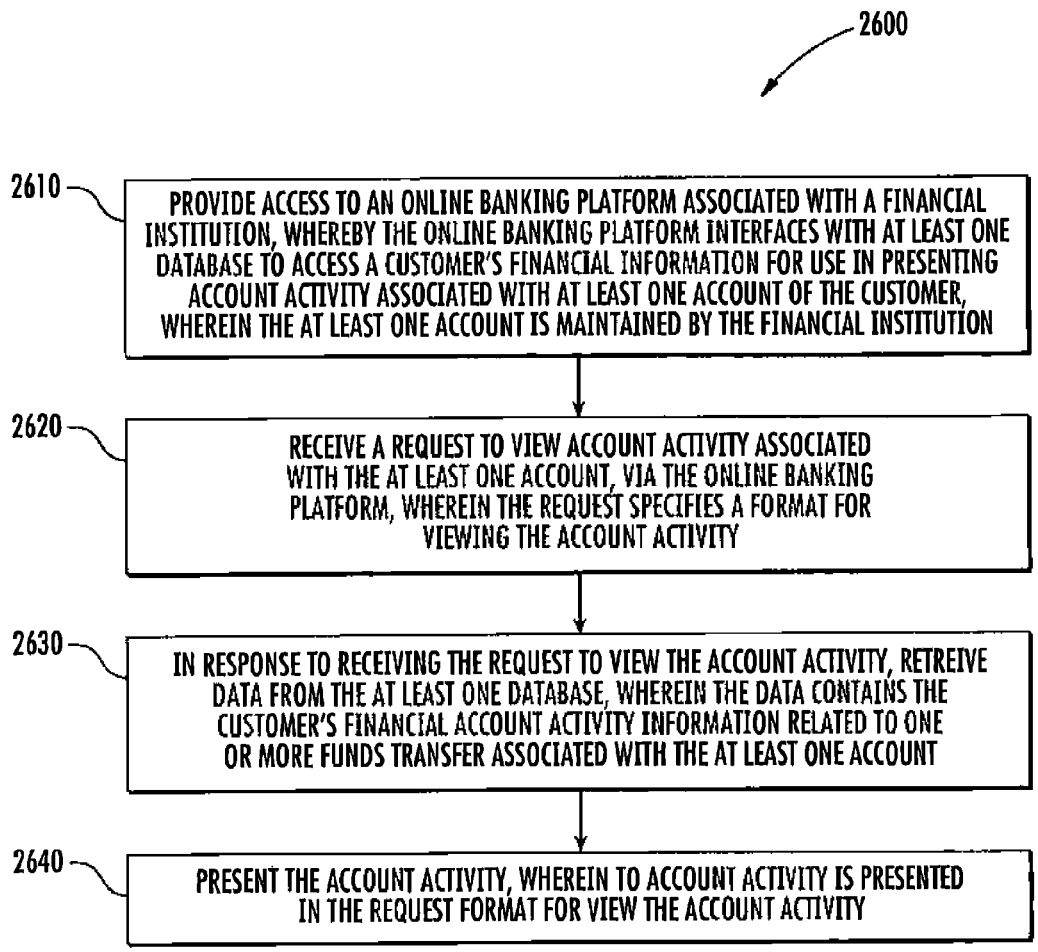
Figure 27:
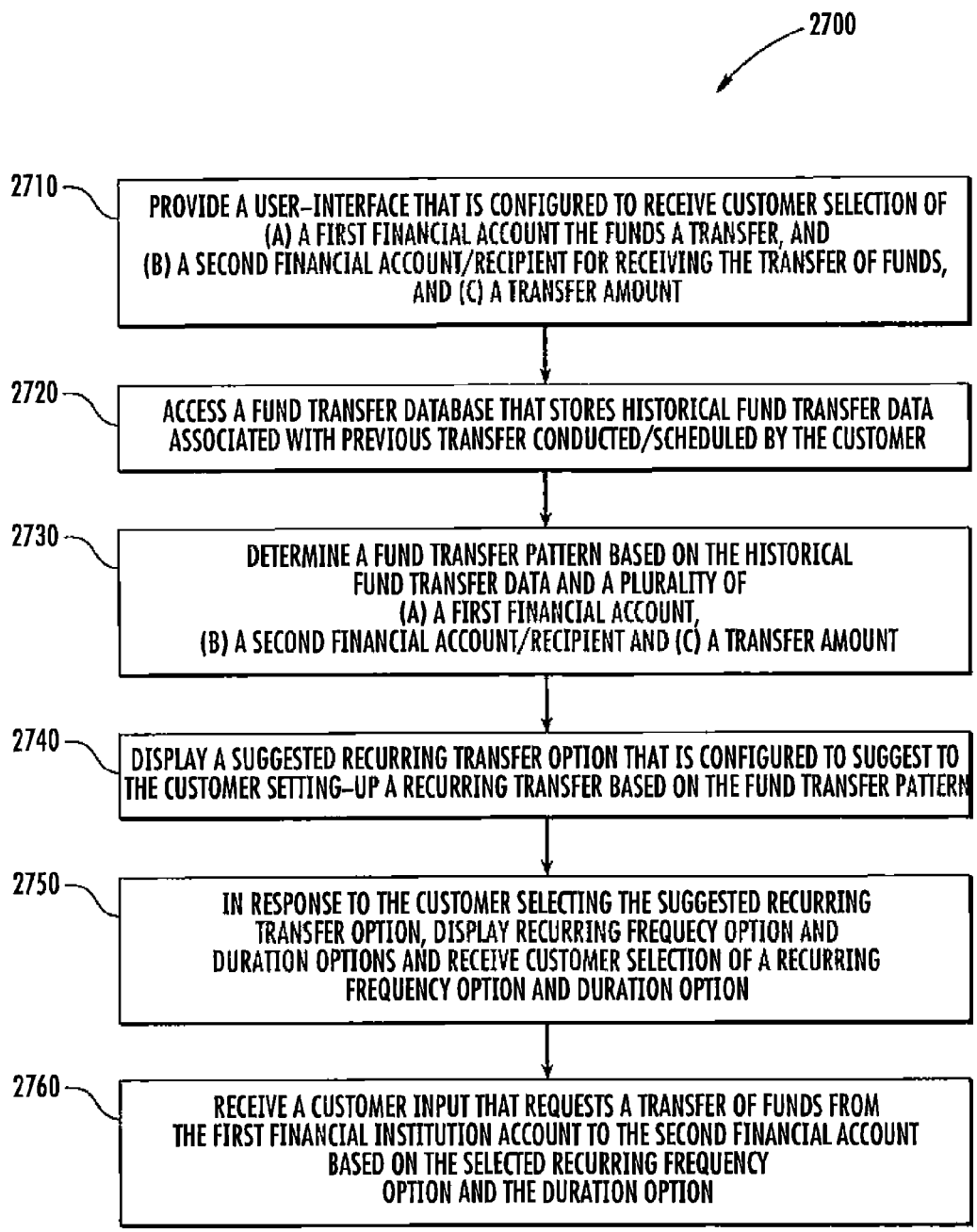
Figure 28:
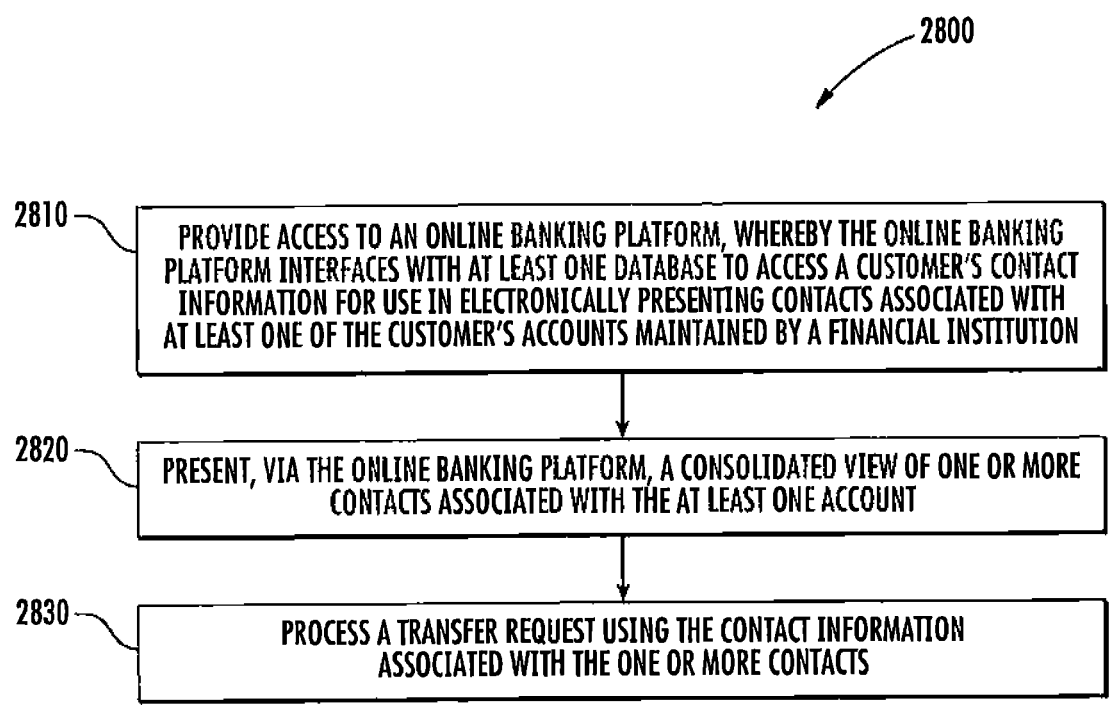

Having thus described embodiments of the invention in general terms, reference will now be made to the accompanying drawings, where:

FIG. 1 is a diagram illustrating a networking environment system, in accordance with embodiments of the present invention;

FIG. 2A is a block diagram illustrating one or more components of the networking environment system of FIG. 1, in accordance with embodiments of the present invention;

FIG. 2B is a block diagram illustrating one or more components of the networking environment system of FIG. 1, in accordance with embodiments of the present invention;

FIG. 3A is a schematic illustrating a fund transfer management module, in accordance with embodiments of the present invention;

FIG. 3B is a schematic illustrating one or more components of the fund transfer management module of FIG. 3A, in accordance with embodiments of the present invention;

FIG. 4A is a schematic illustrating a fund transfer management module, in accordance with embodiments of the present invention;

FIG. 4B is a schematic illustrating one or more components of the fund transfer management module of FIG. 4A, in accordance with embodiments of the present invention;

FIG. 5A is a schematic illustrating a fund transfer management module, in accordance with embodiments of the present invention;

FIG. 5B is a schematic illustrating one or more components of the fund transfer management module of FIG. 5A, in accordance with embodiments of the present invention;

FIG. 5C is a schematic illustrating one or more components of the fund transfer management module of FIG. 5A, in accordance with embodiments of the present invention;

FIG. 6A is a schematic illustrating a fund transfer management module, in accordance with embodiments of the present invention;

FIG. 6B is a schematic illustrating one or more components of the fund transfer management module of FIG. 6A, in accordance with embodiments of the present invention;

FIG. 7A is a schematic illustrating a fund transfer management module, in accordance with embodiments of the present invention;

FIG. 7B is a schematic illustrating one or more components of the fund transfer management module of FIG. 7A, in accordance with embodiments of the present invention;

FIG. 8 is a schematic illustrating a fund transfer management module, in accordance with embodiments of the present invention;

FIG. 9A is a schematic illustrating a fund transfer management module, in accordance with embodiments of the present invention;

FIG. 9B is a schematic illustrating a fund management module, in accordance with embodiments of the present invention;

FIG. 10 is a schematic illustrating a fund transfer management module, in accordance with embodiments of the present invention;

FIG. 11 is a schematic illustrating a fund transfer management module, in accordance with embodiments of the present invention;

FIG. 12 is a schematic illustrating a fund transfer management module, in accordance with embodiments of the present invention;

FIG. 13 is a schematic illustrating a fund transfer management module, in accordance with embodiments of the present invention;

FIG. 14 is a schematic illustrating one or more components of a fund transfer management module, in accordance with embodiments of the present invention;

FIG. 15A is a schematic illustrating a fund transfer management module, in accordance with embodiments of the present invention;

FIG. 15B is a schematic illustrating one or more components of the fund transfer management module, in accordance with embodiments of the present invention;

FIG. 16 is a schematic illustrating a fund transfer management module, in accordance with embodiments of the present invention;

FIG. 17 is a schematic illustrating a fund transfer management module, in accordance with embodiments of the present invention;

FIG. 18 is a schematic illustrating a fund transfer management module, in accordance with embodiments of the present invention;

FIG. 19 is a schematic illustrating a fund transfer management module, in accordance with embodiments of the present invention;

FIG. 20 is a schematic illustrating a fund transfer management module, in accordance with embodiments of the present invention;

FIG. 21 is a schematic illustrating a fund transfer management module, in accordance with embodiments of the present invention;

FIG. 22 is a schematic illustrating a fund transfer management module, in accordance with embodiments of the present invention;

FIG. 23 is a schematic illustrating a fund transfer management module, in accordance with embodiments of the present invention;

FIG. 24 is a high level process flow for providing fund transfer management, in accordance with embodiments of the present invention;

FIG. 25 is a high level process flow for providing an intuitive and consolidated user-interface for fund transfer management, in accordance with embodiments of the present invention;

FIG. 26 is a high level process flow for providing an account activity management system, in accordance with embodiments of the present invention;

FIG. 27 is a high level process flow for providing recurring fund transfer management, in accordance with embodiments of the present invention; and FIG. 28 is a high level process flow for providing an electronic account contact management system, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" may refer to a business entity that is either maintaining or acting on behalf of an entity maintaining one or more databases for monitoring and data housing. For example, in exemplary embodiments, an entity may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, or the like. The account is associated with and/or maintained by the entity. In other embodiments, an entity may not be a financial institution. In still other embodiments, the entity may be the merchant itself.

In some embodiments, the "customer" or "client" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

Network Environment for Systems and Methods Discussed Herein

Referring to FIG. 1, a network environment is illustrated in accordance with embodiments of the present invention. As illustrated in FIG. 1, the financial institution server 102 is operatively coupled via a network 101 to the customer computing device 104, one or more external financial account servers 106 and/or one or more external non-financial account servers 108. In this configuration, the financial institution server 102 may send information to and receive information from the customer computing device 104, one or more external financial account servers 106 and/or one or more external non-financial account servers 108. Additionally, the customer computing device 104 may send and receive information directly from the financial institution server 102, the one or more external financial account servers 106 and/or the one or more external non-financial account servers 108. The financial institution server 102 may be or include one or more network base stations or other network components. Similarly, the one or more external financial account servers 106 may send and receive information directly from the financial institution server 102, the customer computing device 104 and/or the one or more external non-financial account servers 108. The one or more external non-financial account servers 108 may send and receive information directly from the financial institution server 102, the customer computing device 104 and/or one or more external financial account servers 106. The financial institution server 102 may be or include one or more network base stations or other network components. Furthermore, the financial institution server may maintain the fund transfer management module in addition to data associated with the fund transfer management module and various applications discussed herein. FIG. 1 illustrates only one example of an embodiment of a network environment 100, and it will be appreciated that in other embodiments one or more of the systems, devices, or servers may be combined into a single system, device, or server, or be made up of multiple systems, devices, or server.

The network 101 may be a global area network (GAN), such as the Internet, a wide area network (WAN), a local area network (LAN), a telecommunication network or any other type of network or combination of networks. The network 101 may provide for wire line, wireless, or a combination wire line and wireless communication between devices on the network 101.

The financial institution server 102, which may include multiple servers, stores fund transfer management module 300 (shown in FIG. 2A). Fund transfer management module 300 is configured to provide a customer/user a consolidated platform for managing fund transfers between the customer's accounts, specifically accounts held by the customer internally (at the financial institution hosting the fund transfer management module 300) as well as accounts held by the customer externally (at other financial institutions, both domestic and international). Additionally, the module 300 provides for managing transfers between the customer's accounts and accounts held by third-party entities, such as individuals or business. The third party-accounts may be held internally, at the financial institution hosting the module 300, or externally at other financial institutions, both domestic and international. In addition, the consolidated platform provides the customer/user to define transfer type (in terms of the account to which the transfer will be made) and in automatic response to such selection the customer/user is presented with transfer-type specific transfer options, such as transfer amount, frequency, duration of frequency, transfer timing (i.e., transfer initiation date and arrival/post date), delivery speed and the like. In this regard, the fund transfer management module allows for the customer/user to manage the scheduling of future transfers, including recurring transfers, by defining the frequency and duration of such transfers. Additionally, the financial institution server 102 includes a fund transfer processing system 301 that is responsible for receiving fund transfer requests from the module 300 and processing the requests in accordance with the defined transfer options in the request.

The financial institution server 102 may additional include credit/loan mortgage account databases 303 that are accessible to the fund transfer module 300 for the purpose of determining information associated with a customer's credit, loan or mortgage accounts, such as current statement balance, current minimum payment due, current account balance and the like. In specific embodiments of the invention, the information is determined in real-time or near real-time. Such information may be presented to the user, within the user-interface/digital forms of the module 300, to allow the customer to make informed decisions as to the transfer amount being managed (e.g., on-demand transfer or scheduled transfer, including recurring transfers).

Moreover, financial institution server 102 may additionally include international transfer management module 305 that is accessible to the fund management module 300 for the purpose of storing and delivering country-specific delivery speed options, including any payments associated with a given delivery speed, and determine current exchange rates currently available for application to international transfers. In specific embodiments of the invention, the current exchange rates are determined in real-time or near real-time.

As illustrated in FIG. 2A, the financial institution server 102 generally comprises a communication device 110, a processing device 112, and a memory device 154. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 112 is operatively coupled to the communication device 110 to communicate with the network 101 and other devices on the network 101. As such, the communication device 110 generally comprises a modem, server, or other device for communicating with other devices on the network 101.

As further illustrated in FIG. 2A, the network financial institution server 102 comprises computer readable instructions 118 of a fund transfer management application 120, more specifically an application programming interface (API), and a financial data application 122. In some embodiments, the memory device, 114 includes data storage 116 for storing data related to and/or used by the applications 120, 122. The applications 120, 122 may perform one or more of the steps and/or sub-steps discussed herein and/or one or more steps not discussed herein. For example, in some embodiments, the application 122 may provide financial information of the customer to the fund transfer management application programming interface 120. The fund transfer management module 300 may perform one or more of the steps and/or sub-steps discussed herein and/or one or more steps not discussed herein. For example, in some embodiments, the fund transfer management module 300 may comprise a plurality of modules for implementing one or more functions discussed herein. As illustrated in FIG. 2A, the fund transfer management module 300 may comprise a fund transfer request sub module 141 for implementing a fund transfer management system, an intuitive and consolidated fund transfer request sub 142 for implementing an intuitive and consolidated user-interface within a fund transfer management system, an account activity management sub module 143 for managing customer account transfers, a recurring fund transfer sub module 144 for managing recurring fund transfers, and an electronic account contact management module 145 for managing customer contact for use in processing account transfers.

The processing device 112 is operatively coupled to the communication device 110 to communicate with the network 101 and other devices on the network 101. As such, the communication device 110 generally includes a modem, server, or other device for communicating with other devices on the network 101.

As further illustrated in FIG. 2A, the network financial institution server 102 includes computer readable instructions 118 of an application programming interface (API) 120 for hosting the fund transfer management module of the present invention, such as an online banking API, a mobile banking API or the like more specifically an application programming interface (API), and a financial data application 122. In some embodiments, the memory device, 114 includes data storage 116 for storing data related to and/or used by the applications 120, 122. The applications 120, 122 may perform one or more of the steps and/or sub-steps discussed herein and/or one or more steps not discussed herein. For example, in some embodiments, the application 122 may provide financial information of the customer to the fund transfer management application programming interface 120.

As illustrated in FIG. 2A, the customer computing device 104 generally comprises a communication device 130, a processing device 132, and a memory device 134. The processing device 132 is operatively coupled to the communication device 130 and the memory device 134. In some embodiments, the processing device 132 may send or receive data from the customer computing device 104, to the financial institution server 102 via the communication device 130 over a network 101. As such, the communication device 130 generally comprises a modem, server, or other device for communicating with other devices on the network 101. The application interface 140 may perform one or more of the steps and/or sub-steps discussed herein and/or one or more steps not discussed herein.

As further illustrated in FIG. 2A, the customer computing device 104 comprises computer readable instructions 138 stored in the memory device 134, which in one embodiment includes the computer-readable instructions 138 of an application interface 140. In the embodiment illustrated in FIG. 2A, the application interface 140 allows the customer computing device 104 to be linked to the financial institution server 102 to communicate, via a network 101. The application interface 140 may also allow the customer computing device 104 to connect directly (i.e., locally or device to device) with the external financial account servers 106 and/or external non-financial account servers 108 for sending and receiving information.

As illustrated in FIG. 2B, the one or more external financial account servers 106 generally comprise a communication device 150, a processing device 152, and a memory device 154. The processing device 152 is operatively coupled to the communication device 150 and the memory device 154. In some embodiments, the processing device 152 may send or receive data from the one or more external financial account servers 106, to the financial institution server 102 via the communication device 150 over a network 101. As such, the communication device 150 generally comprises a modem, server, or other device for communicating with other devices on the network 101.

As further illustrated in FIG. 2B, the one or more external financial account servers 106 comprises computer readable instructions 158 stored in the memory device 154, which in one embodiment includes the computer-readable instructions 158 of financial account applications 160. In the embodiment illustrated in FIG. 2B, the financial accounts application 160 allows the one or more external financial account servers 106 to be linked to the financial institution server 102 to communicate, via a network 101. The financial account applications 160 may also allow the one or more external financial accounts 106 to connect directly (i.e., locally or device to device) with the customer computing device 104 and/or external non-financial account servers 108 for sending and receiving information. The financial account application 160 may perform one or more of the steps and/or sub-steps discussed herein and/or one or more steps not discussed herein. For example, in some embodiments, the financial account applications 160 may comprise a plurality of modules for implementing one or more functions discussed herein. As illustrated in FIG. 2B, a financial account application 160 may comprise a domestic accounts module 161 for maintaining and managing information related to domestic accounts of a plurality of customers for use in processing account transfers, and an international accounts module 162 for maintaining and managing information related to international accounts of a plurality of customers for use in processing account transfers.

As illustrated in FIG. 2B, the one or more external non-financial account servers 108 generally comprise a communication device 170, a processing device 172, and a memory device 174. The processing device 172 is operatively coupled to the communication device 170 and the memory device 174. In some embodiments, the processing device 172 may send or receive data from the one or more external non-financial accounts servers 108, to the financial institution server 102 via the communication device 170 over a network 101. As such, the communication device 170 generally comprises a modem, server, or other device for communicating with other devices on the network 101.

As further illustrated in FIG. 2B, the one or more external non-financial account servers 108 comprise computer readable instructions 178 stored in the memory device 174, which in one embodiment includes the computer-readable instructions 178 of non-financial account applications 180. In the embodiment illustrated in FIG. 2B, the non-financial account applications 180 allows the one or more external non-financial account servers 108 to be linked to the financial institution server 102 to communicate, via a network 101. The financial account applications 160 may also allow the one or more external non-financial accounts 106 to connect directly (i.e., locally or device to device) with the customer computing device 104 and/or external financial account servers 106 for sending and receiving information. The non-financial account applications 180 may perform one or more of the steps and/or sub-steps discussed herein and/or one or more steps not discussed herein. For example, in some embodiments, the non-financial account applications 180 may comprise a plurality of modules for implementing one or more functions discussed herein. As illustrated in FIG. 2B, a non-financial account application 180 may comprise a social networking module 181 for maintaining and managing social networking information related to a plurality of customers for use in processing account transfers, an email and/or messaging account (e.g., email, mobile phone, and the like) module 182 for maintaining and managing messaging information (e.g., contacts) related to a plurality of customers for use in processing account transfers, a public records module 183 for maintaining and managing public records information related to a plurality of customers for use in processing account transfers, a credit module 184 for maintaining and managing credit information (e.g., credit reports, credit scores) related to a plurality of customers for use in processing account transfers, and a third party account module 185 for maintaining and managing third party non-financial account information related to a plurality of customers for use in processing account transfers.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Consolidated Platform for Financial Institution Fund Transfers for Systems and Methods Discussed Herein Referring now to FIG. 3A through FIG. 23, a consolidated platform, i.e., fund transfer management module, for managing financial institution fund transfers is illustrated in accordance with embodiments of the present invention, which will be discussed in further detail throughout this specification. The fund transfer management module 300 may exist as part of an online or mobile banking portal or the like. As illustrated in the Figures, the fund transfer management module may include a plurality of tabs 302 or options for selection in which the customer can select an option (e.g., click a tab or otherwise activate a tab) to initiate the presentation of customer and/or account related information or to be directed towards an user-interface for conducting account transactions. The tabs 302 may include, but not be limited to, options such an "accounts" option to view account information, a "bill pay" option to manage payments to third parties, a "transfers" option 304 to conduct and manage account related funds transfers, a "cash back deals" option to manage or redeem account rewards, a "tools & investing" option to manage investments and/or budgeting, a "new accounts" option to open a new account, a "help & support" option, and the like. The fund transfer management portal may additionally include a search feature for facilitating searches of information accessible by the fund transfer management portal and/or an entity responsible for maintaining the fund transfer management portal.

Embodiments of the present invention, discussed herein, implement a plurality of functions related to requesting, processing, and managing funds transfers initiated from one or more customer-related accounts accessible within the fund transfer management portal. To this extent, in response to selecting the "transfers" option 304, the customer may be directed to a user-interface comprising one or more subsidiary options for conducting and managing transfers within the fund transfer management module 300. The subsidiary options may include, but not be limited to, options such as a "make a transfer" option 306 to process account related transfers, an "activity" option 308 to view past, pending, and/or future funds transfer activity, an "automatic transfer" option 310 to conduct and manage automated account related funds transfers, and the like.

As depicted in FIGS. 3A, 4A, 5A, 6A, 7A, and 8-13 the layout of the user-interface/digital form is configured so as to be intuitive to the user in terms what information needs to be selected or inputted and provides the customer/user with an indication of where to and how the flow of funds occurs within the fund transfer process. In this regard, in accordance with specific embodiments of the invention, a left-side column of the user-interface/digital form is configured to display sender-related information (e.g., transferor account, transfer amount, transfer initiation date and the like), while a right-side column of the user-interface/digital form is configured to display recipient-related information (e.g., recipient/account identifier, international transfer amount, estimated arrival/postdate and the like). Additionally, the layout of the user-interface from is configured to display graphical fund transfer indicators, in the form of one-directional and bi-directional arrows that indicate the flow of funds between sender-related information and recipient-related information.

As illustrated in FIG. 3A, in response to the customer selecting the option to make a transfer 306, the system may present a user interface/digital form for providing information related to a transfer request. In one embodiment, the form may be interactive such that the customer can select an account from which the funds should be transferred and select a recipient (e.g., an account, an individual, a business and the like) to which the funds should be transferred. In another embodiment, the form may be prepopulated based on previous request or account trends determined by the system. For example, the system may prepopulate a "From" input box 320 with the account that was previously selected by the customer for the last-in-time fund transfer or the account that the system determines to be most frequently selected by the customer. To this extent, the form may include a "From" input box (e.g., text box, drop down menu, and the like) 320 for allowing the customer to specify an account from which the funds should be transferred, a "To" input box (e.g., text box, drop down menu, and the like) 322 for allowing the customer to specify a recipient to which the funds should be transferred. A graphical fund transfer indicator 323, in the form of an arrow, is displayed leading from the "From" input box 320 to the "To" input box 322 as a means of indicating to the customer/user the flow of funds that will occur between accounts and/or recipients. Further the user-interface is configured to provide a transfer amount input box 324 for allowing the customer to specify an amount to transfer. After input has been provided for each required field (e.g., From account, To recipient, and amount), the system may provide an option 326 for the customer to continue with the transfer request.

As illustrated in FIG. 3B, in an embodiment where a drop down menu is utilized, the fund transfer management module 300 may first populate the drop down menu 327 with transfer eligible accounts of the customer and/or provide an option for the customer to add a new account 329 from which the funds should be transferred. The selected account may then be used to populate the "From" input box 320.

As illustrated in FIG. 4A, in response to the customer/user selecting to transfer funds to their respective internal savings account, the fund transfer management module 300 is configured to display, within the user-interface, transfer options that are specific to the transfer type (i.e., me-to-me transfer with the transferee account being the customer's saving account). As shown in FIG. 4A, the transfer options include transfer amount, transfer frequency and transfer timing. To this extent, the user-interface/digital-form may include in addition to a transfer amount input box 324, "Frequency" input box (e.g., text box, drop down menu, and the like) 328 for allowing the customer to specify the frequency of the transfer (e.g., one-time only, weekly, monthly or the like), and a "Transfer Date" input box (e.g., text box, drop down menu, and the like) 330 for allowing the customer to specify a date on which the funds should be transferred. For example, in specific embodiments of the invention, the fund transfer management module 300 may prepopulate a "Transfer Date" input box 328 with the date of the month that was previously selected by the customer for the last-time in time transfer of the selected transfer type or the date that the module 300 determines the customer is most likely to a conduct a transfer (based on previous frequencies) or the current date. The fund transfer management module 300 may additionally provide the customer with added options such as the ability to include a transaction description and/or memo with the transfer. For example, the customer may be enabled to select a check box 332 to include a transaction description. As illustrated in FIG. 4B, in response to selecting the check box 332 the fund transfer management module 300 may provide a text box input field for the customer to specify a transaction description to be associated with the transfer. After input has been provided for each required field (e.g., Frequency and Transfer Date), the system may provide an option 326 for the customer to continue with the transfer request.

In specific embodiments of the invention, once the customer has provided inputs to the "From" input box 320, indicating the transfer account, the "To" input box 322 and, optionally, the transfer amount input box 324 and/or transfer date input box 330, the fund transfer management module is figured to access a fund transfer database that stores historical transfer data related to previous fund transfers conducted and/or scheduled by the customer. The previous/scheduled fund transfers may have been previously conducted/scheduled via the fund transfer management module or, according to other embodiments, the previous/scheduled fund transfers may have been conducted/scheduled using any other acceptable transfer platform or means. Once the fund transfer database has accessed, the fund transfer management module determines a fund transfer pattern based on the historical transfer data and the current customer inputs (e.g., transferor account, transferee/transferee account, transfer amount, transfer date and the like). The fund transfer pattern is defined by similarities between the previous/scheduled fund transfers and the fund transfer currently being conducted/scheduled. For example, a fund transfer pattern may include, but is not limited to, a combination of the same transferor account, the same transferee or transferee account, a same or similar transfer amount and a same or similar transfer account. The fund transfer pattern indicates that the customer continually performs a same or highly similar fund transfer on an ongoing basis. As such the transfer related to the fund transfer pattern is a prime candidate for establishing a recurring fund transfer.

In response to identifying the fund transfer pattern, the transfer management module is configured to provide display of a suggested recurring transfer option. The suggested recurring transfer option provides for making the customer aware of the fund transfer pattern and suggesting to the customer that the customer set-up a recurring fund transfer. In this regard, the recurring transfer suggestion may be displayed within the user-interface or a pop-up window may appear that overlays the user-interface. In other embodiments of the invention, the suggested recurring transfer option may be displayed to the customer in a confirmation page, which confirms the fund transfer once the customer has provided all of the requisite fund transfer inputs and/or displayed to the customer in a calendar view, (as shown in FIG. 17) or a timeline view (as shown in FIG. 18). In addition to suggesting to the customer that a recurring pattern be established, in specific embodiments, the suggested recurring transfer option may display or provide access to information related to the specific fund transfers that comprise the identified fund transfer pattern. Additionally, the suggested recurring transfer option may include a means for the customer to accept (i.e., set-up the recurring fund transfer) the suggested recurring fund transfer, such as a check box or the like).

In response to the customer selecting the suggested recurring fund transfer option, the customer is provided display of frequency options (predetermined time periods, such as weekly, monthly, bi-monthly, annually or the like) and duration options (such as continue until a predetermined date, continual until a predetermined amount has been transferred, continue until a predetermined number of transfers have occurred and the like). Additionally, in specific embodiments of the invention, the input fields/box associated with the frequency option and duration option may be pre-populated with suggestions for frequency and duration based on attributes associated with the identified fund transfer pattern (i.e., how frequently transfers in the pattern occur, the perceived basis for the transfers and the like).

As illustrated in FIG. 5A, the fund transfer management module 300 is configured to allow the customer/user to request to transfer funds to their respective credit account for the purpose of making a payment (i.e., me-to-me fund transfer from a checking account to a credit account). In automated response to the customer/user selecting the transfer type shown in FIG. 5A, the fund transfer management module 300 is configured to display, within the user interface, transfer options that are specific to the selected transfer type. In such embodiments of the invention, the user-interface/digital form may be configured such that the customer can specify parameters such as the transfer amount, the frequency at which the transfer should occur and the date on which the transfer should be processed and/or initiated. To this extent, the form may include an amount input field (e.g., polling buttons) 324 for allowing the customer to specify an amount to transfer and/or pay, a "Frequency" input box (e.g., text box, drop down menu, and the like) 328 for allowing the customer to specify an account from which the funds should be transferred, and a "Transfer Date" input box (e.g., text box, drop down menu, and the like) 330 for allowing the customer to specify a date on which the funds should be transferred. As illustrated in FIGS. 5B and 5C, in such an embodiment, the amount input field 324 may provide one or more polling buttons that allow the customer to specify to transfer either the minimum payment amount, the last statement balance, current account balance or another amount in which the customer may manually input a payment amount into a text input field presented within the form in response to selecting to transfer an "other amount". This feature may be particularly useful in instances in which the customer's account is a credit, mortgage, or loan account. In the illustrated example of FIG. 5C, the customer has selected the polling button associated with last statement balance, a frequency of monthly on the due date and duration of continue indefinitely. In this regard, the customer has configured a credit card payment or the like to occur automatically (i.e., a so-called auto-pilot mode), such that current statement balance is paid in full on the monthly due date. Such transfer/payment will occur indefinitely (i.e., until the customer turns-off the auto-pilot mode or otherwise reconfigures the transfer/payment).

In other embodiments of the invention, the amount input field may be configured to provide polling buttons, or other input fields that allow the customer to transfer a specified percentage of an account balance (or any other percentage of a deposit) or an amount over a specified threshold account balance. Such configuration is conducive to recurring transfers, in which the customer desires to transfer an unknown amount of funds from one account to another account (either another account of their own or an account of another) on a specified day (e.g., last day of the month or the like). For example, the customer may configure a recurring transfer that transfers 10% of a checking account balance that exists on the last day of each month or the amount in excess of $500 (specified threshold amount) existing in the account on the last day of the month. Such configuration allows for a customer to automatically transfer undetermined amounts to a savings account, a family member or a loan/credit payment account based on what is perceived to be excess funds in a demand deposit, checking account or other account.

In specific embodiments of the invention, the fund transfer management module 300 is in communication with the customer's account databases, which store the customer's current balance information and current statement information. As such, the minimum payment amount, last statement balance, and current account balance displayed in the user-interface of FIG. 5A, may be retrieved from the credit account (e.g., credit card account) and/or statement such that the form reflects the most up to date information. In specific embodiments of the invention, the minimum payment amount, last statement balance, current account balance and the like are retrieved from the credit account and/or statement in real-time or near real-time. The customer may additionally be allowed to specify the date on which the payment will post to the account by providing selected input within a "Posting Date" input box 334. In alternate embodiments of the invention, the fund transfer management module 300 may be configured to determine and display the estimated posting date based on the transfer date selected by the customer. As such, in specific embodiments, in response to selecting to pay the minimum payment amount and requesting for the frequency of the transfer and/or payment to be monthly or with respect to another continuous basis, the system may automatically determine the minimum payment amount (based on the minimum amount due as reflected in the current account statement) on a continual basis to be associated with each transfer.

In addition, as shown in FIG. 5A, a graphical fund transfer indicator 323, in the form of an arrow, is displayed leading from the "From" input box 320 to the "To" input box 322 and from the "Transfer Date" input box 330 to the "Posting Date" input box 334 as a means of indicating to the customer/user the flow of funds that will occur between accounts and/or recipients.

In some embodiments of the invention, the fund transfer management module 300 may project or estimate future minimum payment amounts and/or future statement balances based on the historical trends associated with the customer's credit account. In such embodiments of the invention, the transfer/payment options that are presented in the user interface may include the projected or estimated future minimum payment amounts, future statement balances or the like. In other embodiments of the invention, the customer may select the frequency to be paid monthly on the due date, such that, in response to selecting a frequency option to transfer the payment monthly on the due date the module 300 may provide an additional input field which enables the customer to specify the duration for which the transfer should occur (e.g., "continue indefinitely" which may occur until the account is paid in full), and a date on which the transfer should start. In other embodiments of the invention, in which the input field is configured to receive the transfer initiation date, the module may be configured to automatically populate the input field with the current payment due date associated with the account (as reflected by the current account statement).

As illustrated in FIG. 6A, the fund transfer management module 300 is configured to allow the user to request to transfer funds to their respective internal mortgage account (i.e., me-to-me fund transfer from a customer's checking account to the customer's mortgage account). In automated response to the customer/user selecting the transfer type shown in FIG. 6A, the fund transfer management module 300 is configured to display, within the user interface, transfer options that are specific to the selected transfer type. In such embodiments, the user-interface/digital form may be configured such that the customer can specify payment amount, as well as, parameters such as the frequency at which the transfer should occur and the date on which the transfer should be processed and/or initiated. To this extent, the form may include an amount input field (e.g., check boxes) 324 for allowing the customer to specify an amount to transfer and/or pay, a "Frequency" input box (e.g., text box, drop down menu, and the like) 328 for allowing the customer to specify an account from which the funds should be transferred, and a "Transfer Date" input box (e.g., text box, drop down menu, and the like) 330 for allowing the customer to specify a date on which the funds should be transferred. In such embodiments of the invention, the amount input field 324 may provide one or more check boxes that allow the customer to specify to transfer either the payment amount due and additionally transfer an additional principal or escrow amount in which the customer may manually input a payment amount into text input fields presented within the form in response to selecting to transfer an "additional principal" or "additional escrow". The customer may additionally be allowed to specify the date on which the payment will post to the account by providing selected input within a "Posting Date" input box 334.

In addition, as shown in FIG. 6A, a graphical fund transfer indicator 323, in the form of an arrow, is displayed leading from the "From" input box 320 to the "To" input box 322 and from the "Transfer Date" input box 330 to the "Posting Date" input box 334 as a means of indicating to the customer/user the flow of funds that will occur between accounts and/or recipients.

As illustrated in FIG. 6B, in specific embodiments of the invention, the customer may select the frequency as "monthly on the due date", such that, in response to selecting the frequency option to transfer the payment monthly on the due date, the system is automatically configured to display an additional input field which enables the customer to specify the duration for which the transfer should occur (e.g., "continue until loan is paid off" or the like), and a date on which the transfer should start. For example, if the loan is maintained internally by the financial institution such that the financial institution is privy to information such as the term of the loan and may calculate the number of payments needed in order to pay off the loan such that the duration is equated to the number of payments required. In other embodiments, in which the customer pays a supplemental amount in addition to the principal amount the system may be configured to continuously recalculate the payment amount required until the loan is paid off. For example, in such an embodiment, the final payment may be determined to be less than the prior recurring payment amounts as it only represents the remaining balance on the account. It should be noted that although the frequency option "monthly on the due day" is discussed with respect to credit and mortgage accounts, other transfers may be configured to occur monthly on a specific date including transfers associated with accounts such as external accounts (i.e., accounts held at financial institutions other than the financial institution instituting the fund transfer module), checking accounts, savings accounts, and/or other accounts not explicitly contemplated herein. In some embodiments, the system may be configured to transfer a variable amount on a recurring schedule. For example, the variable amount may be related to a percentage value such as 10 (ten) percent of any incoming transfers.

In the illustrated example of FIG. 6B, the customer has selected the polling button associated with "payment due", a frequency of "monthly on the due date", and duration of "continue until loan is paid off". In this regard, the customer has configured a loan or mortgage payment or the like to occur automatically (i.e., a so-called auto-pilot mode), such that current payment due on the loan/mortgage is paid on the monthly due date. Such transfer/payment will occur until the loan/mortgage is paid off in full or until the customer turns-off the auto-pilot mode or otherwise reconfigures the transfer/payment).

As illustrated in FIG. 7A, the fund transfer management module 300 is configured to allow the user to request to transfer funds to a customer's external bank account not internally associated with the financial institution or entity responsible for maintaining the fund transfer management module 300. In automated response to the customer/user selecting the transfer type shown in FIG. 7A, the fund transfer management module 300 is configured to display, within the user interface, transfer options that are specific to the selected transfer type. In such embodiment s of the invention, the transfer options may include, in addition to transfer amount, frequency at which the transfer should occur, the date on which the transfer should be processed and/or initiated, and the speed at which the payment should be delivered. To this extent, the form may include, in addition to the transfer amount input box 324, a "Frequency" input box (e.g., text box, drop down menu, and the like) 328 for allowing the customer to specify the frequency that transfer(s) occur, and a "Transfer Date" input box (e.g., text box, drop down menu, and the like) 330 for allowing the customer to specify a date on which the funds should be transferred, and a "delivery speed" input field (e.g., polling buttons) 336 for allowing the customer to specify how soon the transferred amount should be delivered and/or received by the external entity. In such an embodiment, the delivery speed 336 may provide one or more polling buttons that allow the customer to specify that the transferred amount should be received by the external entity within three (3) business days, the next business day, or the same business day by wire transfer. In some embodiments, the selected delivery speed may be associated with a payment amount or cost such that the cost of the selected delivery speed is displayed adjacent to the selected option. In specific embodiments of the invention, the cost of the selected delivery speed may be calculated in real-time or near real-time such that the fund transfer management module 300 may determine whether or not the customer has adequate funds to cover the cost of delivery and remove the option in response to determining the customer does not have adequate funds to cover the cost of delivery.

In addition, as shown in FIG. 7A, a graphical fund transfer indicator 323, in the form of an arrow, is displayed leading from the "From" input box 320 to the "To" input box 322 and from the "Transfer Date" input box 330 to the "Estimated Arrival" input box 338 as a means of indicating to the customer/user the flow of funds that will occur between accounts and/or recipients.

As illustrated in FIG. 7B, in response to selecting the transfer date input field 330, the system may present a calendar that allows the customer to select an available transfer date and subsequently populate the input field 330 with the selected date. The system may be configured to determine and display the estimated arrival date based on the transfer date selected by the customer within an "Estimated Arrival" input box 338.

As illustrated in FIG. 8, the fund transfer management module 300 is configured to allow the user to request to transfer funds to an international bank account held by the customer at a financial institution other than the financial institution implementing the fund transfer module 300. In automated response to the customer/user selecting the transfer type shown in FIG. 8, the fund transfer management module 300 is configured to display, within the user interface, transfer options that are specific to the selected transfer type (i.e., transfer to an international account). In such embodiments of the invention, the transfer options may include, in addition to transfer amount (both domestic and international), delivery speed, including payments associated with delivery speed, and transfer initiation date.

In specific embodiments, in which the account to which the funds are being transferred is an international account, such as shown in FIG. 8, in response to inputting the transfer amount into the transfer amount field 324, the fund transfer management module 300 may automatically determine the exchange rate and convert the transferred domestic amount to the foreign currency amount and display the foreign currency amount within a "foreign amount" field 340. Exchange rate is determined based on the fund transfer management module 300 communicating with an exchange rate system/module capable of providing exchange rates. In specific embodiments of the invention, exchange rates are determined in real-time or near real-time, such that the displayed foreign currency amount and/or domestic amount reflect up-to-the-minute current exchange rates. Conversely, a customer/user may input a foreign/international amount in "foreign amount" field 340, and the fund transfer management module 300 automatically determines the exchange rate to be applied and converts the foreign currency amount to the domestic amount and displays such within the transfer amount field 324.

In further embodiments, the user-interface/digital form may a "delivery speed" input field (e.g., polling buttons) 336 for allowing the customer to specify how soon the transferred amount should be delivered and/or received by the external entity. In such an embodiment, the delivery speed 336 may provide one or more polling buttons that allow the customer to specify so that the transferred amount should be received by the next business day, and/or one or more additional options. In some embodiments, the selected delivery speed may be associated with a payment amount/cost and a cutoff time such that the cost of the selected delivery speed and cutoff time for request the selected delivery is displayed adjacent to the selected option. In general, the payment associated with delivery typically increases as the delivery speed decreases (e.g., higher payment as the delivery speed goes from 2 days to 1 day and the like). In specific embodiments, the fund transfer management module 300 may determine whether or not the cutoff time has passed and remove the option in response to determining the cutoff time has passed.

Further, in other specific embodiments the transfer options include a "Transfer Date" input box (e.g., text box, drop down menu, and the like) 330 for allowing the customer to specify a date on which the funds should be transferred, and an estimated arrival date based on the transfer date selected by the customer within an "estimated arrival" field 338. In specific embodiments of the invention, the 'estimated arrival field 338 may allow for user input/selection, such, that the customer/user can change the estimated arrival (e.g., extended the arrival date beyond the conventional arrival date). The fund transfer management module 300 may additionally provide the customer with additional options such as the ability to make the transfer on behalf or someone else or enter a promo code. For example, the user-interface/digital form may be configured to display transaction description check box 332, transfer on behalf of another check box 342 to request to make the transfer on behalf of someone else, and/or promotional code box 344 to enter a promo code in which the promo code may provide a better exchange rate or a discount on the cost of transfer and exchange.

As depicted in FIG. 8 the layout of the user-interface/digital form is especially configured so as to be intuitive to the user in terms what information needs to be selected or inputted and provides the customer/user with an indication of where to and how the flow of funds occurs within the fund transfer process. In this regard, in accordance with specific embodiments of the invention, a left-side column of the user-interface/digital form is configured to display sender-related information (e.g., transferor account, domestic transfer amount, delivery speed, transfer initiation date and the like), while a right-side column of the user-interface/digital form is configured to display recipient-related information (e.g., international recipient/account identifier, international transfer amount, estimated arrival date and the like). Additionally, the layout of the user-interface/digital form is configured to display graphical fund transfer indicators, in the form of one-directional and bi-directional arrows that indicate the flow of funds between sender-related information and recipient-related information. For example, as shown in FIG. 8, a graphical fund transfer indicator 323, in the form of an arrow, is displayed leading from the "From" input box 320 to the "To" input box 322 and from the "Transfer Date" input box 330 to the "Estimated Arrival" input box 338 as a means of indicating to the customer/user the flow of funds that will occur between accounts and/or recipients. In addition, a bi-directional arrow is displayed between domestic transfer amount field 324 and foreign currency amount 340 to indicate the exchange rate concept between the domestic and international transfer amounts.

As illustrated in FIG. 9A, the fund transfer management module 300 is configured to allow the customer/user to request to transfer funds to an internal account held by an entity other than the customer/user, such as family member, friend, business or the like (i.e., me-to-you fund transfer from a customer's checking account to the another financial institution customer's internal account). In automated response to the customer/user selecting the transfer type shown in FIG. 9A (i.e., transfer to another customer's internal account), the fund transfer management module 300 is configured to display, within the user interface, transfer options that are specific to the selected transfer type. To this extent, the user-interface form may include, in addition to transfer amount input box 324, a "Frequency" input box (e.g., text box, drop down menu, and the like) 328 for allowing the customer to specify the frequency of the transfers, and a "Transfer Date" input box (e.g., text box, drop down menu, and the like) 330 for allowing the customer to specify a date on which the funds should be transferred (since the transfer is internal it can occur from start to finish in one business day). Since the recipient is an internal entity with respect to the financial institution, the customer is able to specify transfer frequency parameters. The system may additionally provide the customer with added options such as the ability to include a message to be sent to the internal recipient notifying the internal recipient/customer of the transfer and/or the transfer amount. For example, the customer may be enabled to select a check box 332 to include a message to the funds transfer recipient.

As illustrated in FIG. 9B, the fund transfer management module 300 is configured to, in response to receiving, in "from" input box 320, a customer's selection/input of the first financial account that funds the transfer and, in "To" input box 322, the second financial account or recipient that receives the transfer, display within the user-interface a "one-click" option that allows the customer to make the same transfer (i.e., same amount, same transfer timing and the like) as the last-in-time transfer made using the selected first financial account and the selected second financial account or recipient. In specific embodiments of the invention, the user is presented with last-in-time option box 322 which queries the customer as to their desire to perform the same transfer as the last-in-time transfer to the transferor account or recipient and provides details of the last-in-time transfer made to the account/recipient, including transfer amount and payment/transfer identifier (in FIG. 9B, an email address). In the illustrated embodiment shown in FIG. 9B, the "yes" key 325 is initially presented to the customer in an engaged or default mode. In the engaged/default mode, if the customer chooses to accept the last-in-time transfer option, the customer is required to perform no further action (i.e., the customer is not required to select/identify further transfer options). The customer will engage the continue key 326, which provides for re-directing the customer to a transfer confirmation page/user-interface, at which the details associated with the desired transfer are displayed and the customer confirms the transfer. Once confirmed the transfer occurs or is scheduled to occur. If the customer chooses to decline the last-in-time transfer option, the customer engages/selects the "no" key 327 (which automatically disengages the "yes" key) and engages the continue key 326, which provided for presenting, in the user-interface, transfer option input fields, such as transfer amount, transfer timing and the like (shown in FIG. 9A and the like), that the customer is required to provide input/selection in order to configure the transfer requisite.

As illustrated in FIG. 10, the fund transfer management module 300 is configured to allow a customer/user to transfer funds to an external account (e.g., a different financial institution) held by an entity other than the customer/user, such as family member, friend, business or the like (i.e., me-to-you fund transfer from a customer's checking account to the another customer's externally-held account). In the example shown in FIG. 10 the external account is identified though an account number provided by the customer/user. In automated response to the customer/user selecting the transfer type shown in FIG. 10 (i.e., transfer to another customer's external account), the fund transfer management module 300 is configured to display, within the user interface, transfer options that are specific to the selected transfer type. To this extent, the form may include a "Frequency" input box (e.g., text box, drop down menu, and the like) 328 for allowing the customer to specify how often transfers should occur, and a "Transfer Date" input box (e.g., text box, drop down menu, and the like) 330 for allowing the customer to specify a date on which the funds should be transferred, and a "delivery speed" input field (e.g., polling buttons) 336 for allowing the customer to specify how soon the transferred amount should be delivered and/or received by the external entity. In such an embodiment, the delivery speed input field 336 may provide one or more polling buttons that allow the customer to specify to that the transferred amount should be received by the external entity within three (3) business days, the next business day, or the same business day by wire transfer. In other embodiments delivery speeds may be limited to next business day and same day by wire. In some embodiments, the selected delivery speed may be associated with a payment amount or cost such that the cost of the selected delivery speed is displayed adjacent to the selected option. The fund transfer management module 330 may additionally be configured to display message request check box 332 that provides the customer with an added option to include a message to be sent to the internal recipient as previously discussed herein.

As illustrated in FIG. 11, the fund transfer management module 300 is configured to allow a customer/user to transfer funds to an external account (e.g., a different financial institution account) held by an entity other than the customer/user, such as family member, friend, business or the like (i.e., me-to-you fund transfer from a customer's checking account to the another customer's externally-held account). In automated response to the customer/user selecting the transfer type shown in FIG. 11 (i.e., transfer to another customer's external account), the fund transfer management module 300 is configured to display, within the user interface, transfer options that are specific to the selected transfer type. To this extent, the form may include a "To" input box (e.g., text box, drop down menu, and the like) 322 for allowing the customer to specify a recipient to which the funds should be transferred. In such an embodiment, the recipient may be specified based on an email address and/or mobile address such that the funds transfer is processed via an email mobile transfer.

As such, an explicit account and routing number is not required to send the recipient funding. In one embodiment, the mobile email transfer is processed by setting up a peer to peer (P2P) transfer between the account holder and the intended recipient. For example, the recipient may be sent an email notification that the account holder has transferred funds to the recipient and the recipient is required to provide information to the system for use in creating a P2P account on behalf of the recipient for use in receiving the funding for the account holder or if the recipient has previously set-up the P2P account the email notification may indicate that a fund transfer has been received by the recipient.

As illustrated in FIG. 12 and similar to FIG. 11, a funds transfer may be similarly sent using a mobile number instead of an email address as the payment account identifier. For example, the recipient may be sent a text notification that the account holder has transferred funds to the recipient and the recipient is required to provide information to the system for use in creating a P2P account on behalf of the recipient for use in receiving the funding for the account holder or if the recipient has previously set-up the P2P account the text notification may indicate that a fund transfer has been received by the recipient.

As illustrated in FIG. 13, the fund transfer management module 300 is configured to allow the user to request to transfer funds to an international bank account held by the another entity (family, member, friend, business or the like) at a financial institution other than the financial institution implementing the fund transfer module 300. In automated response to the customer/user selecting the transfer type shown in FIG. 8, the fund transfer management module 300 is configured to display, within the user interface, transfer options that are specific to the selected transfer type (i.e., transfer to an international account held by another). In such embodiments of the invention, the transfer options may include domestic transfer amount and/or international/foreign transfer amount, delivery speed, transfer initiation date and/or estimated arrival date.

In specific embodiments, in which the account to which the funds are being transferred is an international account, such as shown in FIG. 13, in response to inputting the transfer amount into the transfer amount field 324, the fund transfer management module 300 may automatically determine the exchange rate and convert the transferred domestic amount to the foreign currency amount and display the foreign currency amount within a "foreign amount" field 340. Exchange rate is determined based on the fund transfer management module 300 communicating with an exchange rate system/module capable of providing exchange rates. In specific embodiments of the invention, exchange rates are determined in real-time or near real-time, such that the displayed foreign currency amount and/or domestic amount reflect up-to-the-minute current exchange rates. Conversely, a customer/user may input a foreign/international amount in "foreign amount" field 340, and the fund transfer management module 300 automatically determines the exchange rate to be applied and converts the foreign currency amount to the domestic amount and displays such within the transfer amount field 324.

Additionally, the user-interface/digital may be configured to display transfer options including a "Transfer Date" input box (e.g., text box, drop down menu, and the like) 330 for allowing the customer to specify a date on which the funds transfer should be initiated, and a "delivery speed" input field (e.g., polling buttons) 336 for allowing the customer to specify how soon the transferred amount should be delivered and/or received by the external entity. In such an embodiment, the delivery speed 336 may provide one or more polling buttons that allow the customer to specify to that the transferred amount should be received by the next business day, and/or one or more additional options. In some embodiments, the selected delivery speed may be associated with a payment amount/cost in which both the delivery speed options and associated cost may be determined by the system based on the location of the account to which the funds are being transferred. The system may be configured to determine and display the estimated arrival date based on the transfer date selected by the customer within an "estimated arrival" field 338. The estimated arrival date may be prepopulated based on the chosen transfer initiation date and/or the estimated arrival date may be configured to be selected by the customer/user.

The fund transfer management module 300 may additionally provide the customer with additional options such as adding a transaction description, notifying the recipient via email of the transfer, the ability to make the transfer on behalf or someone else or enter a promo code. For example, the user-interface/digital form may be configured to display transaction description check box 332, email recipient check box 346, transfer on behalf of another check box 342 to request to make the transfer on behalf of someone else, and/or promotional code box 344 to enter a promo code in which the promo code may provide a better exchange rate or a discount on the cost of transfer and exchange.

As depicted in FIG. 13 the layout of the user-interface/digital form is especially configured so as to be intuitive to the user in terms what information needs to be selected or inputted and provides the customer/user with an indication of where to and how the flow of funds occurs within the fund transfer process. In this regard, in accordance with specific embodiments of the invention, a left-side column of the user-interface/digital form is configured to display sender-related information (e.g., transferor account, domestic transfer amount, delivery speed, transfer initiation date and the like), while a right-side column of the user-interface/digital form is configured to display recipient-related information (e.g., international recipient/account identifier, international transfer amount, estimated arrival date and the like). Additionally, the layout of the user-interface/digital form is configured to display graphical fund transfer indicators, in the form of one-directional and bi-directional arrows that indicate the flow of funds between sender-related information and recipient-related information. For example, as shown in FIG. 8, a graphical fund transfer indicator 323, in the form of an arrow, is displayed leading from the "From" input box 320 to the "To" input box 322 and from the "Transfer Date" input box 330 to the "Estimated Arrival" input box 338 as a means of indicating to the customer/user the flow of funds that will occur between accounts and/or recipients. In addition, a bi-directional arrow is displayed between domestic transfer amount field 324 and foreign currency amount 340 to indicate the exchange rate concept between the domestic and international transfer amounts.

As illustrated in FIG. 14, the system may provide a plurality of options in response to specifying a frequency within the frequency input field 328. As such the frequency may be specified as one time, weekly, monthly and the like. In some embodiments, the system may automatically calculate and/or determine an estimated arrival date to be associated with the requested transfer date, while in other embodiments of the invention the customer/user request/select an estimated arrival date. Additionally, in automatic response to the customer/selecting a recurring frequency (i.e., more than a one-time transfer), the fund transfer management module will display in the user-interface/digital form a duration input field 350 (e.g., drop down menu or the like). A default duration may be automatically populated within a duration field 350 (based on previous inputs/selection, such as a last-in-time input or the like) and/or configured to be edited such that the customer is able to specify a duration period for any given transfer, where the duration period may include, but not be limited to, continued indefinitely 350, continue until a set number of transfers have been scheduled 350A, continue until a set end date 350B, and continue until a set dollar amount has been scheduled 350C. In the event the customer selects the duration as continue until a set number of transfers have occurred 350A, the module 300 will automatically display in the user-interface a start date input box 352 and a number of transfers 354 that are configured to allow the customer to select a start date and the number of transfers. In the event the customer selects the duration as continue until a set end date 350B, the module 300 will automatically display in the user-interface a start date input box 352 and transfer en on date input field 356 that are configured to allow the customer to select a start date and an end date for the transfers. In the event the customer selects the duration as continue until a set end date 350C, the module 300 will automatically display in the user-interface a start date input box 352 and total amount to transfer input field 358 that are configured to allow the customer to select a start date and a total amount for cumulative transfers.

As illustrated in FIG. 15A, the fund transfer management module 300 may provide a plurality of options in response to the customer selecting the "to" input field 322 for specifying an account and/or recipient to which the funds should be transferred. In one embodiment, in response to selecting the "to" input field 322, the system may present one or more subsidiary drop down menus that may be expanded or minimized at the request of the customer. In the illustrated embodiment of FIG. 15A, a first subsidiary drop down menu 322A comprising one or more of the customer's internal and external accounts, a second subsidiary drop down menu 322B comprising one or more of the customer's internal and external transfer contacts, and an option to add additional accounts and contacts to the drop down menus. As such, the customer may be configured to manually add contacts, add contacts from social media, a mobile device, other computing device, messaging application, and the like. In an exemplary embodiment, the first account or contact listed under the first and second subsidiary drop down menus, respectively, is the last account or contact used by the customer in the previous transfer request.

Further, an available transfer to account may be highlighted in response to the customer hovering a mouse (or other input device) over the account. In response to the customer hovering a mouse (or other input device) over a contact the system may present additional contact information associated with the contact. For example, a contact's default information may include a mobile number such that in response to selecting the contact, the customer is also presented with a mobile number, email address, and an option to set up an additional account for sending the customer transferred funds. Additionally, the contact list may be extensive such that that system is configured to predict a contact in response to the customer typing at least a portion of the contact information into the "to" input field 322 (e.g., first two letters of the contact name). After selecting an account or contact, the selected account or contact is populated with the "to" input field 322.

FIG. 15B is a schematic illustrating a type-ahead/search feature provided by the fund transfer management module, in accordance with embodiments of the present invention, a customer may provide partial inputs to an input box, such as "From" input box 320 or "To" input box 322 and be presented with display, in a drop-down menu type configuration, of the items associated with the input box that are responsive to the partial input. For example, as shown in FIG. 15B, the customer has inputted "me" in the "to" input box 322 and the type-ahead/search has responded with display of an external account beginning with the letters "me", an email address of a known recipient that contains the letters "me" and the name of a recipient that contains the letters "me". The type-ahead/search function is highly beneficial to customers who may recall a portion, but not the entirety, of an account name, a recipient/contact or the like. The displayed listing of responsive accounts, contacts or the like allows the customer to choose from the list (click on a display item) and the chosen account, contact or the like is displayed/inputted in the corresponding input box.

As illustrated in FIG. 16, in one embodiment, in response to receiving customer selection of the option to view transfer activity 308 and further receiving customer selection of the option to present a list view of transfer activity (by activating list view check box 360A), the fund transfer management module 300 may provide a consolidated list view of all transfer activity which may include, but not be limited to, internal account transfers, incoming transfers, and outgoing transfers in which pending outgoing transfers or outgoing transfers that have not yet been processed (e.g., a recurring transfer). The transfer activity may be edited, canceled, and or an option may be provided to view additional details associated with the listed entry. The transfer activity may include information such as the date, the account from which the funds were and/or will be transferred, the account to which the funds were and/or will be transferred, a description of the transfer (e.g., outgoing transfer, between account holders accounts, incoming transfer, and the like), a status of the transfer (e.g., scheduled, completed), the transfer amount, additional options (e.g., edit, cancel, view plan, and the like). In some embodiments, the customer is able to specify a time frame for which the consolidated list view of transfer activity should be presented. For example, the customer may select an option to present the last 30 days 362 or another time period from a drop down menu or select a start date 364A and end date 364B for a time period to present transfer activity. The customer may be presented with additional options such as an option to print the transfer activity. Furthermore, if the consolidated list is an extensive list the system may utilize a plurality of pages to present the transfer activity such that the customer is enabled to view a first, previous, next, or last page of transfer activity.

As illustrated in FIG. 17, in one embodiment, in response to receiving customer selection of the option to view transfer activity 308 and further receiving customer selection of the option to present a calendar view of transfer activity (by activating calendar check box 360B), the system may provide a calendar view of all transfer activity which may include, but not be limited to, electronic bills, bill payments, and other transfers made within the fund transfer management module 300 or, in some embodiments, made external to the module 300. In one embodiment, the default calendar view may include presenting a monthly view of the customer's transaction activity in which the customer is able to view where funds are planned to be sent and where funds have previously went. In alternate embodiments, the customer may request to view a more detailed presentation of the transfer activity in which the transfer activity may be presented according to a weekly view and/or a daily view. Furthermore, the system may utilize various visual identifiers (e.g., icons, color coding, patterns, and the like) to indicate the type of transaction activity that is associated with a particular day. For example, on the $14^{th}$ day of the month, the calendar entry may be shaded to indicate the transfer corresponds to incoming or received funds (as opposed to other dates, such as $28^{th}$ day, $1^{st}$ day, $2^{nd}$ day and the like which indicate transfers made by the customer to internal and external accounts.

As illustrated in FIG. 18, in one embodiment, in response to receiving customer selection of the option to view transfer activity 308 and further receiving customer selection of the option to present a timeline view of transfer activity (by activating timeline check box 360C), the system may provide a timeline view of all transfer activity which may include, but not be limited to, period (e.g., monthly, weekly, and the like) timeline views of transfer activity, the ability to move transfers, and visual indicators to transaction parameters (e.g., amount transferred, incoming, outgoing, and the like). In such an embodiment, each individual transaction or a plurality of transactions corresponding to a single day may have a single identifier (e.g., bar, circle, and the like) along the timeline. In the illustrated example of FIG. 18, timeline 370 is depicted, the current date is indicated by circle 372 disposed on the timeline. A customer may scroll the timeline to display additional dates and corresponding transfer data. Fund transfers that have already occurred are indicted to the left of the circle 372 and fund transfers that are scheduled to occur are indicated to the right of the circle 372. In the illustrated example, each bar 374 represents fund transfer activity on a specified date. The date may be indicated on the timeline are shown when hovering over or activating the bar. The height of the bar may be indicative of the total of amount of transfers made on the specified date. In addition, unshaded bars 374A may indicate transfers made out of the customer's accounts and shaded bars 374B may indicate transfers may into the customer's accounts. In other embodiments of the invention, the shading of the bars 374 may be indicative of different accounts held by the customer. In addition, a customer may hover or otherwise active a bar 374 to show additional information window 376 that is configured to display more information about the specific transfers associated with the selected bar (i.e., the selected transfer date).

As illustrated in FIG. 19, in other embodiments of the invention, in response to receiving customer selection of the option to view transfer activity 308 and further receiving customer selection of the option to present a tile view (activating tiles check box 360D) of transfer activity, the fund transfer management module 300 may provide a tile view of all transfer activity which may include, but not be limited to, grouped views of past transfers 380 (e.g., previously processed), pending transfers (e.g., currently being processed), and future transfers (e.g., scheduled to be processed) transactions. The transfers may be grouped within categories in which each individual tile may be stacked sequentially stacked based on various factors such as date of processing, date of request, transfer type and the like. In response to hovering over any group of tiles or otherwise activating a group, the module 300 may automatically unstack the tiles or the customer may scroll through the tiles and present more detailed information for each individual transfer or the customer may select individual tiles from a group to be displayed in the user-interface. In the illustrated embodiment of FIG. 19, tile 380A, which indicates via icon 388 a recurring transfer, tile 380B, which indicates via icon 390 a transfer to another entity and tile 380C are displayed in the user-interface. Further, the customer has activated or otherwise hovered over tile 380B to display window 386 which is configured to display further information associated with the transfer indicated by tile 380B.

As illustrated in FIG. 20, in response to receiving selection of option 310 to conduct and manage automated account related funds transfers, the system may present a detailed view of one or more automatic transfer plan descriptions and/or scheduled recurring transfers. The automatic transfer plan descriptions may include information such as the account from which the funds are being transferred, the account to which the funds are being transferred, a description including the transfer type (e.g., one time, recurring transfer, and the like), the transfer amount, the automated transfer duration, and one or more options to either edit and/or cancel the transfer. The scheduled recurring transfers section may indicate detailed information for each individual upcoming transfer associated with an automatic transfer plan. For example, the scheduled recurring transfer may indicate the actual outgoing payment/funds transfer including the date on which the funds are scheduled to be transferred, the account from which the funds are scheduled to be transferred, the amount of the transfer, and one or more options to either edit/cancel the transfer and/or view additional transfer details.

As previously mentioned, in response to selecting the "transfers" option 304, the customer may be directed to a user-interface comprising one or more subsidiary options for conducting and managing transfers within the fund transfer management portal. In addition to the subsidiary options previously discussed herein, the subsidiary options may also include, but not be limited to, options associated with managing the customers contacts such as, shown in FIG. 32, a "contacts" option 312 to manage general contacts for processing transfers to other individuals, and an "external accounts" option 314 to manage external accounts for processing transfers to one or more external accounts of the customer.

As illustrated in FIG. 21, in response to selecting the option to manage general contacts for processing transfers to other entities/individuals 312, the system may present a consolidated detailed view of one or more contacts and options for managing the current contact and adding additional contacts. The system may first present an option to add a contact in which the contact may be automatically imported from one or more accounts associated with the customer (e.g., social network, email messaging account, electronic address books, and the like) or manually entered by the customer. A contact list may be provided to allow the customer to view and edit contact information associated with currently added contact. The contact information may include, but not be limited to, the contact name and/or nickname, the contact information (e.g., email address, phone number, account number(s), and the like) for use in processing transfer request, and the status of the contact (e.g., inactive, active, not registered). An active or inactive status may indicate whether or not the email address of the customer is currently in use and a not registered status may indicate that the contact has not followed through with the necessary steps to receive funds from the customer. Additionally options may be presented in which the customer may view, edit, and or delete a contact. In one embodiment, the contact list is interactive such that selection of contact information may initiate either a transfer request or the ability to edit the contact information. For example, in response to the customer selecting the mobile number of a contact, the system may present a transfer request form (i.e., user-interface/digital form shown in FIG. 12) in which the "to" field is automatically populated with the information of the contact (e.g., name and mobile number). In another example, in response to selecting the name of the contact, the customer is allowed to edit one or more fields of information associated with the contact. In addition to managing general contact information, the system may also present information associated with how the customer is able to receive transferred funds such that the customer can edit their preferences for receiving transferred funds (e.g., email address, mobile number, account numbers, and the like). Similar to contact status indicators, the system may indicate whether or not the customer information provided is active or inactive.

As illustrated in FIG. 22, in response to selecting the option to manage external accounts for processing transfers to one or more external accounts of the customer 314, the system may present a consolidated detailed view of one or more external customer accounts and options for managing the external accounts. External accounts are accounts held by the customer/user at financial institutions (i.e., banks, mortgage companies, investment companies and the like) other than the financial institution implementing/offering the fund transfer platform herein described. The fund transfer management module 300 may first present an option to add an external account in which the external account may be automatically imported from one or more accounts associated with the customer (e.g., third party financial institution online banking account, social network, email messaging account, electronic address books, and the like) or manually entered by the customer in which the account may be either domestic or international. An external account list may be provided to allow the customer to view and edit external account information associated with currently added external accounts. The external account information may include, but not be limited to, the financial institution name and/or nickname, the account number, the account type, the transfer types (e.g., transfer to only, transfer from only, transfer to or from), and the status of the contact (e.g., inactive, active). An active or inactive status may indicate whether or not the customer has completed the necessary verification steps to ensure that the account is authentic and belongs to the customer. As such, verification may be required before an account is made available for transfer. Such that in some embodiments, the account is visually indicated (e.g., grayed out or the like) as not available for selection until it has been verified and receives an active status indicator. Additionally options may be presented in which the customer may view, edit, and or delete an external account.

In one embodiment, the contact list is interactive such that selection of contact information may initiate either a transfer request or the ability to edit the contact information. For example, in response to the customer selecting the mobile number of a contact, the system may present a transfer request form in which the "to" field is automatically populated with the information of the contact (e.g., name and number). In another example, in response to selecting the name of the contact, the customer is allowed to edit one or more fields of information associated with the contact. In addition to managing general contact information, the system may also present information associated with how the customer is able to receive transferred funds such that the customer can edit their preferences for receiving transferred funds (e.g., email address, mobile number, account numbers, and the like). Similar to contact status indicators, the system may indicate whether or not the customer information provided is active or inactive.

As illustrated in FIG. 23, in response to selecting the "transfers" option 304, the options may expand such that the customer is presented with subsidiary navigation options previously discussed herein, including, but not limited to, an option to transfer or send money, view transfer activity, view and manage automatic transfers, mange contacts, manage external accounts, and the like. Additionally, the system may present an option for managing credit card balance transfers in which the account details or credit card accounts, minimum payment amounts, due dates, and associated transfer accounts may be presented. The system may be configured to further presented confirmation message for any processed transfers or activities previously discussed herein. For example, a customer may be required to confirm at a first confirmation page any entered information (e.g., from account, to account, amount, date, transfer description, and the like) prior to the fund transfer management module 300 processing a transfer request. The fund transfer management module 300 may additionally present one or more messages such as a reminder message for the customer to ensure that the associated accounts have adequate funding to avoid any payments incurred due to exceeding an account balance. The customer may then select options to either make the transfer, edit, and/or cancel the transfer. A second confirmation page may then be presented after submission of the transfer request in which the second confirmation page may provide a confirmation number, printing option, updated account balances for the account from which the funds were transferred and the account to which the funds were transferred (if the information is available), the amount, date, and a transfer description. The fund transfer management module 300 may additionally present one or more messages such as a message indicating the time and dates at which the transfer is expected to post to the related accounts.

Providing a Consolidated Platform for Managing Fund Transfer Requests

Referring to FIG. 24, a high level process flow diagram 2400 is presented for implementing fund transfer management, in accordance with embodiments of the present invention. At Event 2410 the fund transfer management system provides display of a consolidated fund transfer user-interface/digital form. According to specific embodiments the consolidated user-interface/digital form is configured to allow the customer/user to transfer funds from one customer account to another customer account, which is held by the customer internally (i.e., at the financial institution hosting/implementing the fund transfer management module) or externally held by the customer at a financial institution other than the financial institution hosting/implementing the fund transfer management module (either a domestic external financial institution or an international financial institution). Additionally, the user-interface/digital form is configured to allow the customer/user to transfer funds from a customer account to a third party account or recipient (i.e., an individual or business). The third party account may be held internally, externally, including either a domestic external financial account or an international external financial account.

At Event 2420 the user-interface/digital form receives customer selection of a first financial account that funds the transfer and, at Event 2430, the user-interface receives customer selection of a second financial account or a recipient for receiving the transfer of funds. The first account may include any account held by the customer/user at the financial institution hosting/implementing the module or, in other embodiments, accounts held by the customer/user at external financial institutions. The second financial account may include, but is not limited to, an internal credit account, an internal mortgage account, an external domestic financial account, an external international financial account or the like. In other embodiments of the invention, the module may be configured to receive selection of the second financial institution account, such that the account is identified through selection of an account identifier, e.g., a name of an account or recipient, an email address or mobile number associated with a third party entity or the like.

In specific embodiments of the invention, the module is configured to pre-populate an entry in a first account input field with an account used to fund a last-in-time transfer of funds using the module. The customer may then choose to use the last-in-time account as the transferor account or select/input another financial account. In other specific embodiments of the invention, the module is configured to pre-populate an entry in a second account/recipient input field with an account/recipient used to receive a last-in-time transfer of funds using the module. The customer may then choose to use the last-in-time account as the transferee account or select/input another financial account or recipient.

In another specific embodiment of the invention, the module is configured to, in response to receiving a customer's selection of the first financial account that funds the transfer and the second financial account or recipient that receives the transfer, display within the user-interface a "one-click" option to make the same transfer (i.e., same amount, same transfer timing and the like) as the last-in-time transfer made using the selected first financial account and the selected second financial account or recipient.

In automatic response to receiving selection of the second financial account or recipient, at Event 2440, one or more fund transfer options are displayed in the user-interface/digital form, which are determined based on the transfer type (i.e., the selected second financial account or recipient). The transfer options may include but are not limited to, transfer amount, frequency of transfer, duration of transfers, transfer speed, and timing of transfer (transfer initiation date and/or arrival/post date). In specific embodiments of the invention, the module is configured to pre-populate one or more of the transfer option input fields based on the selections associated with a last-in-time fund transfer associated with the selected second financial account or recipient. The customer may then choose to use the pre-populated entries or select/input other entries in the transfer option input fields.

Providing an Intuitive and Consolidated User-Interface/Digital Form within a Fund Transfer Management System Referring to FIG. 25, a high level process flow diagram 2500 is presented to implementing an intuitive and consolidated user-interface/digital form within a fund transfer management system, in accordance with embodiments of the present invention. At Event 2510 a user-interface/digital form is displayed. According to specific embodiments the consolidated user-interface/digital form is configured to allow the customer/user to transfer funds from one customer account to another customer account, which is held by the customer internally (i.e., at the financial institution hosting/implementing the fund transfer management module) or externally held by the customer at a financial institution other than the financial institution hosting/implementing the fund transfer management module (either a domestic external financial institution or an international financial institution). Additionally, the user-interface/digital form is configured to allow the customer/user to transfer funds from a customer account to a third party account or recipient (i.e., an individual or business). The third party account may be held internally, externally, including either a domestic external financial account or an international external financial account.

At Event 2520, in a left-side column of the user interface/digital form, transferor-related input/selection fields are displayed including a transferor financial account input field and one or more transfer-type specific transferor options that are determined and displayed within the user-interface in response to user input/selection of a transferor financial account and a transferee or transferee financial account. The transferor options may include, but are not limited to, transfer amount, delivery speed, frequency, a transfer initiation date and an add transaction description option.

At Event 2530, in a right-side column of the user interface/digital form, transferee-related input/selection fields are displayed including a transferee financial account input field. In addition, in specific embodiments of the invention, a right-side column of the user interface/digital form, the transferee-related input/selection fields additionally includes one or more transfer-type specific transferee options. The transferee options may include, but are not limited to, an international transfer amount, a duration option and an estimated arrival/post date.

At Event 2540, within rows of the user-interface, graphical transfer flow indicators are displayed that separate a corresponding pair of transferor-related input fields and transferee-related input fields. The graphical transfer flow indicator may be a one-directional or bi-directional arrow that separates a corresponding pair of transferor-related input fields and transferee-related input fields, such the transferor financial account input field and a transferee financial account input field, a domestic transfer amount input field and an international transfer amount field, a frequency input field and a duration input filed and the like.

Providing an Account Activity Management System

Referring now to FIG. 26, a high level process flow to implement a system for providing electronic account contact management 2600 is illustrated in accordance with one embodiment of the present invention, which will be discussed in further detail throughout this specification. As illustrated, the method may comprise a plurality of events, including but not limited to, providing access to a fund transfer management module that interfaces with at least one database to access a customer's contact information for use in electronically presenting contacts associated with at least one of the customer's accounts maintained by a financial institution 2610, presenting, via the fund transfer management module, a consolidated view of one or more contacts associated with the at least one account 2620, and processing a transfer request using the contact information associated with the one or more contacts 2630.

At Event 2610, the system may first provide access to a fund transfer management module associated with a financial institution. In an exemplary embodiment, the fund transfer management module interfaces with at least one database to access the customer's contact information for use in electronically presenting contacts associated with at least one of the customer's accounts maintained by a financial institution. The accounts may be maintained by the same financial institution responsible for providing the fund transfer management module. In another embodiment, the accounts may be maintained by a third party financial institution or account provider. The fund transfer management module may be facilitated via a network connection such that the fund transfer management module is configured to be implemented on a mobile device or another device utilized by the customer (e.g., desktop computer). As such, the fund transfer management module may be embodied by a standalone application or accessible via a web browser. Access may be provided to the fund transfer management module similarly to Event 2610 previously discussed herein.

At Event 2620, after providing access to the fund transfer management module that is accessible by the customer and configured to present account activity associated with one or more of the customer's accounts, the system may receive a request to view account information associated with the at least one account, via the fund transfer management module. The request may specify a desired format in which the customer wants to view the account activity. The formats for viewing account activity may include, but not be limited to, a list view, a calendar view, a timeline view, a tile view, and the like. As illustrated in FIG. 16 through FIG. 19, the customer request may be received by selecting an option to view account activity 308, and more specifically activity associated with one or more transferred processed, pending, and/or scheduled for one or more of the customer's accounts maintained by the financial institution. The customer may further define the format in which he/she would like to view account activity by selecting one or more check boxes which indicate the available formats for viewing account activity. In one embodiment, in response to selecting the option to view account activity 308, the account activity is automatically presented in a default format. In some embodiments, the customer may specify via user preferences the default format to be presented for viewing account activity. Alternatively, the system may define the default format to be presented for viewing account activity based on the last format in which the customer requested to view the account activity.

At Event 2630, in response to receiving the request to view the account activity, the system may retrieve financial data from the at least one database for use in presenting the transfer activity of the customer. In an exemplary embodiment, the data comprises the customer's past, pending, and future transfer activity associated with one or more accounts maintained by the financial institution. In some embodiments, retrieving the data further comprises transforming the structure of the data to a structure compatible with the requested format for viewing the account activity. To this extent, the data may be in an unstructured format. The transfer activity and resulting data may include information such as the date of a transfer, the account from which the funds were and/or will be transferred, the account to which the funds were and/or will be transferred, a description of the transfer (e.g., outgoing transfer, between account holders accounts, incoming transfer, and the like), a status of the transfer (e.g., scheduled, completed), the transfer amount, additional options (e.g., edit, cancel, view plan, and the like).

At Event 2640, after retrieving the data, the system may then present the account activity in the requested format specified by the customer. In one embodiment, in which the customer selects to view the account activity in a list view, the system may present a consolidated view of all the transfer activity for one or more accounts of a customer. As such, the transfer activity may include a comprehensive list of transfers that have been previously processed, are pending, and/or scheduled to be processed for all accounts, transfer types, recipients, and the like. In some embodiments, the customer is able to specify a time frame for which the consolidated list view of transfer activity should be presented. For example, the customer may select an option to present the last 30 days or select a start and end date for a time period to present transfer activity. The customer may be presented with additional options such as an option to print the transfer activity. Furthermore, if the consolidated list is an extensive list the system may utilize a plurality of pages to present the transfer activity such that the customer is enabled to view a first, previous, next, or last page of transfer activity.

In another embodiment, in which the customer selects to view the account activity in a calendar view, the system may present a calendar comprising the customer's transfer activity for a predetermined period of time. The system may modify a traditional list view of account activity such that it is presentable within a calendar format such that the customer can visually distinguish his/her past, pending, and future transactions as well as the potential impact of the transfers on an account. In an exemplary embodiment, the time period associated with the calendar is defaulted to a month. Although, in other embodiments, the calendar view may be presented for other periods of time, including but not limited to, a daily view, a weekly, a quarterly view, a yearly view, and the like. In some embodiments, the system may be configured to present a more detailed view of the transfer activity in response to selecting a specific time period within the calendar view. For example, in response to the customer selecting a specific day of the month, the system may present two payment and/or transfers associated with the specific day and present detailed information associated with each individual transfer. In one embodiment, each individual entry for transfer activity may be noted with an icon or other visual identifier to provide additional consolidated information within the general calendar view of transfer activity. For example, the icons may indicate the transfer type (e.g., whether the transfer is recurring or not, whether the transfer is a bill payment, and the like). In some embodiments, the customer may interact with entries for scheduled activities to result in an alteration or edit of the scheduled transfer. For example, if the transfer is scheduled for a first day the customer may drag and drop the scheduled transfer to a second day such that the transfer is automatically rescheduled by the system to be processed on the second day.

In one embodiment, in which the customer selects to view the account activity in a timeline view, the system may present a timeline view of the customers transfer activity. The timeline may be presented for a predetermined period of time (e.g., day, week, month, quarter, year, and the like). For example, a monthly timeline may be presented which notes transfers processed, pending, and/or scheduled from the first day of a respective month to the last day of the month. In some embodiments, the defaulted predetermined period of time for displaying transfer activity is based on the type of account associated with a customer. For example, if the customer is a small business the system may determine they have more frequent transfer activity than an average individual such that the predetermined period of time for displaying and/or presenting transfer activity is defaulted to a week as opposed to a month.

In some embodiments, the timeline is divided such that a first portion of information for a specific transaction is shown above the line and a second portion of information for a specific transaction is shown below the line. For example in one embodiment, the first portion of information includes a visual indicator of the dollar amount associated with a transaction and the second portion of information includes additional transaction details (e.g., account from, account to, available balance after transaction and the like). In another embodiment, the additional transaction details are only revealed in response to hovering over and/or selecting (e.g., clicking) a particular entry for a transfer within the timeline.

In one embodiment, the timeline may present an indicator of the customer's current position. For example, the present day of the month. The timeline may also comprise other visual indicators for transfer activity. For example, a transfer may be noted by a graphed bar within the timeline wherein the height of the bar may indicate one or more parameters associated with the transaction (e.g., the height of the bar may reflect the amount of the transfer), and/or the color or shading of the bar may reflect the transfer type (e.g., incoming, outgoing, and the like).

In some embodiments, the customer may interact with entries for scheduled activities to result in an alteration or edit of the scheduled transfer. For example, if the transfer is scheduled for a first day within the timeline the customer may drag and drop the scheduled transfer to a second day within the timeline such that the transfer is automatically rescheduled by the system to be processed on the second day. To this extent, in some embodiments, the system may further note transfer activity with warning messaging to provide a visual indicator that the customer should consider rescheduling a transfer. For example, if the system determines that a scheduled transfer may result in the account incurring a negative balance, the system may provide a warning message associated with the transfer such that the customer can move that transfer to another day. In such an embodiment, the system may be configured such that days that would also result in a warning message are not available for selection of rescheduling the transfer. For example, if the system determines that a scheduled transfer may result in the account incurring a negative balance, the system may only allow the transfer to be rescheduled on days after an incoming deposit (e.g., ACH payroll). Alternatively, if the system determines that a date on which the customer requests to reschedule a transfer is a holiday, the system may subsequently identify the day as being are not available for selection of rescheduling the transfer.

In one embodiment, in which the customer selects to view the account activity in a tile view, the system may be configured to present consolidated tiles that group the customer's transfer activity. To this extent the transfer activity may be group based on whether the transfer occurred in the past, are pending, or scheduled to be processed in the future. In other embodiments, the transaction may be grouped based on other factors including but not limited to, the associated account, the recipient, the transfer type, the amount (e.g., group based on amount ranges), and the like. In response to selecting (e.g., clicking, hovering over, and the like) a tiled group of transactions, the tiled group may expand and/or cascade such that the customer is able to view more detailed transaction information for each entry within the tiled group of transfer activity. In one embodiment, in which the customer selects to view the account activity in a map view. To this extent that transfer may be associated with a location identifier such that the system may present a location of the account from which the funds were transferred and the account to which the funds were transferred.

In some embodiments, the system may be configured to receive a request to add an entry to the account activity view in which the entry is manually specified by the customer and/or predicted by the system and indicates a transfer entry that the customer is anticipating receiving. For example, the customer may provide input to add an account activity entry which indicates the customer is expecting to receive a deposit at a future time and/or date. In such an embodiment, the added entry may be color coded, shaded or associated with another visual indicator to specify that the entry has been manually entered by the customer or predicted by the system and is therefore indefinite. The system may then calculate an anticipated account balance based on the added entry.

In some embodiments, the system may be configured to determine a recurring pattern within the transfer activity such that the system may provide a visual indicator within the account activity views that suggest the customer implement a recurring transfer based on the parameters (e.g. day, time, amount) determined by the system to be frequently utilized by the customer in processing transfers.

In some embodiments, the customer may request to simultaneously view the account activity in one or more formats such that the pluralities of formats are displayed to the customer at one time. For example, if the customer selects to view account activity in two formats, a top portion of the display may present the account activity according to the first selected format, and a bottom portion of the display may present the account activity according to a second selected format.

Providing a Consolidated User-Interface/Digital Form for Recurring Fund Transfers Referring to FIG. 2700, a high level process flow diagram is presented to establishing and managing recurring fund transfers within a consolidated fund transfer management system, in accordance with embodiments of the present invention. At Event 2710, a user-interface is provided that is configured to receive customer selection of (a) a first financial account that funds a transfer, (b) a second financial institution account for receiving the transfer of funds (c) a transfer amount and, in specific embodiments, (d) the transfer date. In such embodiments of the invention the second account may be one of a credit account, a loan account or some other account that would regularly receive a recurring payment.

At Event 2720, a fund transfer database is accessed that stores historical fund transfer data associated with previous transfers conducted and/or scheduled by the customer. In specific embodiments of the method, the fund transfer database may store historical fund transfer data associated with previous transfers conducted via the fund transfer management module of the present invention or, in some embodiments, the database may additionally fund transfer data associated with previous transfers made using another platform or fund transfer mechanism.

At Event 2730, a fund transfer pattern is determined based on the historical fund transfer data and a plurality (i.e., two or more) of (a) the first financial account that funds a transfer, (b) the second financial institution account for receiving the transfer of funds and (c) the transfer amount. The fund transfer pattern indicates a similarity between previous fund transfers and the current fund transfer, such as same transferor account, same transferee account/recipient, same transfer amount, the transfer data or the like.

At Event 2740, a suggested fund transfer option is displayed that suggests, to the customer, setting-up a recurring transfer based on the fund transfer pattern. The suggested fund transfer option may be displayed in the user-interface, as a pop-up window overlaying the user-interface, in a conformation page for confirming acceptance of the fund transfer or in a timeline or calendar view that shows previous and/or scheduled fund transfers. Additionally, the suggested fund transfer option may provide for display of the transfers that comprise the fund transfer pattern.

At Event 2750, in response to customer selecting or otherwise acquiescing to the suggested recurring transfer option, recurring frequency options and duration options are displayed to the customer and, subsequently, customer selections of a frequency option and duration are received. In specific embodiments of the method, the frequency and duration options displayed are specific to the transfer type (i.e., transferor account and/or transferee account/recipient). In other embodiments of the method the input fields associated with one or more of the frequency option and duration option are pre-populate with frequency and/or duration entries that are selected based on attributes associated with the fund transfer pattern. The frequency options may include, but are not limited to, specified time periods, such as weekly, monthly, yearly or the like and the durations options may include, but are not limited to, continue indefinitely, continue until a predetermined date, continual until a predetermined amount has been transferred, continue until a predetermined number of transfers have occurred and the like.

At Event 2760, a customer input (i.e., confirmation input) is received that requests/confirms the transfer of funds from the first financial account to the second financial account/recipient based on the selected frequency option and selected duration option.

Providing a Contact Management System

Referring now to FIG. 28, a high level process flow to implement a system for providing electronic account contact management 2800 is illustrated in accordance with one embodiment of the present invention, which will be discussed in further detail throughout this specification. As illustrated, the method may comprise a plurality of events, including but not limited to, providing access to a fund transfer management module, whereby the fund transfer management module interfaces with at least one database to access a customer's contact information for use in electronically presenting contacts associated with at least one of the customer's accounts maintained by a financial institution 2810, presenting, via the fund transfer management module, a consolidated view of one or more contacts associated with the at least one account 2820, presenting, via the fund transfer management module, a consolidated view of one or more external accounts associated with the customer 2830, and processing a transfer request using the contact information associated with the one or more contacts 2640.

At Event 2810, the system may first provide access to a fund transfer management module associated with a financial institution. In some embodiments, the fund transfer management module may be accessed via an online banking portal. In an exemplary embodiment, the fund transfer management module interfaces with at least one database to access the customer's contact information for use in electronically presenting contacts associated with at least one of the customer's account. The account contacts may be maintained by the same financial institution responsible for providing the fund transfer management module. In another embodiment, the account contacts may be maintained by a third party financial institution or account provider. The fund transfer management module may be facilitated via a network connection such that the fund transfer management module is configured to be implemented on a mobile device or another device utilized by the customer (e.g., desktop computer). As such, the fund transfer management module may be embodied by a standalone application or accessible via a web browser. It should be noted that providing access to the fund transfer management module may be implemented similarly to Event 2610 discussed previously herein.

The contact information may comprise various parameters related to the customer's contacts such as the contact name and/or nickname, general contact information (e.g., email address, phone number, account number(s), and the like) for use in processing transfer request, and the status of the contact (e.g., inactive, active, not registered). Additionally options may be presented in which the customer may view, edit, and or delete a contact. In one embodiment, the contact list is interactive such that selection of contact information may initiate either a transfer request or the ability to edit the contact information.

At Event 2820, after providing access to the fund transfer management module that is accessible by the customer and configured to present contacts associated with one or more of the customer's accounts, the system may present a consolidated view of one or more contacts associated with the at least one account of the customer. As such, a customer's contacts can be managed from a central location despite the contact type (e.g., email contact, mobile number contact, account number, and the like). The contact management screen may be interactive such that, in one embodiment, a customer is able to edit a contact's information (e.g., email address, mobile number, account number, and the like) in response to either directly selecting at least one parameter associated with the contact and/or selecting an option to view/edit the contact information. As such, the process for modifying existing contact information may be consolidated such that the customer is not required to repetitively add individual line items each time new contact information is required. Alternatively, the customer may seamlessly edit and/or add to an existing contact's information.

In one embodiment, presenting the customer's contacts further comprises determining a status associated with each of the customer's contacts. For example, as illustrated in FIG. 21, the status may indicate whether or not the customer is active, inactive, or not registered. In on embodiment, an active or inactive status may indicate whether or not an email address of the customer in currently in use and a not registered status may indicate that the contact has not followed through with the necessary events to receive funds from the customer. For example, a customer is unable to send money to a contact that is inactive as the current method of contact (e.g., an email address) is invalid. Alternatively, a customer is able to send money to a contact that requires registration. However, the contact may be still required to complete one or more steps (e.g., setup an account and pay an entry cost for use of the service to receive funds transfers).

In addition to contact information, the system may also be configured to present and manage information associated with the customer themselves for use in processing transfers, general transactions, and the like. For example, the customer may be presented with one or more options for receiving money in which the customer may specify by adding and/or editing the email address, deposit account, and/or mobile number which the customer preferably want to use a method to receive funding from other individuals. Similarly to the customer's contacts, the system may note whether or not the preferred methods for receiving funds are active or inactive. To this extent, the customer can specify an account for receiving funding and further associated general contact information (e.g., email address, and mobile number) with the specified account.

At Event 2830, in addition to presenting the customer's contacts the system is further configured to present a plurality of external accounts (e.g. International, domestic, and the like) associated with the customer. In addition to presenting the account, the system may denote the transfer types associated with each of the external accounts in which the transfer type may be transfer to only, transfer from only, and/or transfer to or from. In some embodiments, the transfer type is automatically specified based on the financial institution responsible for maintaining the external account, and in another embodiment, the transfer type is specified based on the preferences of the customer such that the customer is able to edit and change the transfer type of an account at any given time. In one embodiment, presenting the customer's external accounts further comprises determining a status associated with each of the customer's external accounts. For example, as illustrated in FIG. 22, the status may indicate whether or not the external account is active or inactive. An active or inactive status may indicate whether or not the customer has completed the necessary verification steps to ensure that the account is authentic and belongs to the customer. As such, verification may be required before an account is made available for transfer.

In some embodiments, presenting the contacts further comprises adding at least one contact to be associated with the customer's account. In such an embodiment, the contact information may be manually provided by the customer and thus retrieved from an input device associated with the customer's computing device. Alternatively, the contact information may be provided automatically by importing information from non-financial and/or financial accounts associated with the customer. For example, contact information may be imported from the customer messaging (e.g., email messaging provider), mobile service provider, mobile device hardware and/or software, social network, external financial institutions and the like. To this extent, the fund transfer management module may comprise an application interface for use in communicating with external databases for the purpose of receiving customer contact and/or external account information. In such an embodiment, the system may be configured to receive a request to add a contact via the fund transfer management module, access a data source (where the data source may be an external database or an input device of the customers computing device) associated with the contact for use in retrieving contact information associated with the contact; and add the contact based at least in part on one or more criteria specified in the request and contact information obtained from the data source. In other embodiments, contact may be added based on the location of the customer. For example, if the customer is located within a business establishment, the customer may select to add the contact information of their current location as a contact in which the customer may then proceed to process a payment or funds transfer to the business. In another embodiment, the customer may add a contact based on a physical interaction between the customers' computing device and the computing device of the added individual. For example, a customer may touch their mobile device to the mobile device of another individual such that the contact information of the individual is automatically received and associated with the customer's fund transfer management module. The customer may additionally specify criteria for adding contacts and external accounts such as the preferred method of contact for transferring funds to an individual or the transfer type of an external account.

At Event 2840, after presenting the contact and external accounts of the customer, the system may be configured to process a funds transfer based at least in part on the information associated with the contacts and/or external accounts. In one embodiment, the customer contact management interface and external account management interface may be interactive such that a customer can initiate a transfer in response to directly selecting at least one of a contact or external account associated with the customer. To this extent, in one embodiment, in response to selecting the contact or external account the system may automatically populate a transfer request form with the information associated with the customer selection. For example, if the customer selects Name 1, the transfer request form may be populated with the name of the contact and the email address associated with the contact. Furthermore, in an embodiment, in which a contact is associated with multiple methods of contact, the customer may directly select a specific parameter for use in populating the transfer request form. For example, if the customer selects the Bank 1 Checking Account of Name 2, the transfer request form may be populated with the name of the contact and the account number of the bank one checking account. Alternatively, in an embodiment, in which a contact is associated with multiple methods of contact, a default method of contact may be used to populate the transfer request form. For example, if the customer selects Name 2, the transfer request form may be populated with the name of the contact and the telephone number as it is the first means of contact listed or another contact method defined by the customer as a preference for sending funds to Name 2.

Thus, systems, apparatus, methods, and computer program products described above provide for efficiently and easily scheduling future transfers and, specifically, recurring future transfers within a consolidated fund transfer management platform. In this regard, the platform is configured to, in response to user selection of a transferee account or recipient; provide transfer options that may include the frequency of the transfer options, i.e., one-time only, weekly, monthly and the like. In response to the user selecting a frequency option, the platform is configured to present/display duration options that are associated with the selected-duration option. In this regard, the platform is highly intuitive to the user, such that the user can easily configure future transfers and, specifically, future recurring transfers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:
1. An apparatus for use in providing electronic account activity management, the apparatus comprising:
   a memory;
   a computing processor; and
   a module stored in the memory, said module comprising instruction code executable by one or more computing processors, and configured to cause the one or more computing processors to:
   provide access to a funds transfer management portal, whereby the funds transfer management portal interfaces with at least one database to access a customer's financial information for use in presenting account activity associated with at least one of the customer's accounts maintained by a financial institution;
   receive a request to view account activity, via the funds transfer management portal, wherein the request specifies a timeline view format for viewing the account activity;
   in response to receiving the request to view account activity, retrieve data from the at least one database, wherein the data contains the customer's financial account activity information related to one or more funds transfers associated with the at least one account, wherein the customer's financial account activity information comprises historical transfer data;
   present the account activity, via the funds transfer management portal, wherein the account activity is presented in a consolidated timeline for a predetermined period of time, the consolidated timeline comprising at least one transfer entry, wherein the one or more funds transfers are associated with the at least one transfer entry, wherein the at least one transfer entry is represented as a graphed bar, wherein a height of the graphed bar is indicative of a number of the one or more funds transfers associated with the at least one transfer entry, the consolidated timeline further comprising a current date indicator, wherein past fund transfers are indicated to the left of the current date indicator, wherein scheduled future fund transfers are indicated to the right of the current date indicator;
   detect that the customer has hovered over the graphed bar using an input device associated with the customer;
   display an information window configured to display information about the one or more funds transfers associated with the at least one transfer entry, the information comprising at least one of a transfer date, transfer amount, and transfer type;

receive, from the customer, a request to make a funds transfer;

in response to the request to make the funds transfer, display a digital form to the customer, the digital form comprising a 1) from input box and a 2) to input box, the digital form further comprising a graphical fund transfer indicator, the graphical fund transfer indicator being in the form of an arrow leading from the 1) from input box to the 2) to input box;

detect that the customer has provided inputs to the 1) from input box and the 2) to input box;

in response to detecting that the customer has provided inputs to the 1) from input box and the 2) to input box, determine a fund transfer pattern from the historical transfer data, wherein the fund transfer pattern indicates that the customer continually performs a fund transfer on an ongoing basis;

in response to determining the fund transfer pattern, display a suggested recurring transfer option via the funds transfer management portal;

detect that the customer has selected the suggested recurring transfer option;

in response to detecting that the customer has selected the suggested recurring transfer option, present to the customer a display of frequency options and duration options; and configure a recurring fund transfer based on the frequency options and the duration options.

2. The apparatus of claim 1, wherein at least one transfer entry is a scheduled transfer and wherein the module is further configured to cause the one or more processors to reschedule the at least one transfer entry in response to the customer moving, via an input device, the at least one transfer entry from a first day to a second day such that the at least one transfer entry is rescheduled to be processed on the second day.

3. The apparatus of claim 1, wherein the account activity comprises at least one transfer entry related to the one or more funds transfers associated with the at least one account, wherein the at least one transfer entry is a scheduled transfer, and wherein the module is further configured to:

determine the at least one account will incur a negative balance as a result of the transfer; and present a warning message in conjunction with the at least one transfer entry.

4. The apparatus of claim 1, wherein the module is further configured to cause the one or more computing processors to:

receive a second request to view account activity, via the funds transfer management portal, wherein the request specifies a calendar view format for viewing the account activity; and present the account activity, via the funds transfer management portal, wherein the account activity is presented in a consolidated calendar for a predetermined period of time.

5. The apparatus of claim 1, wherein the module is further configured to cause the one or more computing processors to:

receive a second request to view account activity, via the funds transfer management portal, wherein the request specifies a tiled view format for viewing the account activity; and present the account activity, via the funds transfer management portal, wherein the account activity is presented in a consolidated tile set for a predetermined period of time.

6. The apparatus of claim 1, wherein the module is further configured to cause the one or more computing processors to:

receive a second request to view account activity, via the funds transfer management portal, wherein the request specifies a list view format for viewing the account activity; and present the account activity, via the funds transfer management portal, wherein the account activity is presented in a consolidated list for a predetermined period of time.

7. A computer program product for use in providing electronic account activity management, the computer program product comprising:

a non-transitory computer-readable medium comprising a set of codes for causing a computer to:

provide access to an funds transfer management portal, whereby the funds transfer management portal interfaces with at least one database to access a customer's financial information for use in presenting account activity associated with at least one of the customer's accounts maintained by a financial institution;

receive a request to view account activity, via the funds transfer management portal, wherein the request specifies a timeline view format for viewing the account activity;

in response to receiving the request to view account activity, retrieve data from the at least one database, wherein the data contains the customer's financial account activity information related to one or more funds transfers associated with the at least one account, wherein the customer's financial account activity information comprises historical transfer data;

present the account activity, via the funds transfer management portal, wherein the account activity is presented in a consolidated timeline for a predetermined period of time, the consolidated timeline comprising at least one transfer entry, wherein the one or more funds transfers are associated with the at least one transfer entry, wherein the at least one transfer entry is represented as a graphed bar, wherein a height of the graphed bar is indicative of a number of the one or more funds transfers associated with the at least one transfer entry, the consolidated timeline further comprising a current date indicator, wherein past fund transfers are indicated to the left of the current date indicator, wherein scheduled future fund transfers are indicated to the right of the current date indicator;

detect that the customer has hovered over the graphed bar using an input device associated with the customer;

display an information window configured to display information about the one or more funds transfers associated with the at least one transfer entry, the information comprising at least one of a transfer date, transfer amount, and transfer type;

receive, from the customer, a request to make a funds transfer;

in response to the request to make the funds transfer, display a digital form to the customer, the digital form comprising a 1) from input box and a 2) to input box, the digital form further comprising a graphical fund transfer indicator, the graphical fund transfer indicator being in the form of an arrow leading from the 1) from input box to the 2) to input box;

detect that the customer has provided inputs to the 1) from input box and the 2) to input box;

in response to detecting that the customer has provided inputs to the 1) from input box and the 2) to input box, determine a fund transfer pattern from the historical transfer data, wherein the fund transfer pattern indicates that the customer continually performs a fund transfer on an ongoing basis;

in response to determining the fund transfer pattern, display a suggested recurring transfer option via the funds transfer management portal;

detect that the customer has selected the suggested recurring transfer option;

in response to detecting that the customer has selected the suggested recurring transfer option, present to the customer a display of frequency options and duration options; and configure a recurring fund transfer based on the frequency options and the duration options.

8. The computer program product of claim 7, wherein at least one transfer entry is a scheduled transfer and wherein the computer program product further comprises a set of codes for causing a computer to reschedule the at least one transfer entry in response to the customer moving, via an input device, the at least one transfer entry from a first day to a second day such that the at least one transfer entry is rescheduled to be processed on the second day.

9. The computer program product of claim 7, wherein the set of codes further cause the computer to:

receive a second request to view account activity, via the funds transfer management portal, wherein the request specifies a calendar view format for viewing the account activity; and present the account activity, via the funds transfer management portal, wherein the account activity is presented in a consolidated calendar for a predetermined period of time.

10. The computer program product of claim 7, wherein the set of codes further cause the computer to:

receive a second request to view account activity, via the funds transfer management portal, wherein the request specifies a list view format for viewing the account activity; and present the account activity, via the funds transfer management portal, wherein the account activity is presented in a consolidated list for a predetermined period of time.

11. The computer program product of claim 7, wherein the set of codes further cause the computer to:

receive a second request to view account activity, via the funds transfer management portal, wherein the request specifies a tiled view format for viewing the account activity; and present the account activity, via the funds transfer management portal, wherein the account activity is presented in a consolidated tile set for a predetermined period of time.

12. A method for use in providing electronic account activity management, the method comprising:

providing access to an funds transfer management portal, whereby the funds transfer management portal interfaces with at least one database to access a customer's financial information for use in presenting account activity associated with at least one of the customer's accounts maintained by a financial institution;

receiving a request to view account activity, via the funds transfer management portal, wherein the request specifies a timeline view format for viewing the account activity;

in response to receiving the request to view account activity, retrieve data from the at least one database, wherein the data contains the customer's financial account activity information related to one or more funds transfers associated with the at least one account, wherein the customer's financial account activity information comprises historical transfer data;

presenting the account activity, via the funds transfer management portal, wherein the account activity is presented in a consolidated timeline for a predetermined period of time, the consolidated timeline comprising at least one transfer entry, wherein the one or more funds transfers are associated with the at least one transfer entry, wherein the at least one transfer entry is represented as a graphed bar, wherein a height of the graphed bar is indicative of a number of the one or more funds transfers associated with the at least one transfer entry, the consolidated timeline further comprising a current date indicator, wherein past fund transfers are indicated to the left of the current date indicator, wherein scheduled future fund transfers are indicated to the right of the current date indicator;

detecting that the customer has hovered over the graphed bar using an input device associated with the customer;

displaying an information window configured to display information about the one or more funds transfers associated with the at least one transfer entry, the information comprising at least one of a transfer date, transfer amount, and transfer type;

receiving, from the customer, a request to make a funds transfer;

in response to the request to make the funds transfer, displaying a digital form to the customer, the digital form comprising a 1) from input box and a 2) to input box, the digital form further comprising a graphical fund transfer indicator, the graphical fund transfer indicator being in the form of an arrow leading from the 1) from input box to the 2) to input box;

detecting that the customer has provided inputs to the 1) from input box and the 2) to input box;

in response to detecting that the customer has provided inputs to the 1) from input box and the 2) to input box, determining a fund transfer pattern from the historical transfer data, wherein the fund transfer pattern indicates that the customer continually performs a fund transfer on an ongoing basis;

in response to determining the fund transfer pattern, displaying a suggested recurring transfer option via the funds transfer management portal;

detecting that the customer has selected the suggested recurring transfer option;

in response to detecting that the customer has selected the suggested recurring transfer option, presenting to the customer a display of frequency options and duration options; and configuring a recurring fund transfer based on the frequency options and the duration options.

13. The method of claim 12, wherein at least one transfer entry is a scheduled transfer and wherein the method further comprises rescheduling the at least one transfer entry in response to the customer moving, via an input device, the at least one transfer entry from a first day to a second day such that the at least one transfer entry is rescheduled to be processed on the second day.

14. The method of claim 12, the method further comprising:

receiving a second request to view account activity, via the funds transfer management portal, wherein the request specifies a calendar view format for viewing the account activity; and presenting the account activity, via the funds transfer management portal, wherein the account activity is presented in a consolidated calendar for a predetermined period of time.

15. The method of claim 12, the method further comprising:

receiving a second request to view account activity, via the funds transfer management portal, wherein the request specifies a list view format for viewing the account activity; and presenting the account activity, via the funds transfer management portal, wherein the account activity is presented in a consolidated list for a predetermined period of time.

16. The method of claim 12, the method further comprising:

receiving a second request to view account activity, via the funds transfer management portal, wherein the request specifies a tiled view format for viewing the account activity; and presenting the account activity, via the funds transfer management portal, wherein the account activity is presented in a consolidated tile set for a predetermined period of time.

* * * * *